United States Patent
Kojima et al.

(10) Patent No.: US 8,526,293 B2
(45) Date of Patent: Sep. 3, 2013

(54) INFORMATION RECORDING MEDIUM AND RECORDING/REPRODUCING METHOD FOR THE SAME

(75) Inventors: Rie Kojima, Osaka (JP); Masahiro Birukawa, Osaka (JP); Kenji Narumi, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 324 days.

(21) Appl. No.: 12/682,828

(22) PCT Filed: Jun. 12, 2009

(86) PCT No.: PCT/JP2009/002684
§ 371 (c)(1),
(2), (4) Date: Apr. 13, 2010

(87) PCT Pub. No.: WO2009/150855
PCT Pub. Date: Dec. 17, 2009

(65) Prior Publication Data
US 2010/0220574 A1    Sep. 2, 2010

(30) Foreign Application Priority Data
Jun. 13, 2008    (JP) ................................ 2008-155934

(51) Int. Cl.
*G11B 3/70*    (2006.01)
*G11B 5/84*    (2006.01)
*G11B 7/26*    (2006.01)

(52) U.S. Cl.
USPC .......................................... 369/286; 369/288

(58) Field of Classification Search
None
See application file for complete search history.

(56) References Cited

U.S. PATENT DOCUMENTS
6,064,642 A * 5/2000 Okubo ...................... 369/275.1

2002/0004118 A1    1/2002 Kishima et al.
(Continued)

FOREIGN PATENT DOCUMENTS
JP    2001-084642 A    3/2001
JP    2002-050043 A    2/2002
(Continued)

OTHER PUBLICATIONS

Van den Eerenbeemd, J.M.A. et al., "Feasibility Study on a 4-layer Cover-Incident Near-Field Recording System", Optical Data Storage (ODS), TuB5, Apr. 2006.

(Continued)

*Primary Examiner* — Joseph H. Feild
*Assistant Examiner* — Carl Adams
(74) *Attorney, Agent, or Firm* — Hamre, Schumann, Mueller & Larson, P.C.

(57) ABSTRACT

The information recording medium (100) of the present invention includes: an information layer (110) including a recording layer (115) capable of changing its phase containing at least one selected from Ge—Te, Sb—Te and Ge—Sb, and two or more dielectric layers (117, 118) disposed on the optical beam incident side with respect to the recording layer (115); and a transparent layer (102) disposed on the optical beam incident side with respect to the information layer (110) adjacent to the information layer, made of a transparent material with respect to the optical beam, and having a refractive index n of 1.75 or more. When two dielectric layers (117, 118) from the near side to the transparent layer (102) each are referred to as a dielectric layer b (118) and a dielectric layer a (117) from the optical beam incident side among the two or more dielectric layers (117, 118), a relationship of the refractive index n of the transparent layer 102, a refractive index $n_b$ of the dielectric layer b (118) and a refractive index $n_a$ of the dielectric layer a satisfies $n_b < n < n_a$. In the information recording medium (100) of the present invention, information can be recorded or reproduced by means of an optical system having a numerical aperture (NA)>1 by irradiation with optical beam.

13 Claims, 6 Drawing Sheets

(56) References Cited

U.S. PATENT DOCUMENTS

| | | | |
|---|---|---|---|
| 2002/0054974 A1 | 5/2002 | Takahashi et al. | |
| 2002/0057645 A1 | 5/2002 | Kishima | |
| 2004/0246868 A1* | 12/2004 | Kishima et al. | 369/94 |
| 2004/0252622 A1* | 12/2004 | Kariyada | 369/275.2 |
| 2006/0044991 A1* | 3/2006 | Nishihara et al. | 369/272.1 |
| 2006/0198278 A1* | 9/2006 | Lee et al. | 369/112.23 |
| 2006/0256695 A1 | 11/2006 | Saito et al. | |
| 2008/0159121 A1* | 7/2008 | Tung et al. | 369/286 |

FOREIGN PATENT DOCUMENTS

| | | |
|---|---|---|
| JP | 2002-074754 A | 3/2002 |
| JP | 2002-170283 A | 6/2002 |
| JP | 2003-263770 A | 9/2003 |
| JP | 2004-063047 A | 2/2004 |
| JP | 2006-344347 A | 12/2006 |
| JP | 2007-164868 A | 6/2007 |

OTHER PUBLICATIONS

Birukawa, M. et al. "Near-field Rewritable Dual-layer Recording with SIL System", The Joint International Symposium on Optical Memory and Optical Data Storage (ISOM/ODS), TD05-152, Jul. 2008.

* cited by examiner

INFORMATION RECORDING MEDIUM AND RECORDING/REPRODUCING METHOD FOR THE SAME

TECHNICAL FIELD

The present invention relates to an optical information recording medium with respect to which information optically can be recorded and/or reproduced, and specifically relates to an optical information recording medium using an optical system having a numerical aperture (NA)>1.

BACKGROUND ART

Blu-ray Disc (BD) has already been put to practical use as a recording medium for high definition television image, and further BD is spreading increasingly due to the standard integration. Recently, a super high definition television system is proposed as a next generation image technology. Accordingly, there is a growing demand for a further increase in the capacity of an optical disc as a recording medium. As a method for increasing the capacity, a multilayer technique and a high-density technique may be used. The multilayer technique can double or treble the capacity by providing two or more information layers. On the other hand, a technique using near-field light is proposed in the high-density technique.

An optical system combining a collective lens and a solid immersion lens (SIL) recently has attracted attention as an optical beam focusing device using near-field light. A higher numerical aperture can be achieved by this combination than the NA (numerical aperture) of a collective lens. By increasing the numerical aperture of an optical system, it is possible to decrease the diameter of a spot, and thus high density recording is feasible. For example, the recording capacity of a BD is 25 GB per information layer, but use of an SIL for its optical system allows a recording capacity of 60 GB or more per information layer to be achieved.

In an optical system using an SIL, the distance between the SIL and an optical disc surface is required to be extremely shortened because it is necessary that a laser beam leaking from the emitting surface of the SIL be allowed to enter the optical disc surface by the generated near-field light. For such a reason, in an optical system of a BD, the distance between an objective lens and an optical disc surface is about 0.3 mm, whereas in an optical system thereof using an SIL, the distance between the emitting surface of the SIL and an optical disc surface is about 50 nm or less.

Further, in the case of a medium for recording/reproducing information using an SIL, it also is necessary to shorten the distance between the SIL and a recording layer. In a DVD (Digital Versatile Disc), a 0.6 mm thick substrate is provided on the laser beam incident side, while in the case of a BD, a 100 μm thick transparent layer is provided on the laser beam incident side. However, in a medium for recording/reproducing information using an optical system using an SIL, a transparent layer to be provided on the laser beam incident side has a thickness of 5 μm or less. In addition, in the case of a multilayer medium including a plurality of information layers (see, for example, Patent Literature 1), an interlayer having the function of separating between information layers is provided. Whereas the thickness of an interlayer is 25 μm in the case of a two-layer BD, the thickness of an interlayer is 5 μm or less in the case of a multilayer medium for recording/reproducing information using an SIL (see, for example, Non Patent Literature 1).

As seen from above, Patent Literature 1 and Non Patent Literature 1 each disclose a structure of a single layer or multilayer medium for recording/reproducing information using an optical system using an SIL.

CITATION LIST

Patent Literature
  Patent Literature 1: JP 2003-263770 A
Non Patent Literature
  Non Patent Literature 1: International Symposium on Optical Data Storage (ODS) 2006: Speech No. TUB5

SUMMARY OF INVENTION

Technical Problem

However, neither of the literatures describes the material of a recording layer or the layer structure in detail. Specifically, a technique relating to a rewritable recording medium is not disclosed in detail.

Further, an increase in the refractive index n of a transparent layer to be disposed on the laser beam incident side leads to an increase in the effective NA of an SIL, and thus an increase in the capacity can be expected. However, the increase in the refractive index n of the transparent layer causes a decrease in the reflectance ratio of a medium or a decrease in the transmittance in the case of a multilayer medium. For this reason, even if the refractive index n of the transparent layer merely is increased, it is difficult to achieve a rewritable recording medium in which a good recording/reproducing is possible by means of an optical system using an SIL.

It is an object of the present invention to provide a rewritable recording medium that can achieve a good recording/reproducing by means of an optical system having a numerical aperture (NA)>1 and including an SIL, in order to solve the above-mentioned conventional problems. Further, it is another object of the present invention to provide a multilayer rewritable recording medium that can achieve a good recording/reproducing by means of the optical system. Moreover, it is still another object of the present invention to provide an information recording/reproducing method using such an information recording medium.

Solution to Problem

The first information recording medium of the present invention includes: an information layer including a recording layer that is capable of changing its phase and that contains at least one selected from Ge—Te, Sb—Te and Ge—Sb and two or more dielectric layers that are disposed on the optical beam incident side with respect to the recording layer; and a transparent layer that is disposed on the optical beam incident side with respect to the information layer, that is made of a transparent material with respect to the optical beam and that has a refractive index n of 1.75 or more. When two dielectric layers from the near side to the transparent layer each are referred to as a dielectric layer b and a dielectric layer a from the optical beam incident side among the two or more dielectric layers, the refractive index n of the transparent layer, a refractive index $n_b$ of the dielectric layer b and a refractive index $n_a$ of the dielectric layer a satisfy a relationship of $n_b<n<n_a$. In the first information recording medium of the present invention, information can be recorded or reproduced by irradiation with optical beam using an optical system having a numerical aperture (NA)>1.

The second information recording medium of the present invention includes: N (where N is an integer of 2 or more) information layers; at least one of the N information layers including a recording layer that is capable of changing its phase and that contains at least one selected from Ge—Te, Sb—Te and Ge—Sb and two or more dielectric layers that are disposed on the optical beam incident side with respect to the recording layer; and a transparent layer that is disposed on the optical beam incident side with respect to the information layer, that is made of a transparent material with respect to the optical beam, and that has a refractive index n of 1.75 or more. In this information recording medium, when two dielectric layers from the near side to the transparent layer each are referred to as a dielectric layer b and a dielectric layer a from the optical beam incident side among the two or more dielectric layers, the refractive index n of the transparent layer, a refractive index $n_b$ of the dielectric layer b and a refractive index $n_a$ of the dielectric layer a satisfy a relationship of $n_b < n < n_a$. In the second information recording medium of the present invention, information can be recorded or reproduced by irradiation with optical beam using an optical system having a numerical aperture (NA)>1.

Further, the method of the present invention for recording or reproducing information with respect to the first or second information recording medium including the step of recording information on the recording layer or reproducing information from the recording layer by irradiating the recording layer included in the information recording medium with optical beam using an optical system having a numerical aperture (NA)>1.

Advantageous Effects of Invention

According to the information recording medium of the present invention, it is possible to achieve a rewritable recording medium in which a good recording/reproducing is obtained by means of an optical system with a numerical aperture over 1 using, for example, an SIL. This renders a high capacity recording medium having a capacity of 90 GB to 200 GB per information layer feasible. Further, it also is possible to achieve a multilayer rewritable recording medium in which a good recording/reproducing is obtained by means of an optical system with a numerical aperture over 1 using, for example, an SIL. This renders a high capacity recording medium having a capacity of 180 GB to 800 GB feasible.

DESCRIPTION OF EMBODIMENTS

Figures 1A, 1B:
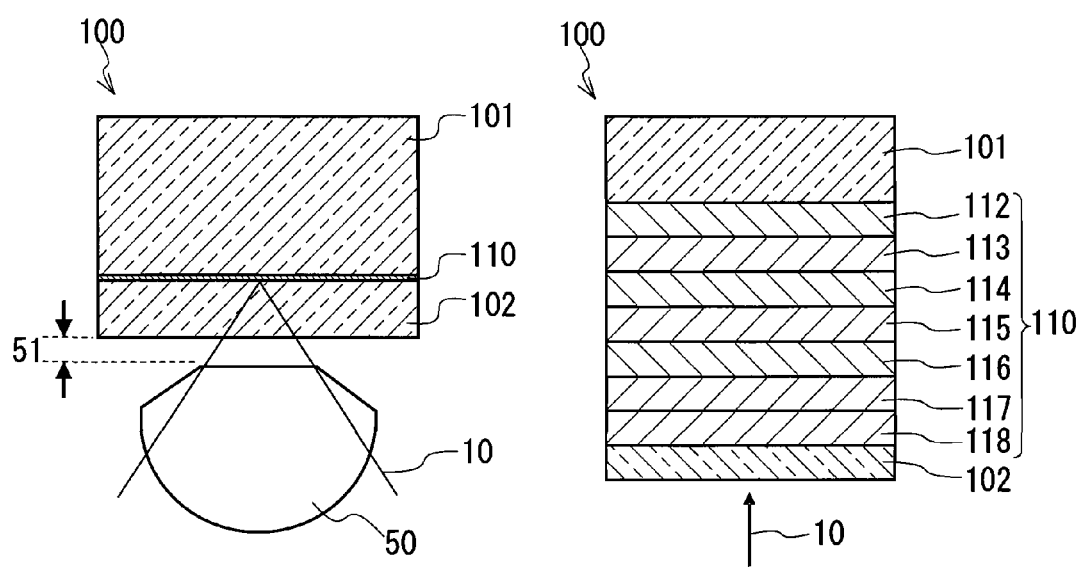
FIG. 1A is a partial sectional view indicating an embodiment of an information recording medium and an optical system of the present invention.
FIG. 1B is a detailed sectional view indicating the information recording medium indicated in FIG. 1A.

The information recording medium of the present invention includes: an information layer including a recording layer that is capable of changing its phase and that contains at least one selected from Ge—Te, Sb—Te and Ge—Sb and two or more dielectric layers that are disposed on the optical beam incident side with respect to the recording layer; and a transparent layer (which is the transparent layer or the interlayer of the information recording medium below described in Embodiments 1 to 5) that is disposed adjacent to the information layer on the optical beam incident side with respect to the information layer, that is made of a transparent material with respect to the optical beam, and that has a refractive index n of 1.75 or more (preferably 1.8 or more). When two dielectric layers from the near side to the transparent layer each are referred to as a dielectric layer b and a dielectric layer a from the optical beam incident side among the two or more dielectric layers, the refractive index n of the transparent layer, a refractive index $n_b$ of the dielectric layer b and a refractive index $n_a$ of the dielectric layer a satisfy a relationship of $n_b < n < n_a$. In the information recording medium of this embodiment, information can be recorded or reproduced by irradiation with an optical beam using an optical system having a numerical aperture (NA)>1.

Further, the information recording medium of the present invention may include a plurality of information layers. In this case, the information recording medium of the present invention includes N (where N is an integer of 2 or more) information layers, with at least one of the N information layers including a recording layer that is capable of changing its phase and that contains at least one selected from Ge—Te, Sb—Te and Ge—Sb and two or more dielectric layers that are disposed on the optical beam incident side with respect to the recording layer. In this information recording medium, a transparent layer (which is the transparent layer or the interlayer of the information recording medium below described in Embodiments 1 to 5) that is disposed adjacent to the information layer on the optical beam incident side with respect to the information layer, that is made of a transparent material with respect to the optical beam, and that has a refractive index n of 1.75 or more is further provided. When two dielectric layers from the near side to the transparent layer each are referred to as a dielectric layer b and a dielectric layer a from the optical beam incident side among the two or more dielectric layers, the refractive index n of the transparent layer, a refractive index $n_b$ of the dielectric layer b and a refractive index $n_a$ of the dielectric layer a satisfy a relationship of $n_b < n < n_a$. In the information recording medium of this embodiment, information can be recorded or reproduced by irradiation with optical beam using an optical system having a numerical aperture (NA)>1.

The information recording medium of the present invention further includes an interface layer in contact with at least one surface of the recording layer, and the interface layer may contain oxygen (O) and at least one element selected from zirconium (Zr) and hafnium (Hf). In this case, the interface layer further may contain at least one element selected from In, Ga, Cr and Si.

In the information recording medium of the present invention, the dielectric layer b may contain at least one selected from materials expressed as $Al_2O_3$, BN, $CeF_3$, $LaF_3$, $MgF_2$, MgO, $MgSiO_3$, $Si_3N_4$, $SiO_2$, $YF_3$, $ZrSiO_4$, $Al_6Si_2O_{13}$ and $Al_4SiO_8$. Further, the dielectric layer a may contain at least one selected from materials expressed as AlN, $Bi_2O_3$, $CeO_2$, $Dy_2O_3$, $Ga_2O_3$, $HfO_2$, $In_2O_3$, $Nb_2O_5$, $Sb_2O_3$, $Si_3N_4$, $SnO_2$, $Ta_2O_5$, $TeO_2$, $TiO_2$, $WO_3$, $Y_2O_3$, ZnO, ZnS—$SiO_2$, $ZrO_2$, $Al_2TiO_5$, ZnS and $Cr_2O_3$.

The information recording medium of the present invention further may include a reflective layer, and the recording layer and the reflective layer may be disposed in this order from the optical beam incident side. The reflective layer may contain Ag.

In the information recording medium of the present invention, the recording layer may contain Ge—Sb—Te. In this case, the recording layer may contain Ge at 40 atom % or more.

In the information recording medium of the present invention, the optical system may include a solid immersion lens (SIL) or a solid immersion mirror (SIM).

Hereinafter, embodiments of the present invention will be described with reference to the drawings. It should be noted that the following embodiments are to be considered as an example, and the present invention is not limited thereto. Further, in the following embodiments, the same parts are indicated with identical numerals and the overlapping descriptions may be omitted.

Embodiment 1

An example of an information recording medium and an optical system having a numerical aperture (NA)>1 is described as Embodiment 1 of the present invention. FIG. 1A indicates a partial section of the information recording medium 100, and a solid immersion lens (hereinafter, referred to as SIL) 50 included in the optical system. The information recording medium 100 includes, on a substrate 101, an information layer 110 and a transparent layer 102 disposed adjacent and on the optical beam incident side with respect to the information layer 110. The SIL 50 is disposed with a distance 51 between the emitting surface on the flat side of the SIL 50 and the surface of the transparent layer 102. A laser beam 10 emitted from the SIL 50 is incident through the transparent layer 102 to the information layer 110, with which recording and reproduction of information are performed. It is optically desirable that the refractive index $n_g$ of the SIL 50 and the refractive index n of the transparent layer 102 be close. If n is greater than $n_s$, the laser beam can be focused into a smaller spot, so that the recording density can be increased. If n is lower than $n_s$, the effective NA of the SIL 50 is decreased. In other words, the incident angle of the laser beam 10 decreases, and thus it becomes difficult to write relatively short recording marks, resulting in a decrease in the recording density. In contrast, if n is greater than $n_s$, the effective NA of the SIL is increased, and thus it becomes easy to write short marks, resulting in an increase in the recording density. As a result, the recording capacity can be increased.

The optical system using the SIL 50 requires the distance 51 to be extremely small so that near-field light is generated between the flat side of the SIL 50 and the surface of the transparent layer 102. The near-field light (not shown in FIGURES) has a function of guiding the laser beam 10 to the information recording medium 100. If the near-field light is not generated, the laser beam 10 is reflected on the flat side of the SIL 50 so as to fail to reach the information recording medium 100. For this reason, the distance 51 is preferably 50 nm or less. The information recording medium 100 is capable of recording/reproducing information with about 90 GB capacity per information layer by the combination of, for example, the SIL 50 with an effective NA=1.62 and the laser beam 10 with a wavelength of 405 nm.

Further, FIG. 1B indicates a partial section of the information recording medium 100 in detail. The information layer 110 is formed of a reflective layer 112, a dielectric layer 113, an interface layer 114, a recording layer 115, an interface layer 116, a dielectric layer (dielectric layer a) 117 and a dielectric layer (dielectric layer b) 118 that are disposed in this order on one surface of the substrate 101. Hereinafter, descriptions will be given subsequently, starting from the substrate 101.

The substrate 101 functions mainly as a support body. A disc-shaped transparent substrate with a smooth surface is used for the substrate 101. As the material of the substrate 101, there can be mentioned resins, such as polycarbonate, amorphous polyolefin, and polymethylmethacrylate (PMMA), or glass. Taking formability, price, and mechanical strength into consideration, polycarbonate is used preferably. In order to maintain the distance 51 of 50 nm or less, the substrate 101 preferably has an extremely low acceleration in the perpendicular direction. In the illustrated embodiment, the substrate 101 with a thickness of approximately 1.1 mm and a diameter of approximately 120 mm is used preferably.

Guide grooves with a shape of projections and depressions for guiding the laser beam 10 may be formed on the surface of the substrate 101 on which the information layer 110 is formed. In this description, supposing that guide grooves are formed on the substrate 101, a surface of the guide groove closer to the laser beam 10 incident side is called a "groove surface", and a surface of the guide groove farther from the laser beam 10 incident side is called a "land surface" for convenience. In this embodiment, the level difference from the groove surface to the land surface is preferably at least 10 nm but not more than 30 nm. Further, a groove-groove distance (the distance from the center of one groove surface to the center of the adjacent groove surface) is preferably at least 100 nm but not more than 300 nm.

The transparent layer 102 is described. In a medium for recording/reproducing information using the SIL 50, it also is necessary to shorten the distance between the SIL 50 and the recording layer 115. Accordingly, the thickness of the transparent layer 102 is preferably 5 μm or less, more preferably 3 μm or less.

A material having a refractive index n close to the refractive index $n_s$ of the SIL 50 is used as the material of the transparent layer 102. The refractive index n of the transparent layer 102 is 1.75 or more, preferably 1.8 or more. Further, the refractive index n of the transparent layer 102 is, for example, 2.4 or less. Specifically, an acrylic resin to which $TiO_2$ fine particles or $ZrO_2$ fine particles are added may be used for the material. Alternatively, both of $TiO_2$ fine particles and $ZrO_2$ fine particles may be added thereto, which also may be used for the material. Although an acrylic resin has a low refractive index of about 1.5, the refractive index thereof can be increased homogeneously by mixing the fine particles of the material with a high refractive index to the extent that no agglomeration occurs. The acrylic resin may be an ultraviolet curable resin. The particle size of the fine particles is preferably as small as possible so that the optical beam does not scatter too much at the surface of the transparent layer 102. The particle size of the $TiO_2$ fine particles is at least 20 nm but not more than 25 nm, the particle size of the $ZrO_2$ fine particles is at least 10 nm but not more than 15 nm. Further, the refractive index of the TiO$_2$ fine particles is about 2.6, and the refractive index of the ZrO$_2$ fine particles is about 2.2. For example, in order to obtain the transparent layer 102 with a refractive index n of 1.8, in the case of the TiO$_2$ fine particles, the TiO$_2$ fine particles may be mixed up to about 27% by volume percentage, and in the case of the ZrO$_2$ fine particles, the ZrO$_2$ fine particles may be mixed up to about 43% by volume percentage. The reason why an acrylic ultraviolet curable resin is used as a base material is that a material capable of being formed by spin coating or the like is preferable because the formation of layers with a thickness of μm by sputtering takes too much time to be practical as a production process. An additional reason is that ultraviolet curable resins can be cured in a short time by irradiation with ultraviolet light, resulting in a considerable reduction in production time.

The transparent layer 102 may be composed, for example, of a disc-shaped sheet made of the above material and an adhesive layer. Guide grooves with a shape of projections and depressions for guiding the laser beam 10 may be formed on the transparent layer 102, as needed. It also is possible to form a protective layer on the surface of the dielectric layer 118 and form the transparent layer 102 thereon. Although any of these structures may be used, the total thickness (for example, the sheet thickness+the adhesive layer thickness+the protective layer thickness, or the thickness of only the ultraviolet curable resin) is preferably 5 μm or less, more preferably 3 μm or less. Since the transparent layer 102 is located on the laser beam 10 incident side, it optically is preferable that the transparent layer 102 has a low birefringence in a short wavelength range.

Optically, the reflective layer 112 has a function of increasing the amount of light to be absorbed by the recording layer 115 or a function of increasing the reflectance difference of the information recording medium 100 between the case where the recording layer 115 is amorphous and the case where the recording layer 115 is crystalline. Thermally, the reflective layer 112 has a function of diffusing promptly the heat generated in the recording layer 115 and cooling the recording layer 115 rapidly so that the recording layer 115 becomes amorphous easily. Furthermore, the reflective layer 112 also has a function of protecting a multilayer film including the layers from the dielectric layer 113 to the dielectric layer 118 from the environment in which it is used. Preferably, the material for the reflective layer 112 has a high thermal conductivity so as to diffuse promptly the heat generated in the recording layer 115. Furthermore, the material for the reflective layer 112 preferably has a low optical absorption at the wavelength of the laser beam to be used so as to increase the amount of light to be absorbed into the recording layer 115.

Particularly, the reflective layer 112 made of Ag or containing Ag in an amount of 97 atom % or more is used preferably for the information recording medium 100 because Ag has a low optical absorption at a wavelength of about 405 nm. In order to enhance the moisture resistance or adjust the thermal conductivity or the optical properties (such as optical reflectance, optical absorptance, and optical transmittance), a material additionally containing another element may be used. Preferably, the additional element is at least one selected from Mg, Ca, Sc, Y, Ti, Zr, Hf, V, Nb, Ta, Cr, Mo, W, Mn, Fe, Ru, Os, Co, Rh, Ni, Pd, Pt, Cu, Au, Zn, B, Al, Ga, In, C, Si, Ge, Sn, N, Sb, Bi, O, Te, La, Ce, Pr, Nd, Sm, Eu, Gd, Tb, Dy, Ho, Er, Tm, Yb, and Lu. Above all, Ag—Pd, Ag—Cu, Ag—Pd—Cu, Ag—In, Ag—Sn, Ag—In—Sn, Ag—Bi, Ag—Mg, Ag—Ca, Ag—Ga, and Ag—Ga—Cu are excellent in moisture resistance.

Moreover, the reflective layer 112 may be formed of two or more layers. In this case, one of the layers located on the side of the substrate 101 may be composed of a dielectric material. The thickness of the reflective layer 112 is adjusted according to the linear velocity of the medium to be used and the composition of the recording layer 115. Preferably, it is at least 40 nm but not more than 300 nm. The reflective layer 112 with a thickness less than 40 nm fails to satisfy the rapid cooling conditions, makes it difficult to diffuse the heat generated in the recording layer, and makes it difficult for the recording layer to become amorphous. The reflective layer 112 with a thickness more than 300 nm may go beyond the rapid cooling conditions, allow the heat generated in the recording layer to be diffused excessively, and lower the recording sensitivity (that is, a higher laser power is needed).

The dielectric layer 113 has a function of adjusting an optical distance to enhance the optical absorption efficiency of the recording layer 115 and increasing the difference between the reflectance in a crystalline phase and the reflectance in an amorphous phase to increase the signal amplitude. The dielectric layer 113 also has a function of protecting the recording layer 115 from moisture or the like. Preferably, the dielectric layer 113 has a high transparency at the wavelength of the laser to be used, and an excellent heat resistance in addition to an excellent moisture resistance as their properties.

As the material for the dielectric layer 113, oxides, sulfides, nitrides, carbides, and fluorides, or a mixture of these can be used.

Examples of the oxides to be used include Al$_2$O$_3$, Bi$_2$O$_3$, CaO, CeO$_2$, Cr$_2$O$_3$, Dy$_2$O$_3$, Ga$_2$O$_3$, Gd$_2$O$_3$, GeO$_2$, HfO$_2$, Ho$_2$O$_3$, In$_2$O$_3$, La$_2$O$_3$, MgO, MgSiO$_3$, Nb$_2$O$_5$, Nd$_2$O$_3$, Sb$_2$O$_3$, Sc$_2$O$_3$, SiO$_2$, Sm$_2$O$_3$, SnO$_2$, Ta$_2$O$_5$, TeO$_2$, TiO$_2$, WO$_3$, Y$_2$O$_3$, Yb$_2$O$_3$, ZnO, ZrO$_2$, and ZrSiO$_4$. Examples of the sulfides to be used include ZnS. Examples of the nitrides to be used include AlN, BN, CrN, Ge$_3$N$_4$, HfN, NbN, Si$_3$N$_4$, TaN, TiN, VN, and ZrN. Examples of the carbides to be used include Al$_4$C$_3$, B$_4$C, CaC$_2$, Cr$_3$C$_2$, HfC, Mo$_2$C, NbC, SiC, TaC, TiC, VC, W$_2$C, WC, and ZrC. Examples of the fluorides to be used include CaF$_2$, CeF$_3$, DyF$_3$, ErF$_3$, GdF$_3$, HoF$_3$, LaF$_3$, MgF$_2$, NdF$_3$, YF$_3$, and YbF$_3$.

Examples of the mixture to be used include ZnS—SiO$_2$, ZnS—LaF$_3$, ZnS—SiO$_2$—LaF$_3$, ZrO$_2$—SiO$_2$, ZrO$_2$—LaF$_3$, ZrO$_2$—Cr$_2$O$_3$, ZrO$_2$—SiO$_2$—Cr$_2$O$_3$, ZrO$_2$—Cr$_2$O$_3$—LaF$_3$, ZrO$_2$—SiO$_2$—LaF$_3$, ZrO$_2$—SiO$_2$—Cr$_2$O$_3$—LaF$_3$, ZrO$_2$—Ga$_2$O$_3$, ZrO$_2$—SiO$_2$—Ga$_2$O$_3$, ZrO$_2$—Ga$_2$O$_3$—LaF$_3$, ZrO$_2$—SiO$_2$—Ga$_2$O$_3$—LaF$_3$, ZrO$_2$—In$_2$O$_3$, ZrO$_2$—SiO$_2$—In$_2$O$_3$, ZrO$_2$—In$_2$O$_3$—LaF$_3$, ZrO$_2$—SiO$_2$—In$_2$O$_3$—LaF$_3$, ZrO$_2$—SiO$_2$—Cr$_2$O$_3$—Ga$_2$O$_3$, ZrO$_2$—SiO$_2$—Cr$_2$O$_3$—In$_2$O$_3$, ZrO$_2$—SiC, ZrO$_2$—SiO$_2$—SiC, HfO$_2$—SiO$_2$, HfO$_2$—LaF$_3$, HfO$_2$—Cr$_2$O$_3$, HfO$_2$—SiO$_2$—Cr$_2$O$_3$, HfO$_2$—Cr$_2$O$_3$—LaF$_3$, HfO$_2$—SiO$_2$—LaF$_3$, HfO$_2$—SiO$_2$—Cr$_2$O$_3$—LaF$_3$, HfO$_2$—Ga$_2$O$_3$, HfO$_2$—SiO$_2$—Ga$_2$O$_3$, HfO$_2$—Ga$_2$O$_3$—LaF$_3$, HfO$_2$—SiO$_2$—Ga$_2$O$_3$—LaF$_3$, HfO$_2$—In$_2$O$_3$, HfO$_2$—SiO$_2$—In$_2$O$_3$, HfO$_2$—In$_2$O$_3$—LaF$_3$, HfO$_2$—SiO$_2$—In$_2$O$_3$—LaF$_3$, HfO$_2$—SiO$_2$—Cr$_2$O$_3$—Ga$_2$O$_3$, HfO$_2$—SiO$_2$—Cr$_2$O$_3$—In$_2$O$_3$, HfO$_2$—SiC, HfO$_2$—SiO$_2$—SiC, SnO$_2$—Ga$_2$O$_3$, SnO$_2$—In$_2$O$_3$, SnO$_2$—SiC, SnO$_2$—Si$_3$N$_4$, SnO$_2$—Ga$_2$O$_3$—SiC, SnO$_2$—Ga$_2$O$_3$—Si$_3$N$_4$, SnO$_2$—Nb$_2$O$_5$, SnO$_2$—Ta$_2$O$_5$, CeO$_2$—Al$_2$O$_3$, CeO$_2$—Al$_2$O$_3$—SiO$_2$, Nb$_2$O$_5$—TiO$_2$, and Nb$_2$O$_5$—SiO$_2$—TiO$_2$.

Among these materials, composite materials or mixed materials containing ZrO$_2$ have a high transparency at a wavelength of about 405 nm and also have an excellent heat resistance. In at least a part of the material containing ZrO$_2$, partially-stabilized zirconia or stabilized zirconia obtained by adding any of CaO, MgO, and Y$_2$O$_3$ to substitute for a part of ZrO$_2$ may be used.

ZnS—SiO$_2$ is an amorphous material, and has a low thermal conductivity, a high transparency, a high refractive index, a high deposition rate when forming a film, an excellent mechanical property, and an excellent moisture resistance. Since Ag or Ag alloy is used preferably for the reflective layer 112, a material free from sulfides is used preferably for the dielectric layer 113.

The dielectric layer 113 has a function of adjusting the optical absorptance

Ac (%) of the recording layer 115 in a crystalline phase, the optical absorptance Aa (%) of the recording layer 115 in an amorphous phase, the optical reflectance Rc (%) of the information recording medium 100 when the recording layer 115 is in a crystalline phase, the optical reflectance Ra (%) of the information recording medium 100 when the recording layer 115 is in an amorphous phase, and the optical phase difference Δϕ of the information recording medium 100 between a portion in which the recording layer 115 is in a crystalline phase and a portion in which the recording layer 115 is in an amorphous phase, by changing its optical path length (that is, a product $n_{DL}d$ of a refractive index $n_{DL}$ of the dielectric layer and a thickness d of the dielectric layer).

In order to increase the reproduction signal amplitude of recording marks and to enhance the signal quality, it is desirable that the reflectance difference |Rc−Ra| or the reflectance ratio Rc/Ra be high. It also is desirable that the Ac and Aa be high for the absorption of the laser beam 10 by the recording layer 115. The optical path length of the dielectric layer 113 is determined so that these conditions are satisfied at the same time. The optical path length satisfying these conditions can be determined accurately by, for example, a calculation based on a matrix method (see Hiroshi Kubota, "Wave Optics", Iwanami Shinsho, 1971, Chapter 3, for example).

The optical path length $n_{DL}d$ is represented by $n_{DL}d=a\lambda$, when λ (nm) is the wavelength of the laser beam 10. Here, a denotes a positive number. In order to increase the reproduction signal amplitude of recording marks of the information recording medium 100 for improving the signal quality, the optical path length $n_{DL}d$ of the dielectric layer 113 can be determined exactly from a calculation based on the matrix method, for example, so that the following conditions are satisfied: 15≦Rc≦30 and 4≦Rc/Ra. It should be noted that the reflectance herein means the reflectance of the mirror surface unless otherwise specified.

For example, when the refractive index n of the transparent layer 102 is 1.8, in the case where a dielectric material with a refractive index $n_1$ of 2 is used for the dielectric layer 113 and a dielectric material with a refractive index $n_2$ (which corresponds to the refractive index $n_a$) of 2.2 is used for the dielectric layer 117, the thickness of the dielectric layer 113 is preferably at least $2\lambda/(64n_1)$ but not more than $8\lambda/(64n_1)$, that is, at least 6 nm but not more than 26 nm. Alternatively, in the case where a dielectric material with a refractive index $n_1$ of 2 is used for the dielectric layer 113 and a dielectric material with a refractive index $n_2$ of 2.6 is used for the dielectric layer 117, the thickness of the dielectric layer 113 is preferably at least $2\lambda/(64n_1)$ but not more than $10\lambda/(64n_1)$, that is, at least 6 nm but not more than 32 nm.

For example, when the refractive index n of the transparent layer 102 is 2, in the case where a dielectric material with a refractive index $n_1$ of 2 is used for the dielectric layer 113 and a dielectric material with a refractive index $n_2$ of 2.2 is used for the dielectric layer 117, the thickness of the dielectric layer 113 is preferably at least $2\lambda/(64n_1)$ but not more than $6\lambda/(64n_1)$, that is, at least 6 nm but not more than 20 nm. Alternatively, in the case where a dielectric material with a refractive index $n_1$ of 2 is used for the dielectric layer 113 and a dielectric material with a refractive index $n_2$ of 2.6 is used for the dielectric layer 117, the thickness of the dielectric layer 113 is preferably at least $2\lambda/(64n_1)$ but not more than $8\lambda/(64n_1)$, that is, at least 6 nm but not more than 26 nm.

As will be described later, the refractive index $n_2$ of the dielectric layer 117 is greater than the refractive index n of the transparent layer 102, therefore increasing the thickness range of the dielectric layer 113 in which Ra is low and Rc/Ra is high.

The dielectric layer 113 can be provided, as needed. In the case where the interface layer 114 combines the function of the above-mentioned the dielectric layer 113, the dielectric layer 113 is not necessarily provided. For example, the information layer 110 may be formed of the reflective layer 112, the interface layer 114, the recording layer 115, the interface layer 116, the dielectric layer 117 and the dielectric layer 118, disposed in this order on the substrate 101.

The interface layer 114 and the interface layer 116 of the present invention are described. The interface layer 114 and the interface layer 116 are provided so that at least one of the interface layers is in contact with the recording layer 115. The interface layer 114 and the interface layer 116 are made of a material with excellent adhesion to the recording layer 115. At the same time, the interface layer 114 and the interface layer 116 have a binding function as well, for the case where the adhesions between the dielectric layer 113 and the recording layer 115, and the dielectric layer 117 and the recording layer 115 are poor. Alternatively, in the structure without the dielectric layer 113, the interface layer 114 with good adhesion to the reflective layer 112 may be used.

A material containing oxygen (O) and at least one element selected from Zr and Hf can be used as a material of the interface layer 114 and the interface layer 116. Zr and O preferably are present as a compound expressed as $ZrO_2$ and form the interface layer 114 and the interface layer 116. Similarly, Hf and O are preferably present as a compound expressed as $HfO_2$ and form the interface layer 114 and the interface layer 116. Composite materials or mixed materials containing $ZrO_2$ or $HfO_2$ have a high transparency at a wavelength of about 405 nm and also have an excellent heat resistance. In addition, they are materials having an excellent adhesion to the recording layer 115 containing at least one selected from Ge—Te, Sb—Te and Ge—Sb.

A partially-stabilized zirconia or a stabilized zirconia obtained by adding any of CaO, MgO, and $Y_2O_3$ to $ZrO_2$ to substitute for a part of $ZrO_2$ may be used for at least a part of the material containing $ZrO_2$. Examples of the material to be used include $ZrO_2$, $HfO_2$, $ZrO_2$—$HfO_2$, $ZrO_2$—CaO, $ZrO_2$—MgO, and $ZrO_2$—$Y_2O_3$. Further, at least one selected from In, Ga, Cr and Si may be included therein. Materials containing $ZrO_2$—$In_2O_3$, $HfO_2$—$In_2O_3$, $ZrO_2$—$HfO_2$—$In_2O_3$, $ZrO_2$—CaO—$In_2O_3$, $ZrO_2$—MgO—$In_2O_3$, $ZrO_2$—$Y_2O_3$—$In_2O_3$, $ZrO_2$—$In_2O_3$—$Ga_2O_3$, $HfO_2$—$In_2O_3$—$Ga_2O_3$, $ZrO_2$—$HfO_2$—$In_2O_3$—$Ga_2O_3$, $ZrO_2$—CaO—$In_2O_3$—$Ga_2O_3$, $ZrO_2$—MgO—$In_2O_3$—$Ga_2O_3$, $ZrO_2$—$Y_2O_3$—$In_2O_3$—$Ga_2O_3$, $ZrO_2$—$In_2O_3$—$Cr_2O_3$, $HfO_2$—$In_2O_3$—$Cr_2O_3$, $ZrO_2$—$HfO_2$—$In_2O_3$—$Cr_2O_3$, $ZrO_2$—CaO—$In_2O_3$—$Cr_2O_3$, $ZrO_2$—MgO—$In_2O_3$—$Cr_2O_3$, $ZrO_2$—$Y_2O_3$—$In_2O_3$—$Cr_2O_3$, $ZrO_2$—$SiO_2$—$In_2O_3$, $HfO_2$—$SiO_2$—$In_2O_3$, $ZrO_2$—$HfO_2$—$SiO_2$—$In_2O_3$, $ZrO_2$—CaO—$SiO_2$—$In_2O_3$, $ZrO_2$—MgO—$SiO_2$—$In_2O_3$, $ZrO_2$—$Y_2O_3$—$SiO_2$—$In_2O_3$, $ZrO_2$—$SiO_2$—$In_2O_3$—$Ga_2O_3$, $HfO_2$—$SiO_2$—$In_2O_3$—$Ga_2O_3$, $ZrO_2$—$HfO_2$—$SiO_2$—$In_2O_3$—$Ga_2O_3$, $ZrO_2$—CaO—$SiO_2$—$In_2O_3$—$Ga_2O_3$, $ZrO_2$—MgO—$SiO_2$—$In_2O_3$—$Ga_2O_3$, $ZrO_2$—$Y_2O_3$—$SiO_2$—$In_2O_3$—$Ga_2O_3$, $ZrO_2$—$SiO_2$—$In_2O_3$—$Cr_2O_3$, $HfO_2$—$SiO_2$—$In_2O_3$—$Cr_2O_3$, $ZrO_2$—$HfO_2$—$SiO_2$—

$In_2O_3$—$Cr_2O_3$, $ZrO_2$—CaO—$SiO_2$—$In_2O_3$—$Cr_2O_3$, $ZrO_2$—MgO—$SiO_2$—$In_2O_3$—$Cr_2O_3$, $ZrO_2$—$Y_2O_3$—$SiO_2$—$In_2O_3$—$Cr_2O_3$, $ZrO_2$—$Ga_2O_3$, $HfO_2$—$Ga_2O_3$, $ZrO_2$—$HfO_2$—$Ga_2O_3$, $ZrO_2$—CaO—$Ga_2O_3$, $ZrO_2$—MgO—$Ga_2O_3$, $ZrO_2$—$Y_2O_3$—$Ga_2O_3$, $ZrO_2$—$Ga_2O_3$—$Cr_2O_3$, $HfO_2$—$Ga_2O_3$—$Cr_2O_3$, $ZrO_2$—$HfO_2$—$Ga_2O_3$—$Cr_2O_3$, $ZrO_2$—CaO—$Ga_2O_3$—$Cr_2O_3$, $ZrO_2$—MgO—$Ga_2O_3$—$Cr_2O_3$, $ZrO_2$—$Y_2O_3$—$Ga_2O_3$—$Cr_2O_3$, $ZrO_2$—$SiO_2$—$Ga_2O_3$, $HfO_2$—$SiO_2$—$Ga_2O_3$, $ZrO_2$—$HfO_2$—$SiO_2$—$Ga_2O_3$, $ZrO_2$—CaO—$SiO_2$—$Ga_2O_3$, $ZrO_2$—MgO—$SiO_2$—$Ga_2O_3$, $ZrO_2$—$Y_2O_3$—$SiO_2$—$Ga_2O_3$, $ZrO_2$—$SiO_2$—$Ga_2O_3$—$Cr_2O_3$, $HfO_2$—$SiO_2$—$Ga_2O_3$—$Cr_2O_3$, $ZrO_2$—$HfO_2$—$SiO_2$—$Ga_2O_3$—$Cr_2O_3$, $ZrO_2$—CaO—$SiO_2$—$Ga_2O_3$—$Cr_2O_3$, $ZrO_2$—MgO—$SiO_2$—$Ga_2O_3$—$Cr_2O_3$, $ZrO_2$—$Y_2O_3$—$SiO_2$—$Ga_2O_3$—$Cr_2O_3$, $ZrO_2$—$Cr_2O_3$, $HfO_2$—$Cr_2O_3$, $ZrO_2$—$HfO_2$—$Cr_2O_3$, $ZrO_2$—CaO—$Cr_2O_3$, $ZrO_2$—MgO—$Cr_2O_3$, $ZrO_2$—$Y_2O_3$—$Cr_2O_3$, $ZrO_2$—$SiO_2$—$Cr_2O_3$, $HfO_2$—$SiO_2$—$Cr_2O_3$, $ZrO_2$—$HfO_2$—$SiO_2$—$Cr_2O_3$, $ZrO_2$—CaO—$SiO_2$—$Cr_2O_3$, $ZrO_2$—MgO—$SiO_2$—$Cr_2O_3$, $ZrO_2$—$Y_2O_3$—$SiO_2$—$Cr_2O_3$, $ZrO_2$—$SiO_2$, $HfO_2$—$SiO_2$, $ZrO_2$—$HfO_2$—$SiO_2$, $ZrO_2$—CaO—$SiO_2$, $ZrO_2$—MgO—$SiO_2$, or $ZrO_2$—$Y_2O_3$—$SiO_2$ may be used.

Alternatively, composite oxides containing $ZrO_2$ and $SiO_2$ at 1:1, or materials containing $ZrSiO_4$ may be used. Materials containing $ZrSiO_4$, $ZrSiO_4$—$HfO_2$, $ZrSiO_4$—CaO, $ZrSiO_4$—MgO, $ZrSiO_4$—$Y_2O_3$, $ZrSiO_4$—$In_2O_3$, $ZrSiO_4$—$HfO_2$—$In_2O_3$, $ZrSiO_4$—CaO—$In_2O_3$, $ZrSiO_4$—MgO—$In_2O_3$, $ZrSiO_4$—$Y_2O_3$—$In_2O_3$, $ZrSiO_4$—$In_2O_3$—$Ga_2O_3$, $ZrSiO_4$—$HfO_2$—$In_2O_3$—$Ga_2O_3$, $ZrSiO_4$—CaO—$In_2O_3$—$Ga_2O_3$, $ZrSiO_4$—MgO—$In_2O_3$—$Ga_2O_3$, $ZrSiO_4$—$Y_2O_3$—$In_2O_3$—$Ga_2O_3$, $ZrSiO_4$—$In_2O_3$—$Cr_2O_3$, $ZrSiO_4$—$HfO_2$—$In_2O_3$—$Cr_2O_3$, $ZrSiO_4$—CaO—$In_2O_3$—$Cr_2O_3$, $ZrSiO_4$—MgO—$In_2O_3$—$Cr_2O_3$, $ZrSiO_4$—$Y_2O_3$—$In_2O_3$—$Cr_2O_3$, $ZrSiO_4$—$Ga_2O_3$, $ZrSiO_4$—$HfO_2$—$Ga_2O_3$, $ZrSiO_4$—CaO—$Ga_2O_3$, $ZrSiO_4$—MgO—$Ga_2O_3$, $ZrSiO_4$—$Y_2O_3$—$Ga_2O_3$, $ZrSiO_4$—$Ga_2O_3$—$Cr_2O_3$, $ZrSiO_4$—$HfO_2$—$Ga_2O_3$—$Cr_2O_3$, $ZrSiO_4$—CaO—$Ga_2O_3$—$Cr_2O_3$, $ZrSiO_4$—MgO—$Ga_2O_3$—$Cr_2O_3$, $ZrSiO_4$—$Y_2O_3$—$Ga_2O_3$—$Cr_2O_3$, $ZrSiO_4$—$Cr_2O_3$, $ZrSiO_4$—$HfO_2$—$Cr_2O_3$, $ZrSiO_4$—CaO—$Cr_2O_3$, $ZrSiO_4$—MgO—$Cr_2O_3$, and $ZrSiO_4$—$Y_2O_3$—$Cr_2O_3$ may be used.

In the case where the dielectric layer 113 and the dielectric layer 117 are provided, the thickness of each of the interface layer 114 and the interface layer 116 is preferably at least 0.3 nm but not more than 10 nm, more preferably at least 0.5 nm but not more than 7 nm. The interface layer 114 and the interface layer 116 with a thickness more than 7 nm cause a change in the optical reflectance and the optical absorptance of stack of layers from the reflective layer 112 to the dielectric layer 118 that are formed on the surface of the substrate 101, and affect the recording/erasing performance. If the thickness is less than 0.3 nm, the adhesion to the recording layer 115 decreases. In addition, the refractive index of each of the interface layer 114 and the interface layer 116 is preferably from 1.5 to 3.0, and the extinction coefficient thereof is preferably 0.3 or less, more preferably 0.2 or less. In the case without the dielectric layer 113, the interface layer 114 preferably has a thickness of at least 6 nm but not more than 42 nm. In this case, since the interface layer 114 is thick, the extinction coefficient of the interface layer 114 is preferably 0.1 or less.

The recording layer 115 of the present invention can change its phase and contains at least one selected from Ge—Te, Sb—Te and Ge—Sb. Such a material composition allows information to be recorded or reproduced using an optical system with NA>1. Examples of the material to be used include a GeTe—$Sb_2Te_3$ pseudobinary material, a GeTe—$Bi_2Te_3$ pseudobinary material, an Sb—Te eutectic material, and a Ge—Sb eutectic material. These materials are phase-change recording materials having a high crystallization speed, a large optical change and a high crystallization temperature in combination. The crystallization speed is defined herein as a relative speed at which the transition from an amorphous phase to a crystalline phase occurs. The optical change is defined herein as the difference between the complex refractive index in a crystalline phase and the complex refractive index in an amorphous phase. The crystallization temperature is defined herein as a temperature at which the transition from the amorphous phase to the crystalline phase occurs.

The GeTe—$Sb_2Te_3$ pseudobinary material contains GeTe that contains Ge and Te at 1:1, and $Sb_2Te_3$ that contains Sb and Te at 2:3. The crystalline structure thereof is a rock salt structure. Since the rock salt structure is highly symmetric, the time required for the reversible phase transition between an amorphous phase and a crystalline phase is shortened, that is, the crystallization speed is high. The more $Sb_2Te_3$ is present, the more the crystallization speed increases relatively. In terms of the composition ratio (atom %) using x (where x satisfies 0<x<100), the GeTe—$Sb_2Te_3$ pseudobinary material can be expressed as $(Ge_{0.5}Te_{0.5})\times(Sb_{0.4}Te_{0.6})_{100-x}$. Because of the large optical change of GeTe, if x<80, that is, the content of Ge falls below 40 atom % in this formula, there may be a case where sufficient optical change cannot be obtained with respect to the blue-violet laser having a wavelength of about 405 nm, so that a sufficient signal quality cannot be obtained. Further, if 96<x, that is, the content of Ge exceeds 48%, there may be a case where the crystallization speed is insufficient, so that a sufficient rewriting performance cannot be obtained. Accordingly, in the case where information is recorded or reproduced using an optical system with NA>1, the concentration of Ge in the GeTe—$Sb_2Te_3$ pseudobinary material is preferably at least 40 atom % but not more than 48 atom %.

The GeTe—$Bi_2Te_3$ pseudobinary material contains GeTe that contains Ge and Te at 1:1, and $Bi_2Te_3$ that contains Bi and Te at 2:3. The crystalline structure thereof is a rock salt structure in the same manner. $Bi_2Te_3$ is still easier to crystallize than $Sb_2Te_3$, and therefore the GeTe—$Bi_2Te_3$ pseudobinary material has a higher crystallization speed than the GeTe—$Sb_2Te_3$ pseudobinary material. The more $Bi_2Te_3$ is present, the more the crystallization speed increases relatively. In terms of the composition ratio (atom %) using y (where y satisfies 0<y<100), the GeTe—$Bi_2Te_3$ pseudobinary material can be expressed as $(Ge_{0.5}Te_{0.5})_y(Bi_{0.4}Te_{0.6})_{100-y}$. Similarly to the above-mentioned case, if the content of Ge falls below 40 atom %, there may be a case where a sufficient signal quality cannot be obtained. Further, the higher the crystallization speed is, the wider the Ge concentration range. Thus, if 99<y, that is, the content of Ge exceeds 49.5%, there may be a case where the crystallization speed is insufficient, so that a sufficient rewriting performance cannot be obtained. Accordingly, in the case where information is recorded or reproduced using an optical system with NA>1, the concentration of Ge in the GeTe—$Bi_2Te_3$ pseudobinary material is preferably at least 40 atom % but not more than 49.5 atom %.

In the case of using the GeTe—$Sb_2Te_3$ pseudobinary material, and the GeTe—$Bi_2Te_3$ pseudobinary material, a part of Ge may be substituted by Sn for adjusting the crystallization speed or enhancing the archival overwrite characteristics. Alternatively, the GeTe—$Sb_2Te_3$ pseudobinary material or the GeTe—$Bi_2Te_3$ pseudobinary material may be stacked on $Sn_{50}Te_{50}$ or $Ge_aSn_{50-a}Te_{50}$, thereby forming the recording layer 115. Further, in order to enhance the archival characteristics, a part of Sb or Bi may be substituted by at least one of Al, Ga, and In, or the recording layer 115 may be formed by stacking the GeTe—$Sb_2Te_3$ pseudobinary material or the GeTe—$Bi_2Te_3$ pseudobinary material on $Al_2Te_3$, $Ga_2Te_3$ or $In_2Te_3$. Alternatively, the GeTe—$Sb_2Te_3$ pseudobinary material and the GeTe—$Bi_2Te_3$ pseudobinary material may be mixed so as to be used as a GeTe—$Sb_2Te_3$—$Bi_2Te_3$ material, or the GeTe—$Sb_2Te_3$ pseudobinary material and the GeTe—$Bi_2Te_3$ pseudobinary material may be stacked to be used. These effective factors may be used in combination.

The Sb composition ratio of the Sb—Te eutectic material can be determined arbitrarily within an appropriate composition range, and the Sb—Te eutectic material has a high crystallization speed as well as a high crystallization temperature. Although Sb by itself has such a high crystallinity that it crystallizes in a thin film state even at room temperature, the archival characteristics are poor and the optical change is small. Therefore, Te preferably is added thereto for use. In order to obtain a good recording/reproducing performance with respect to a blue-violet laser with a wavelength of about 405 nm, the Sb concentration is preferably 60 atom % or more. If the Sb concentration falls below 60 atom %, the crystallization speed is insufficient, so that a sufficient rewriting performance cannot be obtained. Further, if the Sb concentration exceeds 90 atom %, the archival characteristics decrease. Moreover, at least one of Ag, In and Ge may be added thereto at a composition ratio of 10 atom % or less, in order to increase the crystallization temperature or to ensure the archival characteristics. Alternatively, at least one of B, C, Si and Zn may be added thereto at a composition ratio of 10 atom % or less in order to ensure the archival overwrite characteristics. These effective factors may be used in combination. When z1 and z2 respectively are the composition ratio (atom %) of Sb and Sb—Te eutectic material, the Sb—Te eutectic material can be expressed as $(Sb_{z1}Te_{1-z1})_{z2}M_{100-z2}$. M denotes at least one of Ag, In, N, Ge, B, C, Si and Zn. In the case where information is recorded or reproduced using an optical system with NA>1, the following conditions preferably are satisfied: $0.6 \leq z1 \leq 0.9$, and $80 \leq z2 \leq 100$.

The Sb composition ratio of the Ge—Sb eutectic material also can be determined arbitrarily within an appropriate composition range, and the Ge—Sb eutectic material has a high crystallization speed as well as a high crystallization temperature. Although Sb by itself has such a high crystallinity that it crystallizes in a thin film state even at room temperature, the archival characteristics are poor and the optical change is small. Therefore, Ge preferably is added thereto for use. The Ge—Sb eutectic material has a relatively higher crystallization speed and crystallization temperature than the Sb—Te eutectic material, and thus the archival characteristics are excellent. In order to obtain a good recording/reproducing performance with respect to a blue-violet laser with a wavelength of about 405 nm, the Sb concentration is preferably 60 atom % or more. If the Sb concentration falls below 60 atom %, there may be a case where the crystallization speed is insufficient, so that a sufficient rewriting performance cannot be obtained. Further, if the Sb concentration exceeds 90 atom %, there may be a case where the archival characteristics decrease. Moreover, at least one of Ag, In, Te, B, C, Si and Zn may be added thereto at a composition ratio of 15 atom % or less, in order to increase the optical change or adjust the crystallization speed. When z3 and z4 respectively are the composition ratio (atom %) of Sb and Ge—Sb eutectic material, the Ge—Sb eutectic material can be expressed as $(Sb_{z3}Ge_{1-z3})_{z4}M_{100-z4}$. M denotes at least one of Ag, In, N, Ge, B, C, Si and Zn. In the case where information is recorded or reproduced using an optical system with NA>1, the following conditions preferably are satisfied: $0.6 \leq z3 \leq 0.9$, and $80 \leq z4 \leq 100$.

The above-mentioned composition of the recording layer 115 can be analyzed by, for example, a high frequency inductively coupled plasma (ICP) emission spectrometry, an X-ray microanalyzer (XMA), and an electron probe microanalyzer (EPMA). In the case of containing a light element, such as C and B, the XMA or the EPMA is suitable.

The recording layer 115 formed by sputtering may unavoidably contain rare gases (Ar, Kr, and Xe), moisture (O—H), an organic matter (C), and air (N and O) present in the sputtering atmosphere, components (metal) of a jig placed in the sputtering chamber, impurities contained in the sputtering target (metal, semimetal, a semiconductor, and a dielectric matter), etc., which are detected by an analysis of the ICP emission spectrometry, the XMA, the EPMA or the like in some cases. These other components may be contained at most 10 atom % in total assuming that the total of all atoms contained in the recording layer is 100 atom %, as long as the components other than the other components satisfy the aforementioned preferable composition ratios. This applies also to recording layers 215, 225, 315, 325, 335, 415, 425, 435 and 445 to be described in embodiments below.

Preferably, the recording layer 115 of the present invention has a thickness of 15 nm or less. If the thickness of the recording layer 115 is 15 nm or less, the recording layer 115 can obtain good recording/erasing properties with a capacity of 90 GB or more in the structure of the information recording medium 100 using an optical system with NA>1. If the thickness of the recording layer 115 exceeds 15 nm, the heat capacity is increased and the laser power needed for recording increases. Also, it becomes difficult to diffuse the heat generated in the recording layer 115 toward the reflective layer 112, and to form small recording marks necessary for high density recording. Further, if the thickness falls below 6 nm, the reflectance Ra increases and the reflectance ratio Rc/Ra decreases, thereby making it difficult to obtain good read-out signals. Accordingly, the thickness is preferably at least 6 nm but not more than 15 nm.

The dielectric layer 117 and dielectric layer 118 of this embodiment each have a function of adjusting the Rc and Ra of the information layer 110. Since two or more dielectric layers with a different refractive index are provided on the laser beam 10 incident side, even if the refractive index n of the transparent layer 102 is high, Rc/Ra to be obtained remains high. In this case, when the refractive index of the dielectric layer 117 is $n_a$ and the refractive index of the dielectric layer 118 is $n_b$, the materials of the dielectric layer 117 and the dielectric layer 118 each are select so that the relationship expressed as $n_b<n<n_a$ is satisfied. Since the refractive index n of the transparent layer 102 in this embodiment is 1.75 or more, a dielectric material having a refractive index of less than 1.75 is selected as the material of the dielectric layer 118. On the other hand, a dielectric material at least having a refractive index of more than 1.75 is selected as the material of the dielectric layer 117, though this is determined in relation to the refractive index n of the transparent layer 102.

The dielectric layer 118 satisfying $n_b<1.75$ preferably contains at least one selected from materials expressed as $Al_2O_3$, BN, $CeF_3$, $LaF_3$, $MgF_2$, MgO, $MgSiO_3$, $Si_3N_4$, $SiO_2$, $YF_3$, $ZrSiO_4$, $Al_6Si_2O_{13}$ and $Al_4SiO_8$.

Examples of the material to be used include $Al_2O_3$, $Al_2O_3$—BN, $Al_2O_3$—$CeF_3$, $Al_2O_3$—$LaF_3$, $Al_2O_3$—$MgF_2$, $Al_2O_3$—MgO, $Al_2O_3$—$MgSiO_3$, $Al_2O_3$—$Si_3N_4$, $Al_2O_3$—$SiO_2$, $Al_2O_3$—$YF_3$, $Al_2O_3$—$ZrSiO_4$, BN, BN—$CeF_3$, BN—$LaF_3$, BN—$MgF_2$, BN—MgO, BN—$MgSiO_3$, BN—$Si_3N_4$, BN—$SiO_2$, BN—$YF_3$, BN—$ZrSiO_4$, $CeF_3$, $CeF_3$—$LaF_3$, $CeF_3$—$MgF_2$, $CeF_3$—MgO, $CeF_3$—$MgSiO_3$, $CeF_3$—$Si_3N_4$, $CeF_3$—$SiO_2$, $CeF_3$—$YF_3$, $CeF_3$—$ZrSiO_4$, $LaF_3$, $LaF_3$—$MgF_2$, $LaF_3$—MgO, $LaF_3$—$MgSiO_3$, $LaF_3$—$Si_3N_4$, $LaF_3$—$SiO_2$, $LaF_3$—$YF_3$, $LaF_3$—$ZrSiO_4$, $MgF_2$, $MgF_2$—MgO, $MgF_2$—$MgSiO_3$, $MgF_2$—$Si_3N_4$, $MgF_2$—$SiO_2$, $MgF_2$—$YF_3$, $MgF_2$—$ZrSiO_4$, MgO, MgO—$MgSiO_3$, MgO—$Si_3N_4$, MgO—$SiO_2$, MgO-$YF_3$, MgO—$ZrSiO_4$, $MgSiO_3$, $MgSiO_3$—$Si_3N_4$, $MgSiO_3$—$SiO_2$, $MgSiO_3$—$YF_3$, $MgSiO_3$—$ZrSiO_4$, $Si_3N_4$, $Si_3N_4$—$SiO_2$, $Si_3N_4$—$YF_3$, $Si_3N_4$—$ZrSiO_4$, $SiO_2$, $SiO_2$—$YF_3$, $SiO_2$—$ZrSiO_4$, $YF_3$, $YF_3$—$ZrSiO_4$, and $ZrSiO_4$. An arbitrary composition ratio may be selected in any case.

The dielectric layer 117 satisfying $1.75<n_a$ preferably contains at least one selected from materials expressed as AlN (refractive index: 2.15), $Al_2TiO_5$ (refractive index: 1.93), $Bi_2O_3$ (refractive index: 2.76), $CeO_2$ (refractive index: 2.65), $Cr_2O_3$ (refractive index: 2.67), $Dy_2O_3$ (refractive index: 2.05), $Ga_2O_3$ (refractive index: 1.93), $HfO_2$ (refractive index: 2.14), $In_2O_3$ (refractive index: 2.12), $Nb_2O_5$ (refractive index: 2.47), $Sb_2O_3$ (refractive index: 2.15), $Si_3N_4$ (refractive index: 2.01), $SnO_2$ (refractive index: 2.22), $Ta_2O_5$ (refractive index: 2.20), $TeO_2$ (refractive index: 2.26), $TiO_2$ (refractive index: 2.62), $WO_3$ (refractive index: 2.48), $Y_2O_3$ (refractive index: 1.96), ZnO (refractive index: 2.18), ZnS (refractive index: 2.42), ZnS—$SiO_2$ (refractive index: 2.23) and $ZrO_2$ (refractive index: 2.18).

Examples of the material to be used include MN, AlN—$Bi_2O_3$, AlN—$CeO_2$, AlN—$Dy_2O_3$, AlN—$Ga_2O_3$, AlN—$HfO_2$, AlN—$In_2O_3$, AlN—$Nb_2O_5$, AlN—$Sb_2O_3$, AlN—$Si_3N_4$, AlN—$SnO_2$, AlN—$Ta_2O_5$, AlN—$TeO_2$, AlN—$TiO_2$, AlN-$WO_3$, AlN-$Y_2O_3$, AlN—ZnO, AlN—ZnS—$SiO_2$, AlN—$ZrO_2$, $Bi_2O_3$, $Bi_2O_3$—$CeO_2$, $Bi_2O_3$—$Dy_2O_3$, $Bi_2O_3$—$Ga_2O_3$, $Bi_2O_3$—$HfO_2$, $Bi_2O_3$—$In_2O_3$, $Bi_2O_3$—$Nb_2O_5$, $Bi_2O_3$—$Sb_2O_3$, $Bi_2O_3$—$Si_3N_4$, $Bi_2O_3$—$SnO_2$, $Bi_2O_3$—$Ta_2O_5$, $Bi_2O_3$—$TeO_2$, $Bi_2O_3$—$TiO_2$, $Bi_2O_3$—WO3, $Bi_2O_3$—$Y_2O_3$, $Bi_2O_3$—ZnO, $Bi_2O_3$—ZnS—$SiO_2$, $Bi_2O_3$—$ZrO_2$, $CeO_2$, $CeO_2$—$Dy_2O_3$, $CeO_2$—$Ga_2O_3$, $CeO_2$—$HfO_2$, $CeO_2$—$In_2O_3$, $CeO_2$—$Nb_2O_5$, $CeO_2$—$Sb_2O_3$, $CeO_2$—$Si_3N_4$, $CeO_2$—$SnO_2$, $CeO_2$—$Ta_2O_5$, $CeO_2$—$TeO_2$, $CeO_2$—$TiO_2$, $CeO_2$—$WO_3$, $CeO_2$—$Y_2O_3$, $CeO_2$—ZnO, $CeO_2$—ZnS—$SiO_2$, $CeO_2$—$ZrO_2$, $Dy_2O_3$, $Dy_2O_3$—$Ga_2O_3$, $Dy_2O_3$—$HfO_2$, $Dy_2O_3$—$In_2O_3$, $Dy_2O_3$—$Nb_2O_5$, $Dy_2O_3$—$Sb_2O_3$, $Dy_2O_3$—$Si_3N_4$, $Dy_2O_3$—$SnO_2$, $Dy_2O_3$—$Ta_2O_5$, $Dy_2O_3$—$TeO_2$, $Dy_2O_3$—$TiO_2$, $Dy_2O_3$—$WO_3$, $Dy_2O_3$—$Y_2O_3$, $Dy_2O_3$—ZnO, $Dy_2O_3$—ZnS—$SiO_2$, $Dy_2O_3$—$ZrO_2$, $Ga_2O_3$, $Ga_2O_3$—$HfO_2$, $Ga_2O_3$—$In_2O_3$, $Ga_2O_3$—$Nb_2O_5$, $Ga_2O_3$—$Sb_2O_3$, $Ga_2O_3$—$Si_3N_4$, $Ga_2O_3$—$SnO_2$, $Ga_2O_3$—$Ta_2O_5$, $Ga_2O_3$—$TeO_2$, $Ga_2O_3$—$TiO_2$, $Ga_2O_3$—$WO_3$, $Ga_2O_3$—$Y_2O_3$, $Ga_2O_3$—ZnO, $Ga_2O_3$—ZnS—$SiO_2$, $Ga_2O_3$—$ZrO_2$, $HfO_2$, $HfO_2$—$In_2O_3$, $HfO_2$—$Nb_2O_5$, $HfO_2$—$Sb_2O_3$, $HfO_2$—$Si_3N_4$, $HfO_2$—$SnO_2$, $HfO_2$—$Ta_2O_5$, $HfO_2$—$TeO_2$, $HfO_2$—$TiO_2$, $HfO_2$—$WO_3$, $HfO_2$—$Y_2O_3$, $HfO_2$—ZnO, $HfO_2$—ZnS—$SiO_2$, $HfO_2$—$ZrO_2$, $In_2O_3$, $In_2O_3$—$Nb_2O_5$, $In_2O_3$—$Sb_2O_3$, $In_2O_3$—$Si_3N_4$, $In_2O_3$—$SnO_2$, $In_2O_3$—$Ta_2O_5$, $In_2O_3$—$TeO_2$, $In_2O_3$—$TiO_2$, $In_2O_3$—$WO_3$, $In_2O_3$—$Y_2O_3$, $In_2O_3$—ZnO, $In_2O_3$—ZnS—$SiO_2$, $In_2O_3$—$ZrO_2$, $Nb_2O_5$, $Nb_2O_5$—$Sb_2O_3$, $Nb_2O_5$—$Si_3N_4$, $Nb_2O_5$—$SnO_2$, $Nb_2O_5$—$Ta_2O_5$, $Nb_2O_5$—$TeO_2$, $Nb_2O_5$—$TiO_2$, $Nb_2O_5$—$WO_3$, $Nb_2O_5$—$Y_2O_3$, $Nb_2O_5$—ZnO, $Nb_2O_5$—ZnS—$SiO_2$, $Nb_2O_5$—$ZrO_2$, $Sb_2O_3$, $Sb_2O_3$—$Si_3N_4$, $Sb_2O_3$—$SnO_2$, $Sb_2O_3$—$Ta_2O_5$, $Sb_2O_3$—$TeO_2$, $Sb_2O_3$—$TiO_2$, $Sb_2O_3$—$WO_3$, $Sb_2O_3$—$Y_2O_3$, $Sb_2O_3$—ZnO, $Sb_2O_3$—ZnS—$SiO_2$, $Sb_2O_3$—$ZrO_2$, $Si_3N_4$, $Si_3N_4$—$SnO_2$, $Si_3N_4$—$Ta_2O_5$, $Si_3N_4$—$TeO_2$, $Si_3N_4$—$TiO_2$, $Si_3N_4$—$WO_3$, $Si_3N_4$—$Y_2O_3$, $Si_3N_4$—ZnO, $Si_3N_4$—ZnS—$SiO_2$, $Si_3N_4$—$ZrO_2$, $SnO_2$, $SnO_2$—$Ta_2O_5$, $SnO_2$—$TeO_2$, $SnO_2$—$TiO_2$, $SnO_2$—$WO_3$, $SnO_2$—$Y_2O_3$, $SnO_2$—ZnO, $SnO_2$—ZnS—$SiO_2$, $SnO_2$—$ZrO_2$, $Ta_2O_5$, $Ta_2O_5$—$TeO_2$, $Ta_2O_5$—$TiO_2$, $Ta_2O_5$—$WO_3$, $Ta_2O_5$—$Y_2O_3$, $Ta_2O_5$—ZnO, $Ta_2O_5$—ZnS—$SiO_2$, $Ta_2O_5$—$ZrO_2$, $TeO_2$, $TeO_2$—$TiO_2$, $TeO_2$—$WO_3$, $TeO_2$—$Y_2O_3$, $TeO_2$—ZnO, $TeO_2$—ZnS—$SiO_2$, $TeO_2$—$ZrO_2$, $TiO_2$, $TiO_2$—$WO_3$, $TiO_2$—$Y_2O_3$, $TiO_2$—ZnO, $TiO_2$—ZnS—$SiO_2$, $TiO_2$—$ZrO_2$, $WO_3$, $WO_3$—$Y_2O_3$, $WO_3$—ZnO, $WO_3$—ZnS—$SiO_2$, $WO_3$—$ZrO_2$, $Y_2O_3$, $Y_2O_3$—ZnO, $Y_2O_3$—ZnS—$SiO_2$, $Y_2O_3$—$ZrO_2$, ZnO, ZnO—ZnS—$SiO_2$, ZnO—$ZrO_2$, ZnS—$SiO_2$, ZnS—$SiO_2$—$ZrO_2$, and $ZrO_2$. A partially-stabilized zirconia or a stabilized zirconia obtained by adding any one of CaO, MgO, $Y_2O_3$ to $ZrO_2$ to substitute for a part of $ZrO_2$ may be used for at least a part of $ZrO_2$ or the material containing $ZrO_2$. Alternatively, among the materials of the interface layer 114 and the interface layer 116 in this embodiment, a material having a refractive index of more than 1.75 may be used. An arbitrary composition ratio may be selected in any case.

When the thickness of the dielectric layer 117 is $d_a$ and the thickness of the dielectric layer 118 is $d_b$, $d_a$ is preferably at least $6\lambda/(64n_a)$ but not more than $18\lambda/(64n_a)$, more preferably at least $10\lambda/(64n_a)$ but not more than $16\lambda/(64n_a)$. That is, it is preferably at least 13 nm but not more than 63 nm, more preferably at least 22 nm but not more than 56 nm. In this regard, $d_b$ is preferably at least $\lambda/(64n_a)$ but not more than $32\lambda/(64n_a)$. That is, it is preferably at least 3 nm but not more than 137 nm, which means that a wide film thickness range can be set. In this film thickness range, good optical properties can be achieved. Considering the ease of production, the film thickness is preferably smaller.

Subsequently, the method for producing the information recording medium 100 of Embodiment 1 is described. The information recording medium 100 is produced as follows. The substrate 101 formed with guide grooves (groove surfaces and land surfaces) is set in a sputtering apparatus. On the surface of the substrate 101 formed with the guide grooves, the steps of forming the reflective layer 112, forming the dielectric layer 113, forming the interface layer 114, forming the recording layer 115, forming the interface layer 116, forming the dielectric layer 117 and forming the dielectric layer 118 are performed sequentially, and thereafter, the step of forming the transparent layer 102 on the surface of the dielectric layer 118 is performed.

Figure 5:
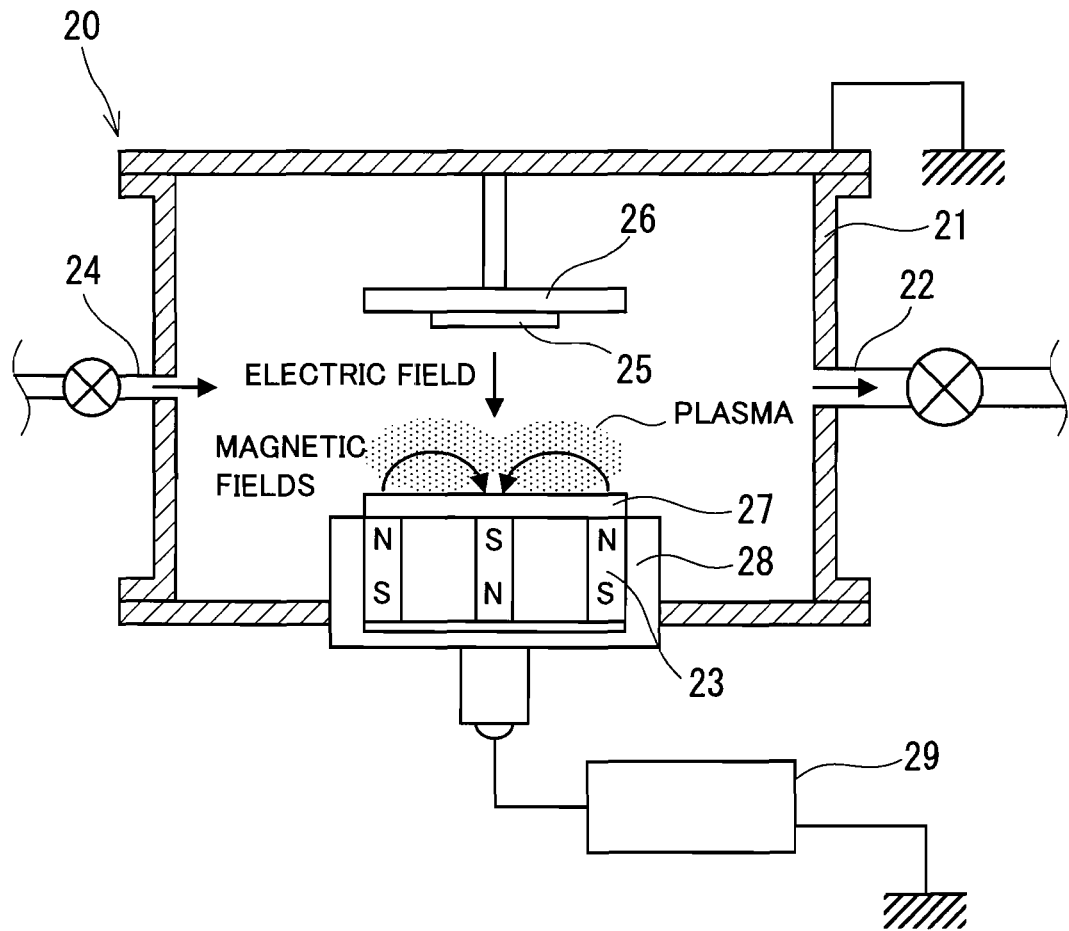
FIG. 5 is a schematic diagram indicating an example of a sputtering apparatus to be used for producing the information recording medium of the present invention.

Here, an example of the sputtering (film forming) apparatus for producing the information recording medium is described. FIG. 5 indicates an example of a direct current (DC) magnetron sputtering apparatus 20. A vacuum pump is connected to a gas outlet 22 so as to maintain the inside of a sputtering chamber 21 under high vacuum. A gas cylinder (for example, Ar gas) is connected to a sputtering gas inlet 24 so that a constant flow rate of a sputtering gas (for example, Ar gas) is introduced therefrom. A substrate 25 is attached to a substrate holder (anode) 26, and a sputtering target (cathode) 27 is fixed to a sputtering target electrode 28 to be connected to a direct current power source 29. Applying high voltage between the two electrodes causes a glow discharge, and accelerates, for example, Ar positive ions to make them collide with the sputtering target 27. Thus, sputtering occurs. The sputtered particles deposit on the substrate 25 so as to form a thin film. In magnetron sputtering, a permanent magnet 23 disposed on the rear side of the sputtering target 27 generates a magnetic field on the front side of the sputtering target 27, and plasma is focused most to an area where the magnetic field line intersects perpendicularly with the electric field line. Thus, more particles are sputtered. During the sputtering, for example, water is circulated in the electrode 28 for cooling the sputtering target 27.

Depending on the type of the power to be applied to the cathode, sputtering apparatuses can be separated into direct current type and high frequency (RF) type. In the RF magnetron sputtering apparatus, instead of the direct current power source 29, an impedance matching circuit and a high frequency power source are connected to the cathode. The sputtering apparatus 20 may include a plurality of DC power sources and RF power sources. In that case, a plurality of the sputtering chambers 21 may be connected to each other, or a plurality of power sources may be disposed in the sputtering chamber 21. Such a configuration forms a multilayer film by performing a plurality of film forming steps. For the sputtering described in the following embodiments, a similar apparatus can be used, and the substrates 101, 201, 301, and 401 can be used as the substrate 25.

In this description including the following description, the "surface" of each layer means an exposed surface (surface perpendicular to the thickness direction) at the time of the formation of the layer, unless otherwise specified.

First, the step of forming the reflective layer 112 on the surface of the substrate 101 formed with guide grooves is performed. The reflective layer 112 is formed by sputtering a target containing metal or alloy constituting the reflective layer 112. The sputtering may be performed using a direct current power source or a high frequency power source in a rare gas atmosphere or a mixed gas atmosphere of a rare gas and oxygen gas and/or nitrogen gas. Any of Ar gas, Kr gas, and Xe gas may be used as the rare gas.

Examples of the sputtering target to be used for forming the reflective layer 112 include Ag, Ag—Pd, Ag—Cu, Ag—Pd—Cu, Ag—In, Ag—Sn, Ag—In—Sn, Ag—Bi, Ag—Mg, Ag—Ca, Ag—Ga, and Ag—Ga—Cu. Alternatively, other Ag alloys or mixtures containing Ag may be used as the sputtering target. Depending on the sputtering apparatus, the composition of the sputtering target may not match the composition of the reflective layer to be formed. In this case, by adjusting the composition of the sputtering target, the reflective layer 112 with a desired composition can be obtained. A sputtering target obtained by melting powder and alloying it followed by hardening, a sputtering target obtained by hardening powder at high temperature and high pressure, or the like may be used, regardless of the production method.

Next, the step of forming the dielectric layer 113 on the surface of the reflective layer 112 is performed. The dielectric layer 113 also is formed by sputtering a target containing an element, a mixture or a compound constituting the dielectric layer 113. The sputtering may be performed using a high frequency power source in a rare gas atmosphere or a mixed gas atmosphere of a rare gas and oxygen gas and/or nitrogen gas. If possible, a direct current power source or a pulse direct current power source may be used. Any of Ar gas, Kr gas, and Xe gas may be used as the rare gas.

As the sputtering target for forming the dielectric layer 113, oxides, sulfides, nitrides, carbides, fluorides, and a mixture of these can be used. The material and the composition of the sputtering target are determined so as to form the material of the dielectric layer 113. Depending on the sputtering apparatus, the composition of the sputtering target may not match the composition of the dielectric layer to be formed. In this case, by adjusting the composition of the sputtering target, the dielectric layer 113 with a desired composition can be obtained. In the case of forming a dielectric layer containing an oxide, there may be a deficiency of oxygen during the sputtering. Therefore, a sputtering target that can suppress the occurrence of oxygen deficiency may be used, or the sputtering may be performed in a mixed atmosphere of a rare gas with a small amount of oxygen gas at 10% or less. Alternatively, the dielectric layer 113 may be formed by reactive sputtering using a target made of metal, semimetal, or semiconductor in a mixed atmosphere of a rare gas with an excess amount of oxygen gas and/or nitrogen gas at 10% or more.

Alternatively, the dielectric layer 113 may be formed by sputtering targets of each single compound at the same time, using a plurality of the power sources. The dielectric layer 113 also may be formed by sputtering targets each composed of at least two compounds such as a binary target and a ternary target at the same time, using a plurality of the power sources. Even when using such a target, the sputtering may be performed in a rare gas atmosphere or a mixed gas atmosphere of a rare gas and oxygen gas and/or nitrogen gas.

Next, the step of forming the interface layer 114 of the present invention on the surface of the dielectric layer 113 is performed. The interface layer 114 also is formed by sputtering a target containing an element, a mixture, or a compound constituting the interface layer 114. The sputtering may be performed using the high frequency power source in a rare gas atmosphere or a mixed gas atmosphere of a rare gas and oxygen gas and/or nitrogen gas. If possible, a direct current power source or a pulse direct current power source may be used. Any of Ar gas, Kr gas, and Xe gas may be used as the rare gas.

As the sputtering target for forming the interface layer 114, a sputtering target containing at least one selected from Zr—O and Hf—O can be used. Further, a sputtering target containing at least one selected from In—O, Ga—O, Cr—O, and Si—O can be used. Alternatively, a sputtering target containing at least one selected from materials expressed as $ZrO_2$ and $HfO_2$ can be used. Further, a sputtering target containing at least one selected from materials expressed as $In_2O_3$, $Ga_2O_3$, $Cr_2O_3$ and $SiO_2$ can be used.

The material and the composition of the sputtering target are determined so as to form the material of the interface layer 114. Depending on the sputtering apparatus, the composition of the sputtering target may not match the composition of the interface layer to be formed. In this case, by adjusting the composition of the sputtering target, the interface layer 114 with a desired composition can be obtained. In the case of forming an interface layer containing an oxide, there may be a deficiency of oxygen during the sputtering. Therefore, a sputtering target that can suppress the occurrence of oxygen deficiency may be used, or the sputtering may be performed in a mixed atmosphere of a rare gas with a small amount of oxygen gas at 10% or less.

Alternatively, the interface layer may be formed by reactive sputtering using a target made of metal, semimetal, or semiconductor in a mixed atmosphere of a rare gas with an excess amount of oxygen gas and/or nitrogen gas at 10% or more.

Alternatively, the interface layer 114 may be formed by sputtering targets of each single compound at the same time, using a plurality of the power sources. The interface layer 114 also may be formed by sputtering targets each composed of at least two compounds such as a binary target and a ternary target at the same time, using a plurality of the power sources. Even when using such a target, the sputtering may be performed in a rare gas atmosphere or a mixed gas atmosphere of a rare gas and oxygen gas and/or nitrogen gas.

Next, the step of forming the recording layer 115 of the present invention on the surface of the interface layer 114 is performed. In the case of forming the recording layer 115 containing Ge—Te, a target containing Ge—Te is sputtered. In the case of forming the recording layer 115 containing a GeTe—$Sb_2Te_3$ pseudobinary material, a target containing Ge—Sb—Te is sputtered. In the case of forming the recording layer 115 containing a GeTe—Bi$_2$Te$_3$ pseudobinary material, a target containing Ge—Bi—Te is sputtered. In the case of forming the recording layer 115 containing an Sb—Te eutectic material, a target containing Sb—Te is sputtered. In the case of forming the recording layer 115 containing a Ge—Sb eutectic material, a target containing Ge—Sb is sputtered. In any case, the sputtering is performed using a direct current power source in a rare gas atmosphere, thereby forming a film. Alternatively, a high frequency power source or a pulse direct current power source may be used. Any of Ar gas, Kr gas, and Xe gas may be used as the rare gas. Furthermore, in the case of the recording layer 115 containing N and/or O, the recording layer 115 may be formed by reactive sputtering in a mixed gas atmosphere of a rare gas and oxygen gas and/or nitrogen gas.

Next, the step of forming the interface layer 116 on the surface of the recording layer 115 is performed. The interface layer 116 may be produced by the same method as the interface layer 114.

Next, the step of forming the dielectric layer 117 on the surface of the interface layer 116 is performed. The dielectric layer 117 also is formed by sputtering a target containing an element, a mixture or a compound constituting the dielectric layer 117. As the sputtering target for forming the dielectric layer 117, a material containing at least one of Al—N, Bi—O, Ce—O, Dy—O, Ga—O, Hf—O, In—O, Nb—O, Sb—O, Si—N, Sn-o, Ta—O, Te—O, Ti—O, W—O, Y—O, Zn—O, Zn—S—Si—O and Zr—O may be used. The sputtering may be performed using a high frequency power source in a rare gas atmosphere or a mixed gas atmosphere of a rare gas and oxygen gas and/or nitrogen gas, in the same manner as in the dielectric layer 113. The reactive sputtering or the sputtering using a plurality of power sources at the same time may be used.

Subsequently, the step of forming the dielectric layer 118 on the surface of the dielectric layer 117 is performed. The dielectric layer 118 also is formed by sputtering a target containing an element, a mixture or a compound constituting the dielectric layer 118. As the sputtering target for forming the dielectric layer 118, a material containing at least one of Al—O, B—N, Ce—F, La—F, Mg—F, Mg—O, Mg—Si—O, Si—N, Si—O, Y—F and Zr—Si—O may be used. The sputtering may be performed using a high frequency power source in a rare gas atmosphere or a mixed gas atmosphere of a rare gas and oxygen gas and/or nitrogen gas, in the same manner as in the dielectric layer 113. The reactive sputtering or the sputtering using a plurality of power sources at the same time may be used. In this way, the information layer 110 is formed on the substrate 101.

Next, the step of forming the transparent layer 102 is described. After the formation of the dielectric layer 118, the substrate 101 on which the layers from the reflective layer 112 to the dielectric layer 118 have been stacked sequentially is taken out of the sputtering apparatus. Then, an ultraviolet curable resin obtained by adding fine particles to an acrylic resin is applied onto the surface of the dielectric layer 118 by, for example, spin coating. It is irradiated with ultraviolet light so that the resin is cured. Thus, the transparent layer 102 with a desired thickness can be formed. Alternatively, the transparent layer 102 can be formed also by applying an ultraviolet curable resin onto the surface of the dielectric layer 118 by spin coating, holding a disc-shaped sheet in close contact with the applied ultraviolet curable resin, and irradiating it with ultraviolet light from the sheet side for curing the resin. Alternatively, the transparent layer 102 can be formed also by holding a disc-shaped sheet having a adhesive layer in close contact with the surface of the dielectric layer 118.

The transparent layer 102 may be formed of a plurality of layers having different properties, and the transparent layer 102 may be formed after providing another transparent layer on the surface of the dielectric layer 118. Alternatively, after the formation of the transparent layer 102 on the surface of the dielectric layer 118, another transparent layer may be formed on the surface of the transparent layer 102. These plurality of transparent layers each may have a different viscosity, hardness, refractive index, and transparency. With that, the step of forming the transparent layer formation is completed.

After the completion of the transparent layer formation step, an initialization step is performed, as needed. In the initialization step, the recording layer 115 in an amorphous state is irradiated with, for example, a semiconductor laser and heated to the crystallization temperature or more so as to be crystallized. The initialization step can be performed favorably by optimizing the power of the semiconductor laser, the rotation speed of the information recording medium, the moving speed of the semiconductor laser in a diameter direction, the focal point of the laser and the like. The initialization step may be performed before the step of forming the transparent layer 102. In this way, the information recording medium 100 of Embodiment 1 can be produced by sequentially performing the steps from the step of forming the reflective layer 112 to the step of forming the transparent layer 102.

Although a sputtering method is used for forming each layer in this embodiment, the film formation method is not limited thereto. It also is possible to use a vacuum evaporation method, an ion plating method, a chemical vapor deposition (CVD) method, or a molecular beam epitaxy (MBE) method.

Embodiment 2

Figures 2A, 2B:
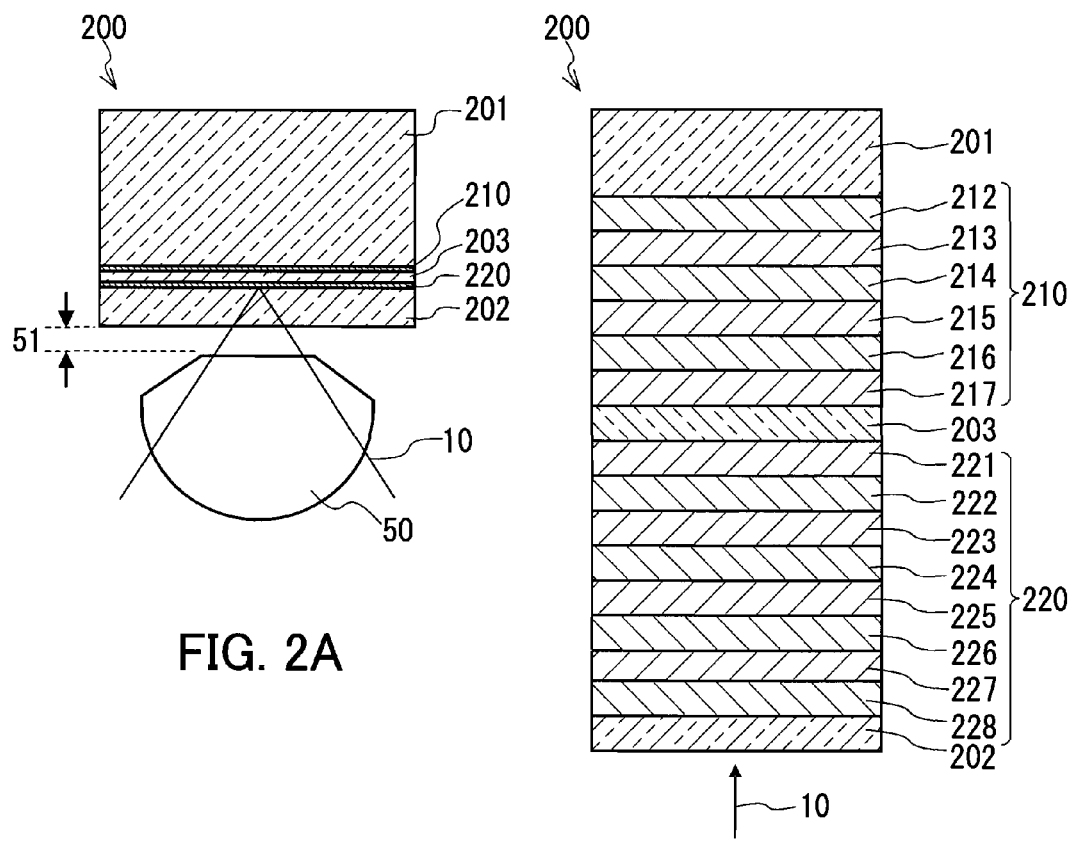
FIG. 2A is a partial sectional view indicating another embodiment of the information recording medium and the optical system of the present invention.
FIG. 2B is a detailed sectional view indicating the information recording medium indicated in FIG. 2A.

An example of an information recording medium and an optical system having a numerical aperture (NA)>1 is described as Embodiment 2 of the present invention. FIG. 2A indicates a partial section of the information recording medium 200 and the SIL 50. The information recording medium 200 includes two information layers. It is formed of a first information layer 210, an interlayer 203, a second information layer 220 and a transparent layer 202 that are disposed in this order on a substrate 201. The SIL 50 is disposed with the distance 51 between the emitting surface of the SIL 50 and the surface of the transparent layer 202. Also in this embodiment, the laser beam 10 emitted from the SIL 50 is incident through the transparent layer 202 to the first information layer 210, in which recording and reproduction are performed with the laser beam 10 that has passed through the second information layer 220.

The relationship between the SIL 50 and the transparent layer 202 is the same as the relationship between the SIL 50 and the transparent layer 102 in Embodiment 1. Further the distance 51 is preferably 50 nm or less, in the same manner as in Embodiment 1. The information recording medium 200 is capable of recording/reproducing information with about 180 GB capacity by combination of, for example, the SIL 50 with an effective NA=1.62 and the laser beam 10 with a wavelength of 405 nm.

Further, FIG. 2B indicates a partial section of the information recording medium 200 in detail. The first information layer 210 is formed of a reflective layer 212, a dielectric layer 213, an interface layer 214, a recording layer 215, an interface layer 216, and a dielectric layer 217 that are disposed in this order on one surface of the substrate 201. The second information layer 220 is formed of a dielectric layer 221, a reflective layer 222, a dielectric layer 223, an interface layer 224, a recording layer 225, an interface layer 226, a dielectric layer (dielectric layer a) 227 and a dielectric layer (dielectric layer b) 228 that are disposed in this order on one surface of the interlayer 203. In this embodiment, the second information layer 220 corresponds to the information layer that is a feature of the information recording medium of the present invention (hereinafter, which is referred to as the information layer of the present invention). The transparent layer 202 disposed adjacent to the second information layer 220 on the optical beam incident side with respect to the second information layer 220 corresponds to the "transparent layer made of a material that is transparent with respect to the optical beam" that is a feature of the information recording medium of the present invention.

Optically, it is preferable that the two information layers have about the same effective reflectance. This is achieved by adjusting the reflectance of the first information layer 210 and the transmittance of the second information layer 220. The effective reflectance is defined as the reflectance of the mirror surface of each information layer that is measured in a state where two information layers are stacked. Hereinafter, Rc and Ra thus measured respectively are referred to as effective Rc and effective Ra. This embodiment describes a structure that is designed so as to satisfy the following conditions: 5≦effective Rc and 4≦effective Rc/effective Ra. Similarly to Embodiment 1, Rc (%) denotes the reflectance of the information layer when the recording layer is in a crystalline phase, and Ra (%) denotes the reflectance of the information layer when the recording layer is in an amorphous phase. In the case where the second information layer 220 is designed so as to have an average transmittance (Tc+Ta)/2 of 50% or more, the first information layer 210 is designed so as to satisfy: 20≦Rc and 4≦Rc/Ra, and the second information layer 220 is designed so as to satisfy: 5≦Rc and 4≦Rc/Ra. Further, Tc (%) denotes the transmittance of the second information layer 220 when the recording layer 225 is in a crystalline phase, and Ta (%) denotes the transmittance of the second information layer 220 when the recording layer 225 is in an amorphous phase.

Hereinafter, descriptions will be given subsequently, starting from the structure of the first information layer 210. Detailed descriptions for the substrate 201 and the layers from the reflective layer 212 to the interface layer 216 of the first information layer 210 are the same as those for the substrate 101 and the layers from the reflective layer 112 to the interface layer 116 of the information layer 110 in the Embodiment 1, and thus are omitted. Further, detailed descriptions for the dielectric layer 217 is the same as those for the dielectric layer 113 of Embodiment 1, and thus are omitted.

The interlayer 203 has a function of separating the focal point of the laser beam 10 on the second information layer 220 from the focal point thereof on the first information layer 210, and may be formed with guide grooves for the second information layer 220, as needed. It is desirable that the interlayer 203 be transparent with respect to optical beam of wavelength λ with which the recording and reproduction are performed so that the laser beam 10 could reach the first information layer 210 efficiently. The interlayer 203 preferably has a thickness such that the distance between the recording layer 215 and the recording layer 225 is within the range where the SIL 50 can focus optical beam. Further, the distance from the surface of the transparent layer 202 to the recording layer 215 is preferably 10 μm or less. Accordingly, the thickness of the interlayer 203 is preferably 5 μm or less, more preferably 3 μm or less.

For the material of the interlayer 203, an acrylic resin to which $TiO_2$ fine particles or $ZrO_2$ fine particles are added may be used in the same manner as the material of the transparent layer 102 in Embodiment 1. The refractive index n of the interlayer 203 also is 1.75 or more, in the same manner as the refractive index of the transparent layer 102. Detailed description for the material is omitted, since it is the same as in the transparent layer 102. The interlayer 203 may be formed by stacking a plurality of resin layers, as needed. For example, a structure of two or more layers including a layer for protecting the dielectric layer 217 and a layer formed with guide grooves may be employed. Also in the case of the structure of two or more layers, the refractive index and the preferable thickness of the interlayer 203 are as described above.

Next, the structure of the second information layer 220 is described. The second information layer 220 is designed to have a high transmittance so that the laser beam 10 can reach the first information layer 210. Specifically, referring to the optical transmittance of the second information layer 220 when the recording layer 225 is in a crystalline phase as Tc (%), and the optical transmittance of the second information layer 220 when the recording layer 225 is in an amorphous phase as Ta (%), preferably, 45%≦(Ta+Tc)/2 is satisfied, and more preferably, 48%≦(Ta+Tc)/2 is satisfied.

The dielectric layer 221 has a function of enhancing the optical transmittance of the second information layer 220. Preferably, the material thereof is transparent and has a refractive index of 2.4 or more with respect to the laser beam 10 having a wavelength of 405 nm. When the refractive index of the dielectric layer 221 is low, while the reflectance ratio Rc/Ra of the second information layer 220 increases, the optical transmittance decreases. In order to achieve the reflectance ratio of 4 or more and the optical transmittance of 50% or more, the refractive index of the dielectric layer 221 is preferably 2.4 or more. Accordingly, if the refractive index is less than 2.4, there may be a case where the optical transmittance of the second information layer 220 decreases, and a sufficient amount of the laser beam 10 cannot reach the first information layer 210.

A material containing at least one selected from, for example, $ZrO_2$, $Nb_2O_5$, $Bi_2O_3$, $CeO_2$, $TiO_2$, and $WO_3$ may be used therefor. Above all, $TiO_2$ has a high refractive index of 2.7 and an excellent moisture resistance, which is preferably used. Alternatively, a material containing, in an amount of 50 mol % or more, at least one of $ZrO_2$, $Nb_2O_5$, $Bi_2O_3$, $CeO_2$, $TiO_2$, and $WO_3$ may be used therefor. For example, $(ZrO_2)_{80}(Cr_2O_3)_{20}$, $(Bi_2O_3)_{60}(SiO_2)_{40}$, $(Bi_2O_3)_{60}(TeO_2)_{40}$, $(CeO_2)_{50}(SnO_2)_{50}$, $(TiO_2)_{50}(HfO_2)_{50}$, $(WO3)_{75}(Y_2O_3)_{25}$, $(Nb_2O_5)_{50}(MnO)_{50}$, $(Al_2O_3)_{50}(TiO_2)_{50}$ or the like may be used. Alternatively, a mixed material containing at least two of $ZrO_2$, $Nb_2O_5$, $Bi_2O_3$, $CeO_2$, $TiO_2$, and $WO_3$ also may be used. For example, $Bi_2Ti_4O_{11}((TiO_2)_{80}(Bi_2O_3)_{20})$, $Bi_4Ti_3O_{12}((TiO_2)_{60}(Bi_2O_3)_{40})$, $Bi_{12}TiO_{20}$, $(WO_3)_{50}(Bi_2O_3)_{50}$, $(TiO_2)_{50}(Nb_2O_5)_{50}$, $(CeO_2)_{50}(TiO_2)_{50}$, $(ZrO_2)_{50}(TiO_2)_{50}$, $(WO3)_{67}(ZrO_2)_{33}$ or the like may be used. It should be noted that numerical subscripts in the above description for the material indicates mol %.

According to optical calculation, the transmittance of the second information layer 220 is the maximum when the dielectric layer 221 has a thickness of about $\lambda/(8n_3)$ (nm) (where λ denotes the wavelength of the laser beam 10, and $n_3$ denotes the refractive index of the dielectric layer 221). The reflectance contrast (Rc−Ra)/(Rc+Ra) is the maximum when the thickness of the dielectric layer 221 is in the range from $\lambda/(16n_3)$ to $\lambda/(4n_3)$. Accordingly, the thickness of the dielectric layer 221 can be selected so that the two are compatible, which is preferably 9 nm but not more than 42 nm, more preferably 10 nm but not more than 30 nm. It should be noted that the dielectric layer 221 may be formed of two or more layers.

The reflective layer 222 has a function of rapidly diffusing the heat of the recording layer 225. Further, as mentioned above, since the second information layer 220 has a high optical transmittance, a low optical absorption is desirable in the reflective layer 222. Accordingly, the material and the thickness of the reflective layer 222 are more limited, compared to those of the reflective layer 212. A design with a smaller thickness and a material having a lower extinction coefficient optically as well as a higher heat conductivity thermally are preferable.

Specifically, the reflective layer 222 preferably is made of Ag or an Ag alloy. Examples of the alloy material to be used include Ag—Pd, Ag—Pd—Cu, Ag—Ga, Ag—Ga—Cu, Ag—Cu, and Ag—In—Cu. Alternatively, Ag or Ag—Cu additionally including a rare earth metal may be used for the material. Above all, Ag—Pd—Cu, Ag—Ga—Cu, Ag—Cu, and Ag—In—Cu have a low optical absorption, a high heat conductivity, and an excellent moisture resistance, and therefore are preferable to use. The thickness is preferably at least 7 nm but not more than 20 nm, although it is adjusted depending on the thickness of the recording layer 225. The thickness less than 7 nm causes a decrease in the function of diffusing heat, resulting in a difficulty in forming marks on the recording layer 225. Further, the thickness more than 20 nm renders the optical transmittance of the second information layer 220 less than 45%.

The dielectric layer 223 has a function of adjusting Rc, Ra, Tc and Ta of the second information layer 220. Referring to the refractive index of the dielectric layer 223 as $n_4$, when the dielectric layer 223 has the thickness of at least $2\lambda/(64n_4)$ but not more than $12\lambda/(64n_4)$, the reflectance ratio Rc/Ra is high. Further, Tc and Ta increase as the dielectric layer 223 has a smaller thickness. A material with $n_4$ of 1.5 to 2.8 may be used as the material of the dielectric layer 223. Further, in order to keep the optical transmittance of the second information layer 220 from decreasing, the extinction coefficient of the dielectric layer 223 is preferably 0.2 or less, more preferably 0.1 or less. The material of the dielectric layer 223 may be selected from the materials of the dielectric layer 113 described in Embodiment 1. The thickness of the dielectric layer 223 is preferably at least 2 nm but not more than 25 nm.

The interface layer 224 and the interface layer 226 of the present invention have the same function as the interface layers 114 and 116 in Embodiment 1, and a preferable thickness thereof also is the same. The material to be used also may be the same. In the case without the dielectric layer 223, the interface layer 224 preferably has a thickness of at least 2 nm but not more than 35 nm, more preferably has an extinction coefficient of 0.1 or less.

The recording layer 225 in the information recording medium 200 of this embodiment can change its phase and contains at least one selected from Ge—Te, Sb—Te and Ge—Sb, and each element has the same function as in the recording layer 115 of Embodiment 1. Such a material enables the recording or reproduction with respect to the second information layer 220 using an optical system with NA>1. Further, as already has been described, since the second information layer 220 is required to have a high optical transmittance, the recording layer 225 has a smaller thickness than the recording layer 215 in average, which is preferably at least 4 nm but not more than 10 nm. If it exceeds 10 nm, the optical transmittance of the second information layer 220 decreases, and if it falls below 4 nm, Ra increases, so that it becomes difficult to ensure a high reflectance ratio when $5\% \leq Rc$. The material and the preferable composition thereof are the same as those of the recording layer 115 in Embodiment 1.

It should be noted that the recording layer in the information recording medium of the present invention may be included in at least one information layer. For example, as is the case of this embodiment, both of the recording layer 215 and the recording layer 225 may be the recording layer of the present invention, or while the recording layer 225 is the recording layer of the present invention, the recording layer 215 may be another rewritable recording layer. As another rewritable recording layer, a material containing Sb at 50% or more may be used. Examples thereof include Sb—Ga, Sb—In, Sb—N, Sb—B, Sb—Al, Sb—C, Sb—Si, Sb—Zn, Sb—Sn, and Sb—S. Further, the interface layer of the present invention may be included in at least one information layer. A structure where the recording layer 225 and the interface layer 226 are those of the present invention, and the recording layer 215 and interface layer 216 are made of other materials than those described in the present invention is possible. For example, a structure where the recording layer 215 is Sb—Te—Ge containing Sb at 50% or more and the interface layer 216 is ZnS—SiO$_2$ may be employed.

Alternatively, in the case where the recording layer 215 is the recording layer in the information recording medium of the present invention, the second information layer may be a read-only information layer or a write-once information layer. In contrast, in the case where the recording layer 225 is the recording layer in the information recording medium of the present invention, the first information layer may be a read-only information layer or a write-once information layer. In the write-once information layer, an oxide containing at least one of Te—O, Sb—O, Ge—O, Sn—O, In—O, Zn—O, Mo—O and W—O, a material obtained by stacking two or more layers followed by alloying or reaction at the time of recording, or an organic coloring matter recording material may be used as a recording layer. In the read-only information layer, a reflective layer made of a material containing at least one of metal elements, metal alloys, dielectrics, dielectric compounds, semiconductor elements, and semimetal elements may be formed on pre-formed recording pits. For example, a reflective layer containing Ag or an Ag alloy may be formed.

The dielectric layer 227 and the dielectric layer 228 of this embodiment have a function of adjusting Rc, Ra, Tc and Ta of the second information layer 220. By providing two or more dielectric layers each with a different refractive index on the laser beam 10 incident side, a high Rc/Ra ratio and high Ta and Tc can easily go together. The higher the refractive index n of the transparent layer 202 is, the easier the effect of this structure can be obtained. In this case, referring to the refractive index of the dielectric layer 227 as $n_a$ and the refractive index of the dielectric layer 228 as $n_b$, the materials of the dielectric layer 227 and the dielectric layer 228 are selected so as to satisfy a relationship expressed as $n_b<n<n_a$. The materials of the dielectric layer 227 and the dielectric layer 228 that satisfy the relationship are the same as those of the dielectric layer 117 and the dielectric layer 118 in Embodiment 1, respectively.

Referring to the thickness of the dielectric layer 227 as $d_a$ and the thickness of the dielectric layer 228 as $d_b$, $d_a$ is preferably at least $6\lambda/(64n_a)$ but not more than $18\lambda/(64n_a)$, more preferably at least $10\lambda/(64n_a)$ but not more than $16\lambda/(64n_a)$. That is, it is preferably at least 13 nm but not more than 63 nm, more preferably 22 nm but not more than 56 nm. Further, $d_b$ is preferably at least $\lambda/(64n_a)$ but not more than $32\lambda/(64n_a)$. That is, it is preferably at least 3 nm but not more than 137 nm, which means a wide film thickness range can be set. In this film thickness range, the following optical properties can be satisfied: $5\% \leq Rc$, $4 \leq Rc/Ra$ and $45\% \leq (Ta+Tc)/2$. Considering the ease of production, the film thickness is preferably smaller.

It should be noted that in the case where the interface layer 224 has the above-mentioned function as well as the above-mentioned conditions of the dielectric layer 223, the dielectric layer 223 is not necessarily provided. Similarly, in the case where the interface layer 226 has the above-mentioned function as well as the above-mentioned conditions of the dielectric layer 227, the dielectric layer 227 is not necessarily provided. For example, the second information layer 220 may have a structure formed, on the interlayer 203, of the dielectric layer 221, the reflective layer 222, the interface layer 224, the recording layer 225, the interface layer 226, the dielectric layer 227 and the dielectric layer 228 that are disposed in this order. Further, the second information layer 220 may have a structure also formed of the dielectric layer 221, the reflective layer 222, the interface layer 224, the recording layer 225, the interface layer 226 and the dielectric layer 228 that are disposed in this order, or may have a structure formed of the dielectric layer 221, the reflective layer 222, the dielectric layer 223, the interface layer 224, the recording layer 225, the interface layer 226 and the dielectric layer 228 that are disposed in this order. In this structure, the interface layer 226 functions as a dielectric layer a. The dielectric layer 223 and the dielectric layer 227 may be provided, as needed.

The transparent layer 202 has the same function as the transparent layer 102 in Embodiment 1, and the same material as the transparent layer 102 may be used therefor. The preferable thickness thereof also is the same as the transparent layer 102.

Subsequently, the method for producing the information recording medium 200 of Embodiment 2 is described. The information recording medium 200 is produced by sequentially forming the first information layer 210, the interlayer 203, the second information layer 220, and the transparent layer 202, on the substrate 201 serving as a support body.

The substrate 201 formed with guide grooves (groove surface and land surface) is set in a sputtering apparatus. On the surface of the substrate 201 on which the guide grooves are formed, the steps from the step of forming the reflective layer 212 to the step of forming the dielectric layer 217 are performed in the same manner as the steps from the step of forming the reflective layer 112 to the step of forming the dielectric layer 117 performed in the Embodiment 1. In this way, the first information layer 210 is formed on the substrate 201.

The substrate 201 on which the first information layer 210 is formed is taken out of the sputtering apparatus. Then, the interlayer 203 is formed. The interlayer 203 is formed by the following procedure. First, an ultraviolet curable resin is applied onto the surface of the dielectric layer 217, for example, by spin coating. Next, a surface of a polycarbonate substrate formed with projections and depressions that are complementary to the projections and depressions of the guide grooves to be formed on the interlayer 203 is held in close contact with the ultraviolet curable resin. Maintaining this state, the resin is irradiated with an ultraviolet light so as to be cured. Thereafter, the polycarbonate substrate with projections and depressions is separated. Thereby, guide grooves that have a shape complementary to the aforementioned projections and depressions are formed on the ultraviolet curable resin, so that the interlayer 203 having guide grooves to be formed is formed. The shape of the guide grooves formed on the substrate 201 and the shape of the guide grooves formed on the interlayer 203 may be the same or different. For the material of the ultraviolet curable resin, the above-mentioned acrylic resin to which $TiO_2$ fine particles or $ZrO_2$ fine particles are added may be used.

As another method, the interlayer 203 may be formed by forming a layer for protecting the dielectric layer 217 from an ultraviolet curable resin, and forming a layer having guide grooves thereon. In that case, the interlayer 203 to be obtained has a two-layer structure. Alternatively, the interlayer may be formed by stacking three or more layers. Other than the spin coating method, a printing method, an ink jet method and a casting method may be used for forming the interlayer 203.

The substrate 201 formed with the layers up to the interlayer 203 is again set in the sputtering apparatus, and the dielectric layer 221 is formed on the surface of the interlayer 203 formed with the guide grooves. The dielectric layer 221 also is formed by sputtering a target containing an element, a mixture or a compound constituting the dielectric layer 221. The sputtering may be performed using a high frequency power source in a rare gas atmosphere or a mixed gas atmosphere of a rare gas and oxygen gas and/or nitrogen gas. If possible, a direct current power source or a pulse direct current power source may be used. Any of Ar gas, Kr gas, and Xe gas may be used as the rare gas.

As the sputtering target for forming the dielectric layer 221, a material containing at least one of Zr—O, Nb—O, Bi—O, Ce—O, Ti—O, and W—O may be used. Alternatively, a material containing at least one of Zr—O, Nb—O, Bi—O, Ce—O, Ti—O, and W—O at 50 mol % or more may be used. The material and the composition of the sputtering target are determined so as to form the material of the dielectric layer 221. Depending on the sputtering apparatus, the composition of the sputtering target may not match the composition of the dielectric layer to be formed. In this case, by adjusting the composition of the sputtering target, the dielectric layer 221 with a desired composition can be obtained. In the case of using an oxide, there may be a deficiency of oxygen during the sputtering. Therefore, a sputtering target that can suppress the occurrence of oxygen deficiency may be used, or the sputtering may be performed in a mixed atmosphere of a rare gas with a small amount of oxygen gas at 10% or less. Alternatively, the dielectric layer 221 may be formed by reactive sputtering using a target made of metal, semimetal, or semiconductor in a mixed atmosphere of a rare gas with an excess amount of oxygen gas at 10% or more, or a mixed atmosphere of a rare gas with oxygen gas and nitrogen gas.

The dielectric layer 221 also may be formed by sputtering targets of each single compound at the same time, using a plurality of the power sources. The dielectric layer 221 also may be formed by sputtering targets each composed of at least two compounds such as a binary target and a ternary target at the same time, using a plurality of the power sources. Even when using such a target, the sputtering may be performed in a rare gas atmosphere or a mixed gas atmosphere of a rare gas and oxygen gas and/or nitrogen gas.

Subsequently, on the surface of the dielectric layer 221, the steps from the step of forming the reflective layer 222 to the step of forming the interface layer 226 are performed in the same manner as the steps from the step of forming the reflective layer 112 to the step of forming the interface layer 116 performed in the Embodiment 1. A point to be noted is that, as already has been described, since the preferable thickness of the reflective layer 222 is as small as at least 5 nm but not more than 15 nm, the output of the power source may be lower in the step of forming the reflective layer 222 than in the step of forming the reflective layer 112. Further, since the preferable thickness of the recording layer 225 of the present invention also is as small as at least 4 nm but not more than 10 nm, the output of the power source may be lower in the step of forming the recording layer 225 than in the step of forming the recording layer 115.

Next, the step of forming the dielectric layer 227 on the surface of the interface layer 226 is performed. The dielectric layer 227 also can be formed by sputtering a target containing an element, a mixture or a compound constituting the dielectric layer 227. As the sputtering target for forming the dielectric layer 227, a material containing at least one of Al—N, Bi—O, Ce—O, Dy—O, Ga—O, Hf—O, In—O, Nb—O, Sb—O, Si—N, Sn—O, Ta—O, Te—O, Ti—O, W—O, Y—O, Zn—O, Zn—S—Si—O and Zr—O may be used. The sputtering may be performed using a high frequency power source in a rare gas atmosphere or a mixed gas atmosphere of a rare gas and oxygen gas and/or nitrogen gas, in the same manner as in the dielectric layer 221. The reactive sputtering or the sputtering using a plurality of power sources at the same time may be used.

Subsequently, the step of forming the dielectric layer 228 on the surface of the dielectric layer 227 is performed. The dielectric layer 228 also is formed by sputtering a target containing an element, a mixture or a compound constituting the dielectric layer 228. As the sputtering target for forming the dielectric layer 228, a material containing at least one of Al—O, B—N, Ce—F, La—F, Mg—F, Mg—O, Mg—Si—O, Si—N, Si—O, Y—F and Zr—Si—O may be used. The sputtering may be performed using a high frequency power source in a rare gas atmosphere or a mixed gas atmosphere of a rare gas and oxygen gas and/or nitrogen gas, in the same manner as in the dielectric layer 221. The reactive sputtering or the sputtering using a plurality of power sources at the same time may be used. In this way, the second information layer 220 is formed on the interlayer 203.

The substrate 201 on which the layers up to the second information layer 220 is taken out of the sputtering apparatus. Then, the transparent layer 202 is formed on the surface of the dielectric layer 228 in the same manner as in the step of forming the transparent layer 102 in the Embodiment 1. With that, the step of forming the transparent layer 202 is completed. After the completion of the step of forming the transparent layer 202, an initialization step is performed for the first information layer 210 and the second information layer 220, as needed. The initialization step on the first information layer 210 may be performed before or after the formation of the interlayer 203, and the initialization step on the second information layer 220 may be performed before or after the formation of the transparent layer 202. Alternatively, the initialization steps on the first information layer 210 and the second information layer 220 may be performed before or after the formation of the transparent layer 202. In this way, the information recording medium 200 of the Embodiment 2 can be produced.

Although only the second information layer 220 on the laser beam 10 incident side among the first information layer 210 and the second information layer 220 corresponds to the information layer of the present invention in the information recording medium 200 of this embodiment, the first information layer 210 also may have a structure corresponding to the information layer of the present invention, and further it also possible that only the first information layer 210 has a structure corresponding to the information layer of the present invention. Further since the information layer of the present invention is to be included as at least one of the information layers, the information recording medium 200 of this embodiment may include an information layer with another structure. Another information layer may be, for example, a read-only information layer or a write-once information layer.

Embodiment 3

Figures 3A, 3B:
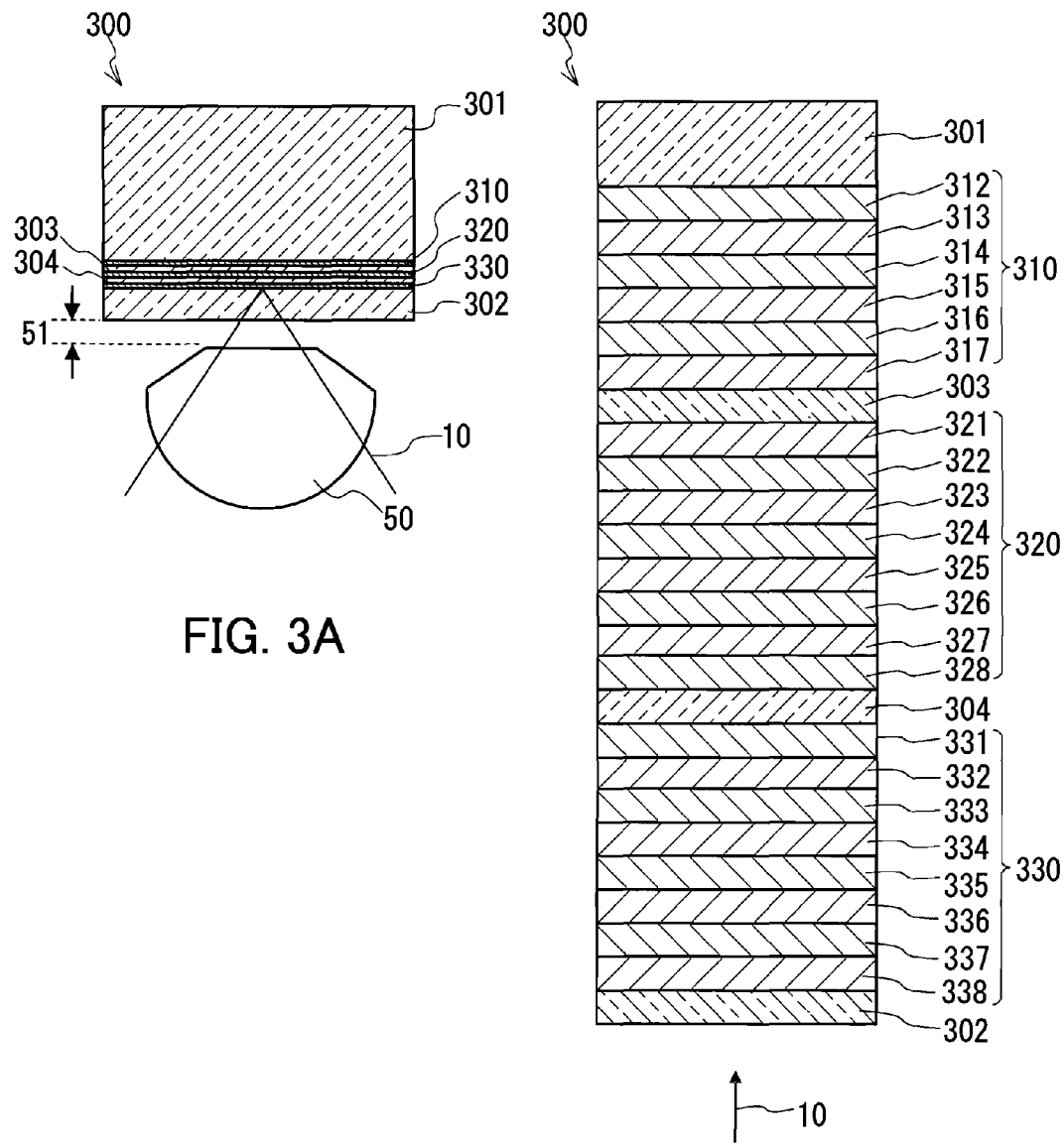
FIG. 3A is a partial sectional view indicating still another embodiment of the information recording medium and the optical system of the present invention.
FIG. 3B is a detailed sectional view indicating the information recording medium indicated in FIG. 3A.

An example of an information recording medium and an optical system having a numerical aperture (NA)>1 is described as Embodiment 3 of the present invention. FIG. 3A indicates a partial section of the information recording medium 300 and the SIL 50. The information recording medium 300 includes three information layers. A first information layer 310, a second information layer 320, and a third information layer 330 are formed on a substrate 301 with interlayers interposed therebetween, and a transparent layer 302 is further formed thereon.

The SIL 50 is disposed with the distance 51 between the emitting surface of the SIL 50 and the surface of the transparent layer 302. Also in this embodiment, the laser beam 10 emitted from the SIL 50 is incident through the transparent layer 302 to the first information layer 310, in which recording and reproduction are performed with the laser beam 10 that has passed through the second information layer 320 and the third information layer 330. Further, recording and reproduction with respect to the second information layer 320 are performed with the laser beam 10 that has passed through the third information layer 330.

The relationship between the SIL 50 and the transparent layer 302 is the same as the relationship between the SIL 50 and the transparent layer 102 in Embodiment 1. Further, the distance 51 is preferably 50 nm or less in the same manner as Embodiment 1. The information recording medium 300 is capable of recording/reproducing information with about 270 GB capacity with respect to the three information layers by combination of, for example, the SIL 50 with an effective NA=1.62 and the laser beam 10 with a wavelength of 405 nm.

Further, FIG. 3B indicates a partial section of the information recording medium 300 in detail. The information recording medium 300 includes the first information layer 310, the interlayer 303, the second information layer 320, an interlayer 304, the third information layer 330 and the transparent layer 302 that are disposed in this order on the substrate 301. The first information layer 310 is formed of a reflective layer 312, a dielectric layer 313, an interface layer 314, a recording layer 315, an interface layer 316, and a dielectric layer 317 that are disposed in this order on one surface of the substrate 301. The second information layer 320 is formed of a dielectric layer 321, a reflective layer 322, a dielectric layer 323, an interface layer 324, a recording layer 325, an interface layer 326, a dielectric layer (dielectric layer a) 327 and a dielectric layer (dielectric layer b) 328 that are disposed in this order on one surface of the interlayer 303. The third information layer 330 is formed of a dielectric layer 331, a reflective layer 332, a dielectric layer 333, an interface layer 334, a recording layer 335, an interface layer 336, a dielectric layer (dielectric layer a) 337 and a dielectric layer (dielectric layer b) 338 that are disposed in this order on one surface of the interlayer 304. In this embodiment, the second information layer 320 and the third information layer 330 correspond to the information layer of the present invention. The interlayer 302 disposed adjacent to the second information layer 320 on the optical beam incident side with respect to the second information layer 320 and the transparent layer 302 disposed adjacent to the third information layer 330 on the optical beam incident side with respect to the third information layer 330 each correspond to the "transparent layer made of a material that is transparent with respect to the optical beam" that is a feature of the information recording medium of the present invention.

Optically, it is preferable that the three information layers each have about the same effective reflectance. This is achieved by adjusting the reflectance (%) of each of the first, the second and the third information layers and the transmittance (%) of each of the second and the third information layers. As an example, this embodiment describes a structure that is designed so as to satisfy the following conditions: 2.5≦effective Rc and 4≦effective Rc/effective Ra. In the case where the third information layer 330 is designed so as to have an average transmittance (Tc+Ta)/2 of 58% or more and the second information layer 320 is designed so as to have an average transmittance (Tc+Ta)/2 of 52% or more, the first information layer 310 is designed so as to satisfy 28≦Rc by itself, the second information layer 320 is designed so as to satisfy 7≦Rc by itself, the third information layer 330 is designed so as to satisfy 2.5≦Rc by itself, and all the information layers are designed so as to satisfy 4≦Rc/Ra.

Next, the function, material, and thickness of each of the substrate 301, the interlayer 303, the interlayer 304, and the transparent layer 302 are described. The substrate 301 has the same function as the substrate 101 in the Embodiment 1, and the same shape and material can be used therefor. The interlayer 303 has a function of separating the focal point of the laser beam 10 on the second information layer 320 from the focal point thereof on the first information layer 310, and may be formed with guide grooves for the second information layer 320, as needed. Similarly, the interlayer 304 has a function of separating the focal point of the laser beam 10 on the third information layer 330 from the focal point thereof on the second information layer 320, and may be formed with guide grooves for the third information layer 330, as needed.

The interlayer 303 and the interlayer 304 are transparent with respect to the optical beam of wavelength λ with which the recording and reproduction are performed so that the laser beam 10 could reach the first information layer 310 and the second information layer 320 efficiently. The interlayer 303 and the interlayer 304 each preferably have a thickness such that the distance between the recording layer 315 and the recording layer 325 is within the range where the SIL 50 can focus optical beam. Further, the distance from the surface of the transparent layer 302 to the recording layer 315 is preferably 10 μm or less. Accordingly, the thickness of each of the interlayer 303 and the interlayer 304 is preferably less than 5 μm, more preferably 3 μm or less. The thickness of these two interlayers may be the same or different.

The materials of the interlayer 303 and the interlayer 304 may be the same as those for the interlayer 203 in Embodiment 2. The refractive index n thereof is 1.75 or more, preferably 1.8 or more in the same manner. Detailed description for the material is the same as in the transparent layer 102 and thus omitted. The interlayer 303 may be formed by stacking a plurality of resin layers, as needed. For example, a structure of two or more layers including a layer for protecting the dielectric layer 317 and a layer formed with guide grooves may be employed. Similarly, a structure of two or more layers including a layer for protecting the dielectric layer 328 and a layer formed with guide grooves may be employed for the interlayer 304. Also in the case of the structure of two or more layers, the refractive index and the preferable thickness of the interlayer 303 and the interlayer 304 are as above described.

The transparent layer 302 has the same function as the transparent layer 102 in Embodiment 1, and the same material may be used therefor. The preferable thickness also is the same.

Hereinafter, descriptions will be given subsequently, starting from the structure of the first information layer 310. For example, an optical design for satisfying 28≦Rc, and 4≦Rc/Ra by itself when the refractive index n of the interlayer 303 is 1.8 is described. The values used in the calculations are, for example, the reflective layer 312 (with an optical constant of 0.2-i2 and a thickness of 80 nm), the recording layer 315 (with an optical constant in a crystalline phase of 1.9-i3.5, an optical constant in an amorphous phase of 3.2-i2.2 and a thickness of 11 nm), and the interface layer 316 (with an optical constant of 2.3-i0.1 and a thickness of 5 nm). In this structure, the interface layer 314 combines the function of the dielectric layer 313, and therefore the dielectric layer 313 is assumed not to be present.

The refractive index of the interface layer 314 is referred to as $n_7$, the thickness thereof is referred to as $d_7$ (nm), the refractive index of the dielectric layer 317 is referred to as $n_8$, and the thickness thereof is referred to as $d_8$ (nm). When $n_7=2$, $n_8=2.2$, $d_7$ preferably satisfies $0<d_7<4\lambda/(64n_7)$, that is, $0<d_7<13$, and $d_8$ preferably satisfies $20\lambda/(64n_8)<d_8<28\lambda/(64n_8)$, that is, $57<d_8<81$. Further, a result indicating that, in the case of providing a dielectric layer (although not shown in figures, which is referred to as a dielectric layer 318 for convenience of description) with a refractive index of 1.6 and a thickness of 32 nm on the laser beam 10 incident side in contact with the dielectric layer 317, $d_7$ preferably satisfies $0<d_7<6\lambda/(64n_7)$, that is, $0<d_7<20$, and $d_8$ preferably satisfies $18\lambda/(64n_8)<d_8<32\lambda/(64n_8)$, that is, $51<d_8<91$ was obtained. In this way, by further providing the dielectric layer 318 having a refractive index lower than the refractive index n of the interlayer 303 on the laser beam 10 incident side with respect to the dielectric layer 317, the film thickness range satisfying 28≦Rc and 4≦Rc/Ra can be increased.

As another structure, an increase in the refractive index $n_8$ of the dielectric layer 317 can increase Rc even without the dielectric layer 318, in which, however, Ra increases and the reflectance ratio Rc/Ra decreases. Providing of the dielectric layer 318 and a design satisfying (the refractive index of the dielectric layer 318)<n (which is herein the refractive index of the interlayer 303)<$n_8$, that is, $n_b<n<n_a$ are preferable, and the determination of $n_8$ so that the design further satisfies 4≦Rc/Ra is more preferable. Further, although the optical calculations are performed without providing the dielectric layer 313 in this embodiment, even if the calculations are performed assuming, for example, that the interface layer 314 with a thickness of about 5 nm is provided and the dielectric layer 313 is variable, the effects of the dielectric layer 318 remain unchanged.

Detailed descriptions for the layers from the reflective layer 312 to the dielectric layer 317 except for the descriptions for the preferable thickness of the above interlayer 314 and the dielectric layer 317 are the same as those for the layers from the reflective layer 222 to the dielectric layer 227 of the information layer 220 in the Embodiment 2, and thus are omitted. The preferable material of the dielectric layer 318 is the same as that of the dielectric layer 228 in Embodiment 2.

Next, the second information layer 320 is described. For example, an optical design for satisfying 7≦Rc, 4≦Rc/Ra, and 52≦(Tc+Ta)/2 by itself when the refractive index n of each of the interlayer 303 and the interlayer 304 is 1.8 is described. The values used in the calculations are, for example, the dielectric layer 321 (with an optical constant of 2.7-i0.0 and a thickness of 19 nm), the reflective layer 322 (with an optical constant of 0.1-i2 and a thickness of 10 nm), the recording layer 325 (with an optical constant in a crystalline phase of 1.9-i3.5, an optical constant in an amorphous phase of 3.2-i2.2 and a thickness of 6 nm), and the interface layer 326 (with an optical constant of 2.3-i0.1 and a thickness of 5 nm). In this structure, the interface layer 324 combines the function of the dielectric layer 323, and therefore the dielectric layer 323 is assumed not to be present.

The refractive index of the interface layer 324 is referred to as $n_9$, the thickness thereof is referred to as $d_9$ (nm), the refractive index of the dielectric layer 327 is referred to as $n_{10}$, the thickness thereof is referred to as $d_{10}$ (nm), the refractive index of the dielectric layer 328 is referred to as $n_{11}$, and the thickness thereof is referred to as $d_{11}$ (nm). In the case where the dielectric layer 328 is not provided, when $n_9=2.3$ and $n_{10}=2.2$, $d_9$ satisfies preferably $0<d_9\leq 4\lambda/(64n_9)$, that is, $0<d_9\leq 12$, and $d_{10}$ satisfies preferably $12\lambda/(64n_{10})$, that is, 34. As is the case of this embodiment, in the case where the dielectric layer 328 is provided, when $n_{10}=2.2$, $d_{10}=43$ (nm), $n_9=2.3$, and $n_{11}=1.6$, $d_9$ preferably satisfies $0<d_9\leq 4\lambda/(64n_9)$, that is, $0<d_9\leq 12$, and $d_{11}$ preferably satisfies $0<d_{11}\leq 14\lambda/(64n_{11})$, more preferably $6\lambda/(64n_{11})<d_{11}<10\lambda/(64n_{11})$, that is, $23<d_{11}<40$. It would be understood that it is particularly easy to satisfy both of $4\leq Rc/Ra$ and $52\leq (Tc+Ta)/2$ in the structure of this embodiment where the dielectric layer 328 with a refractive index lower than the refractive index of the interlayer 304 is present.

As another structure, an increase in the refractive index $n_{10}$ of the dielectric layer 327 can increase (Tc+Ta)/2 even without the dielectric layer 328, in which, however, Ra increases and the reflectance ratio Rc/Ra decreases. Accordingly, providing the dielectric layer 328 and a design satisfying $n_{11}<n$ (which is herein the refractive index of the interlayer 304) $<n_{10}$, that is, $n_b<n<n_a$ are necessary, and the determination of the refractive index $n_{10}$ of the dielectric layer 327 so that the design further satisfies $4\leq Rc/Ra$ is preferable. Further, although the optical calculations are performed without providing the dielectric layer 323 in this embodiment, even if the calculations are performed assuming, for example, that the interface layer 324 with a thickness of about 5 nm is provided and the dielectric layer 323 is variable, the effects of the dielectric layer 328 remain unchanged.

The recording layer 325 has a smaller thickness than the recording layer 225 in order to achieve a higher transmittance than the second information layer 220 in Embodiment 2. The thickness is preferably at least 4 nm but not more than 9 nm. If it exceeds 9 nm, the optical transmittance of the second information layer 320 decreases, and if it falls below 4 nm, Ra increases. As a result, it becomes difficult to ensure a high reflectance ratio when $7\leq Rc$. The material and the preferable composition thereof are the same as those of the recording layer 115 in Embodiment 1.

The reflective layer 322 also has a smaller thickness than the reflective layer 222 in the same manner. The thickness is preferably at least 6 nm but not more than 16 nm. The material and the preferable composition thereof are the same as those of the reflective layer 112 in Embodiment 1.

Detailed descriptions for the layers from the dielectric layer 321 to the dielectric layer 328 except for the descriptions for the preferable thickness of the reflective layer 322, the recording layer 325, the interface layer 324, the dielectric layer 327, and the dielectric layer 328 are the same as those for the layers from the dielectric layer 221 to the dielectric layer 228 of the second information layer 220 in Embodiment 2, and thus are omitted.

Next, the third information layer 330 is described. For example, an optical design for satisfying $2.5\leq Rc$, $4\leq Rc/Ra$, and $58\leq (Tc+Ta)/2$ by itself when the refractive index n of each of the interlayer 304 and the transparent layer 302 is 1.8 is described.

The values used in the calculations are, for example, the dielectric layer 331 (with an optical constant of 2.7-i0.0 and a thickness of 19 nm), the reflective layer 332 (with an optical constant of 0.1-i2 and a thickness of 8 nm), the recording layer 335 (with an optical constant in a crystalline phase of 1.9-i3.5, an optical constant in an amorphous phase of 3.2-i2.2 and a thickness of 5.5 nm), and the interface layer 336 (with an optical constant of 2.3-i0.1 and a thickness of 5 nm). In this structure, the interface layer 334 combines the function of the dielectric layer 333, and therefore the dielectric layer 333 is assumed not to be present. Further, in order to ensure a transmittance of 58% or more, the reflective layer 332 has a thickness of 8 nm, the recording layer 335 has a thickness of 5.5 nm, and the interface layer 334 has an extinction coefficient of 0.0.

The refractive index of the interface layer 334 is referred to as $n_{12}$, the thickness thereof is referred to as $d_{12}$ (nm), the refractive index of the dielectric layer 337 is referred to as $n_{13}$, the thickness thereof is referred to as $d_{13}$ (nm), the refractive index of the dielectric layer 338 is referred to as $n_{14}$, and the thickness thereof is referred to as $d_{14}$ (nm). In the case without the dielectric layer 338, when $n_{12}=2.3$ and $n_{13}=2.2$, no film thickness range of $d_{12}$ and $d_{13}$ that satisfies $4\leq Rc/Ra$ and $58\leq (Tc+Ta)/2$ can be obtained. In the case of providing the dielectric layer 338, a result was obtained as follows. When $n_{13}=2.2$, $d_{13}=40$ (nm), $n_{12}=2.3$, and $n_{14}=1.6$, there is some film thickness range of $d_{12}$ and $d_{14}$ that satisfies $4\leq Rc/Ra$ and $58\leq (Tc+Ta)/2$. In this regard, $d_{12}$ preferably satisfies $0<d_{12}<6\lambda/(64n_{12})$, that is, $0<d_{12}<17$, and $d_{14}$ preferably satisfies $0<d_{14}<16\lambda/(64n_{14})$, more preferably $8\lambda/(64n_{14})<d_{14}<12\lambda/(64n_{14})$, that is, $31<d_{14}<48$. In this way, the structure provided with the dielectric layer 338 having a refractive index lower than the refractive index n of the transparent layer 302 can satisfy both of $4\leq Rc/Ra$ and $58\leq (Tc+Ta)/2$. Thus, the dielectric layer 338 is more effective in a structure that requires a higher transmittance.

As another structure, an increase in the refractive index $n_{13}$ of the dielectric layer 337 to 2.4 or more can increase (Tc+Ta)/2 even without the dielectric layer 338, in which some film thickness range satisfies $2.5\leq Rc$ and $4\leq Rc/Ra$. However, this film thickness range is narrower than in the structure provided with the dielectric layer 338. Therefore, providing the dielectric layer 338 and a design satisfying $n_{14}<n$ (which is herein the refractive index of the transparent layer 302) $<n_{13}$, that is, $n_b<n<n_a$ are necessary, and the determination of $n_{13}$ so that the design further satisfies $4\leq Rc/Ra$ is preferable.

An increase in the refractive index n of the interlayer 304 and the transparent layer 302 makes it difficult to ensure a high transmittance, and therefore, for example, in the case of $n=2.1$, when the recording layer 335 is 5 nm, $n_{13}=2.4$, $d_{13}=40$ (nm), $n_{12}=2.3$ and $n_{14}=1.6$, a high transmittance and a high reflectance ratio can go together. Alternatively, in the case of $n=2.4$, when the recording layer 335 is 4.5 nm, $n_{13}=2.7$, $d_{13}=33$ (nm), $n_{12}=2.3$, and $n_{14}=1.6$, a high transmittance and a high reflectance ratio can go together. In any case, the effects of providing the dielectric layer 338 can be obtained.

Further, although the optical calculations are performed without providing the dielectric layer 333 in this embodiment, even if the calculations are performed assuming, for example, that the interface layer 334 with a thickness of about 5 nm is present and the dielectric layer 333 is variable, the effects of the dielectric layer 338 remain unchanged.

The recording layer 335 has a smaller thickness than the recording layer 325 in order to achieve a higher transmittance than the second information layer 320. The thickness is preferably at least 4 nm but not more than 8 nm. If it exceeds 8 nm, the optical transmittance of the third information layer 330 decreases, and if it falls below 4 nm, Ra increases, so that it becomes difficult to ensure a high reflectance ratio when $2.5\leq Rc$. The material and the preferable composition thereof are the same as those of the recording layer 115 in Embodiment 1.

The reflective layer 332 also has a smaller thickness than the reflective layer 322 in the same manner. The thickness is preferably at least 6 nm but not more than 15 nm. The material and the preferable composition thereof are the same as those of the reflective layer 112 in Embodiment 1.

Detailed descriptions for the layers from the dielectric layer 321 to the dielectric layer 328 except for the descriptions for the preferable thickness of the reflective layer 332, the recording layer 335, the interface layer 334, the dielectric layer 337, and the dielectric layer 338 are the same as those for the layers from the dielectric layer 321 to the dielectric layer 328 of the second information layer 320, and thus are omitted.

The information recording medium 300 is produced by forming sequentially the first information layer 310, the interlayer 303, the second information layer 320, the interlayer 304, the third information layer 330, and the transparent layer 302, on the substrate 301 serving as a support body. Detailed descriptions for the first information layer 310 are the same as those for the first information layer 210 of Embodiment 2, detailed descriptions for the second information layer 320 and the third information layer 330 are the same as those for the second information layer 220 of Embodiment 2, detailed descriptions for the interlayer 303 and the interlayer 304 are the same as those for the interlayer 203 of Embodiment 2, and detailed descriptions for the transparent layer 302 are the same as those for the transparent layer 102 of Embodiment 1, and thus are omitted.

Although the second information layer 320 and the third information layer 330 on the laser beam 10 incident side among the information layers from the first information layer 310 to the third information layer 330 correspond to the information layer of the present invention in the information recording medium 300 of this embodiment, the first information layer 310 also may have a structure corresponding to the information layer of the present invention, and the information layer of the present invention is to be included as at least one of the information layers. Further since the information layer of the present invention is to be included as at least one of the information layers, the information recording medium 300 of this embodiment may include an information layer with another structure. Another information layer may be, for example, a read-only information layer or a write-once information layer.

Embodiment 4

Figure 4A:
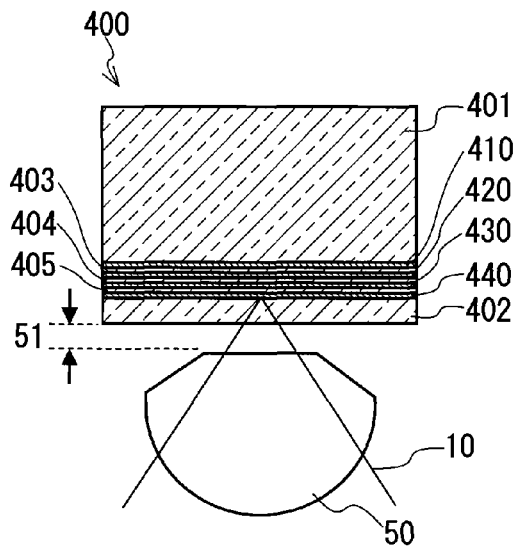
FIG. 4A is a partial sectional view indicating still another embodiment of the information recording medium and the optical system of the present invention.

An example of an information recording medium and an optical system having a numerical aperture (NA)>1 is described as Embodiment 4 of the present invention. FIG. 4A indicates a partial section of the information recording medium 400 and the SIL 50. The information recording medium 400 includes four information layers. A first information layer 410, a second information layer 420, a third information layer 430 and a fourth information layer 440 are formed on a substrate 401 with interlayers interposed therebetween, and a transparent layer 302 further is provided thereon.

The SIL 50 is disposed with the distance 51 between the emitting surface of the SIL 50 and the surface of the transparent layer 402. Also in this embodiment, the laser beam 10 emitted from the SIL 50 is incident through the transparent layer 402 to each information layer, in which recording and reproduction are performed with the laser beam 10 that has passed through the information layers disposed on the laser beam 10 incident side. The relationship between the SIL 50 and the transparent layer 402 is the same as the relationship between the SIL 50 and the transparent layer 102 in Embodiment 1. Further, the distance 51 is preferably 50 nm or less in the same manner as in Embodiment 1. The information recording medium 400 is capable of recording/reproducing information with about 360 GB capacity with respect to the four information layers by combination of, for example, the SIL 50 with an effective NA=1.62 and the laser beam 10 with a wavelength of 405 nm.

Figure 4B:
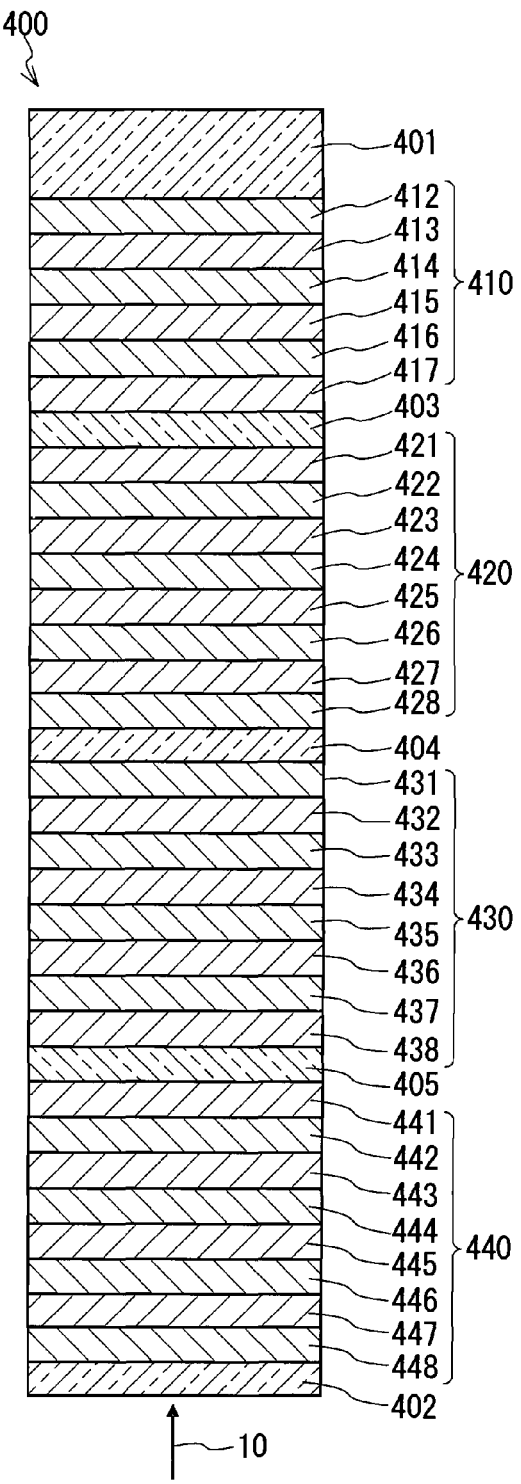
FIG. 4B is a detailed sectional view indicating the information recording medium indicated in FIG. 4A.

Further, FIG. 4B indicates a partial section of the information recording medium 400 in detail. The information recording medium 400 includes the first information layer 410, the interlayer 403, the second information layer 420, an interlayer 404, the third information layer 430, an interlayer 405, the fourth information layer 440 and the transparent layer 402 that are disposed in this order on the substrate 401.

The first information layer 410 is formed of a reflective layer 412, a dielectric layer 413, an interface layer 414, a recording layer 415, an interface layer 416, and a dielectric layer 417 that are disposed in this order on one surface of the substrate 401. The second information layer 420 is formed of a dielectric layer 421, a reflective layer 422, a dielectric layer 423, an interface layer 424, a recording layer 425, an interface layer 426, a dielectric layer (dielectric layer a) 427 and a dielectric layer (dielectric layer b) 428 that are disposed in this order on one surface of the interlayer 403. The third information layer 430 is formed of a dielectric layer 431, a reflective layer 432, a dielectric layer 433, an interface layer 434, a recording layer 435, an interface layer 436, a dielectric layer (dielectric layer a) 437 and a dielectric layer (dielectric layer b) 438 that are disposed in this order on one surface of the interlayer 404. The fourth information layer 440 is formed of a dielectric layer 441, a reflective layer 442, a dielectric layer 443, an interface layer 444, a recording layer 445, an interface layer 446, a dielectric layer (dielectric layer a) 447 and a dielectric layer (dielectric layer b) 448 that are disposed in this order on one surface of the interlayer 405. In this embodiment, the second information layer 420, the third information layer 430 and the fourth information layer 440 correspond to the information layer of the present invention. The interlayer 404 disposed adjacent to the second information layer 420 on the optical beam incident side with respect to the second information layer 420, the interlayer 405 disposed adjacent to the third information layer 430 on the optical beam incident side with respect to the third information layer 430 and the transparent layer 402 disposed adjacent to the fourth information layer 440 on the optical beam incident side with respect to the fourth information layer 440 each correspond to the "transparent layer made of a material that is transparent with respect to the optical beam" that is a feature of the information recording medium of the present invention.

Optically, it is preferable that the four information layers each have about the same effective reflectance. This is achieved by adjusting the reflectance of each of the first, the second, the third, and the fourth information layers and the transmittance of each of the second, the third, and the fourth information layers. As an example, this embodiment describes a structure that is designed so as to satisfy an effective Rc of 1.3% or more, and an effective Rc/effective Ra of 4 or more. In the case where the fourth information layer 440 is designed so as to have a transmittance of 68%, the third information layer 430 is designed so as to have a transmittance of 65% and the second information layer 420 is designed so as to have a transmittance of 52%, the first information layer 410 is designed so as to satisfy Rc of 25% or more by itself, the second information layer 420 is designed so as to satisfy Rc of 7% or more by itself, the third information layer 430 is designed so as to satisfy Rc of 2.8% or more by itself, the fourth information layer 440 is designed so as to satisfy Rc of 1.3% or more by itself, and all the information layers are designed so as to satisfy 4≦Rc/Ra.

Next, the thickness of each of the interlayer 403, the interlayer 404, the interlayer 405 and the transparent layer 402 is described. The interlayer 403, the interlayer 404 and the interlayer 405 each preferably have a thickness such that the distance between the recording layer 415 and the recording layer 445 is within the range where the SIL 50 can focus optical beam. Further, the distance from the surface of the transparent layer 402 to the recording layer 415 is preferably 10 μm or less. Accordingly, the total thickness of the interlayer 403, the interlayer 404 and the interlayer 405 is preferably less than 10 μm, more preferably 9 μm or less. For example, a structure where the interlayer 403 is 3 μm, the interlayer 404 is 2 μm, the interlayer 405 is 2.5 μm, and the transparent layer 402 is 1.5 μm is possible.

The materials of the interlayer 403, the interlayer 404, the interlayer 405 and the transparent layer 402 may be the same as those of the transparent layer 102 in Embodiment 1. Detailed descriptions therefor are omitted.

Hereinafter, descriptions will be given subsequently, starting from the structure of the first information layer 410. For example, an optical design for satisfying 25≦Rc, and 4≦Rc/Ra by itself when the refractive index n of the interlayer 403 is 1.8 is described. The values used in the calculations are, for example, the reflective layer 412 (with an optical constant of 0.2-i2 and a thickness of 80 nm), the recording layer 415 (with an optical constant in a crystalline phase of 1.9-i3.5, an optical constant in an amorphous phase of 3.2-i2.2 and a thickness of 11 nm), and the interface layer 416 (with an optical constant of 2.3-i0.1 and a thickness of 5 nm). In this structure, the interface layer 414 combines the function of the dielectric layer 413, and therefore the dielectric layer 413 is assumed not to be present.

The refractive index of the interface layer 414 is referred to as $n_{15}$, the thickness thereof is referred to as $d_{15}$ (nm), the refractive index of the dielectric layer 417 is referred to as $n_{16}$, and the thickness thereof is referred to as $d_{16}$ (nm). When $n_{15}=2$, $n_{16}=2.2$, $d_{15}$ preferably satisfies $0<d_{15}<4\lambda/(64n_{15})$, that is, $0<d_{15}<13$, and $d_{16}$ preferably satisfies $16\lambda/(64n_{16})<d_{16}<32\lambda/(64n_{16})$, that is, $45<d_{16}<91$.

Further, a result indicating that, in the case of providing a dielectric layer (although not shown in figures, which is referred to as a dielectric layer 418 for convenience of description) with a refractive index $n_{17}$ of 1.6 and a thickness of 32 nm on the laser beam 10 incident side in contact with the dielectric layer 417, $d_{15}$ preferably satisfies $0<d_{15}<6\alpha/(64n_{15})$, that is, $0<d_{15}<20$, and $d_{16}$ preferably satisfies $16\lambda/(64n_{16})<d_{16}<32\lambda/(64n_{16})$, that is, $45<d_{16}<91$ was obtained.

As described above, by further providing the dielectric layer 418, the selection range of the film thickness $d_{15}$ of the interface layer 414 is increased. In this way, it has been confirmed that, by providing the dielectric layer 418 having a refractive index lower than the refractive index n of the interlayer 403, the film thickness range satisfying 25≦Rc and 4≦Rc/Ra can be increased.

As another structure, an increase in the refractive index $n_{16}$ of the dielectric layer 417 can increase Rc even without the dielectric layer 418, in which, however, Ra increases and the reflectance ratio Rc/Ra decreases. Accordingly, providing the dielectric layer 418 and a design satisfying $n_{17}<n<n_{16}$ are preferable, and the determination of $n_{16}$ so that the design further satisfies 4≦Rc/Ra is more preferable. Further, although the optical calculations are performed without providing the dielectric layer 413 in this embodiment, even if the calculations are performed assuming, for example, that the interface layer 414 with a thickness of about 5 nm is present and the dielectric layer 413 is variable, the effects of the dielectric layer 418 remain unchanged.

Since the same optical design as the second information layer 320 of Embodiment 3 is possible in the second information layer 420, descriptions thereof are omitted.

Next, the third information layer 430 is described. For example, an optical design for satisfying 2.8≦Rc, 4≦Rc/Ra, and 65≦(Tc+Ta)/2 by itself when the refractive index n of each of the interlayer 404 and the interlayer 405 is 1.8 is described.

The values used in the calculations are, for example, the dielectric layer 431 (with an optical constant of 2.7-i0.0 and a thickness of 19 nm), the reflective layer 432 (with an optical constant of 0.1-i2 and a thickness of 8 nm), the recording layer 435 (with an optical constant in a crystalline phase of 1.9-i3.5, an optical constant in an amorphous phase of 3.2-i2.2 and a thickness of 4 nm), and the interface layer 436 (with an optical constant of 2.3-i0.1 and a thickness of 5 nm). In this structure, the interface layer 434 combines the function of the dielectric layer 433, and therefore the dielectric layer 433 is assumed not to be present. Further, in order to ensure a transmittance of 65% or more, the reflective layer 432 has a thickness of 8 nm, the recording layer 435 has a thickness of 4 nm, and the interface layer 434 has an extinction coefficient of 0.0.

The refractive index of the interface layer 434 is referred to as $n_{18}$, the thickness thereof is referred to as $d_{18}$ (nm), the refractive index of the dielectric layer 437 is referred to as $n_{19}$, the thickness thereof is referred to as $d_{19}$ (nm), the refractive index of the dielectric layer 438 is referred to as $n_{20}$, and the thickness thereof is referred to as $d_{20}$ (nm). In the case where the dielectric layer 438 is not provided, when $n_{18}=2.3$ and $n_{19}=2.2$, $d_{18}$ is preferably $4\lambda/(64n_{19})$, that is, 12, and $d_{19}$ preferably satisfies $8\lambda/(64n_{19})<d_{19}<14\lambda/(64n_{19})$, that is, $22<d_{19}<40$. The result indicated that, in the case where the dielectric layer 438 is provided, as is the case of the information recording medium 400 of this embodiment, when $n_{19}=2.2$, $d_{19}=42$ (nm), $n_{18}=2.3$, and $n_{20}=1.6$, $d_{18}$ preferably satisfies $0<d_{18}<6\lambda/(64n_{19})$, that is, $0<d_{18}<17$, and $d_{20}$ preferably satisfies $0<d_{20}<16\lambda/(64n_{20})$, more preferably $6\lambda/(64n_{20})<d_{20}<10\lambda/(64n_{20})$, that is, $23<d_{20}<40$. In this way, in the structure provided with the dielectric layer 438 having a refractive index lower than the refractive index of the interlayer 405, the film thickness range satisfying 2.8≦Rc, 4≦Rc/Ra and 65≦(Tc+Ta)/2 can be increased. The dielectric layer 438 is more effective in a structure that requires a higher transmittance, as is the case of the third information layer 430.

There is another structure for achieving a similar optical design in which the dielectric layer 438 is not provided and 2.3≦$n_{19}$≦2.4 is satisfied. However, in this case, a preferable film thickness range is $12\lambda/(64n_{19})≦d_{19}≦14\lambda/(64n_{19})$ and $0<d_{18}<6\lambda/(64n_{18})$, which is narrower than in the structure provided with the dielectric layer 438. Accordingly, as is the case of the information recording medium 400 of this embodiment, providing the dielectric layer 438 and a design satisfying $n_{20}<n$ (which is herein the refractive index of the interlayer 405)<$n_{19}$, that is, $n_b<n<n_a$ are necessary, and the determination of $n_{19}$ so that the design further satisfies 4≦Rc/Ra is preferable.

An increase in the refractive index n of the interlayer 404 and the interlayer 405 makes it difficult to ensure a high transmittance, and therefore, for example, in the case of n=2.1, when the recording layer 435 is 4 nm, $n_{19}=2.6$, $d_{19}=31$ (nm), $n_{18}=2.3$ and $n_{20}=1.6$, a high transmittance and a high reflectance ratio can go together. Alternatively, in the case of n=2.4, when the recording layer 435 is 3 nm, $n_{19}=2.7$, $d_{19}=24$ (nm), $n_{18}=2.3$ and $n_{20}=1.6$, a high transmittance and a high reflectance ratio can go together. In any case, the effects of providing the dielectric layer 438 can be obtained.

Further, although the optical calculations are performed without providing the dielectric layer 433 in this embodiment, even if the calculations are performed assuming, for example, that the interface layer 434 with a thickness of about 5 nm is present and the dielectric layer 433 is variable, the effects of the dielectric layer 438 remain unchanged.

The recording layer 435 has a smaller thickness than the recording layer 425 in order to achieve a higher transmittance than the second information layer 420. The thickness is preferably at least 3 nm but not more than 7 nm. If it exceeds 7 nm, the optical transmittance of the second information layer 420 decreases, and if it falls below 3 nm, Ra increases. As a result, it becomes difficult to ensure a high reflectance ratio when $2.8 \leq Rc$. The material and the preferable composition thereof are the same as those of the recording layer 115 in Embodiment 1.

The reflective layer 432 also has a smaller thickness than the reflective layer 422 in the same manner. The thickness is preferably at least 6 nm but not more than 13 nm. The material and the preferable composition thereof are the same as those of the reflective layer 112 in Embodiment 1.

Detailed descriptions for the layers from the dielectric layer 431 to the dielectric layer 438 except for the descriptions for the preferable thickness of the reflective layer 432, the recording layer 435, the interface layer 434, the dielectric layer 437, and the dielectric layer 438 are the same as those for the layers from the dielectric layer 321 to the dielectric layer 328 of the second information layer 320 in Embodiment 3, and thus are omitted.

Next, the fourth information layer 440 is described. For example, an optical design for satisfying $1.3 \leq Rc$, $4 \leq Rc/Ra$, and $68 \leq (Tc+Ta)/2$ by itself when the refractive index n of each of the interlayer 405 and the transparent layer 402 is 1.8 is described. The values used in the calculations are, for example, the dielectric layer 441 (with an optical constant of 2.7-i0.0 and a thickness of 19 nm), the reflective layer 442 (with an optical constant of 0.1-i2 and a thickness of 10 nm), the recording layer 445 (with an optical constant in a crystalline phase of 1.9-i3.5, an optical constant in an amorphous phase of 3.2-i2.2 and a thickness of 3 nm), and the interface layer 446 (with an optical constant of 2.3-i0.1 and a thickness of 5 nm). In this structure, the interface layer 444 combines the function of the dielectric layer 443, and therefore the dielectric layer 443 is assumed not to be present. Further, in order to ensure a transmittance of 68% or more and a high reflectance ratio, the reflective layer 442 has a large thickness of 10 nm, the recording layer 445 has an extremely small thickness of 3 nm, and the interface layer 444 has an extinction coefficient of 0.0.

The refractive index of the interface layer 444 is referred to as $n_{21}$, the thickness thereof is referred to as $d_{21}$ (nm), the refractive index of the dielectric layer 447 is referred to as $n_{22}$, the thickness thereof is referred to as $d_{22}$ (nm), the refractive index of the dielectric layer 448 is referred to as $n_{23}$, and the thickness thereof is referred to as $d_{23}$ (nm). In the case where the dielectric layer 448 is not present, when $n_{21}=2.3$ and $n_{22}=2.2$, $d_{21}$ preferably satisfies $4\lambda/(64n_{21}) \leq d_{21} \leq 6\lambda/(64n_{21})$, that is, $11 \leq d_{21} \leq 17$, and $d_{22}$ preferably satisfies $8\lambda/(64n_{22}) \leq d_{22} \leq 12\lambda/(64n_{22})$, that is, $22 \leq d_{22} \leq 34$. The result indicated that, in the case where the dielectric layer 448 is present, as is the case of the information recording medium 400 of this embodiment, when $n_{22}=2.2$, $d_{22}=35$ (nm), $n_{21}=2.3$, and $n_{23}=1.6$, $d_{21}$ preferably satisfies $0<d_{21} \leq 6\lambda/(64n_{21})$, that is, $0 \leq d_{21}<17$, and $d_{23}$ preferably satisfies $0<d_{23} \leq 12\lambda/(64n_{23})$, that is, $0<d_{23} \leq 48$. In this way, in the structure provided with the dielectric layer 448 having a refractive index lower than the refractive index of the transparent layer 402, the film thickness range satisfying $1.3 \leq Rc$, $4 \leq Rc/Ra$ and $68 \leq (Tc+Ta)/2$ can be increased. The dielectric layer 448 is more effective in a structure that requires a higher transmittance as is the case of the fourth information layer 440.

There is another structure for achieving a similar optical design in which the dielectric layer 448 is not present and $2.3 \leq n_{22} \leq 2.4$ is satisfied. However, in this case, a preferable film thickness range is $8\lambda/(64n_{22}) \leq d_{22} \leq 10\lambda/(64n_{22})$ and $2\lambda/(64n_{23}) \leq d_{23} \leq 4\lambda/(64n_{23})$, which is narrower than in the structure provided with the dielectric layer 448. Accordingly, as is the case of the information recording medium 400 of this embodiment, providing the dielectric layer 448 and a design satisfying $n_{23}<n$ (which is herein the refractive index of the transparent layer 402)$<n_{22}$, that is, $n_b<n<n_a$ are necessary, and the determination of $n_{22}$ so that the design further satisfies $4 \leq Rc/Ra$ is preferable.

An increase in the refractive index n of the interlayer 405 and the transparent layer 402 makes it difficult to ensure a high transmittance, and therefore the thickness of the reflective layer or the recording layer may be adjusted. For example, in the case of n=2.1, when the reflective layer 442 is 9 nm, the recording layer 445 is 3 nm, $n_{22}=2.4$, $d_{22}=35$ (nm), $n_{21}=2.3$ and $n_{23}=1.6$, if $0<d_{21}<11$, the following conditions are satisfied: $1.3 \leq Rc$, $4 \leq Rc/Ra$, and $68 \leq (Tc+Ta)/2$. Alternatively, in the case of n=2.4, when the reflective layer 442 is 8 nm, the recording layer 445 is 3 nm, $n_{22}=2.6$, $d_{22}=29$ (nm), $n_{21}=2.3$ and $n_{23}=1.6$, if $0<d_{21}<11$, the following conditions are satisfied: $1.3 \leq Rc$, $4 \leq Rc/Ra$, and $68 \leq (Tc+Ta)/2$.

Further, although the optical calculations are performed without providing the dielectric layer 443 in this embodiment, even if the calculations are performed assuming, for example, that the interface layer 444 with a thickness of about 5 nm is present and the dielectric layer 443 is variable, the effects of the dielectric layer 448 remain unchanged.

Although in the information recording medium 400 of this embodiment, the information layers from the second information layer 420 to the fourth information layer 440 on the laser beam 10 incident side among the information layers from the first information layer 410 to the fourth information layer 440 correspond to the information layer of the present invention, the first information layer 410 also may have a structure corresponding to the information layer of the present invention, and the information layer of the present invention is to be included as at least one of the information layers. Further since the information layer of the present invention is to be included as at least one of the information layers, the information recording medium 400 of this embodiment may include an information layer with another structure. Another information layer may be, for example, a read-only information layer or a write-once information layer.

The information recording medium 400 is produced by forming sequentially the first information layer 410, the interlayer 403, the second information layer 420, the interlayer 404, the third information layer 430, the interlayer 405, the fourth information layer 440, and the transparent layer 402, on the substrate 401 serving as a support body. Detailed descriptions for the first information layer 410 are the same as those for the first information layer 210 of Embodiment 2, detailed descriptions for the second information layer 420, the third information layer 430 and the fourth information layer 440 are the same as those for the second information layer 220 of Embodiment 2, detailed descriptions for the interlayer 403, the interlayer 404 and the interlayer 405 are the same as those for the interlayer 203 of Embodiment 2, and detailed descriptions for the transparent layer 402 are the same as those for the transparent layer 102 of Embodiment 1, and thus are omitted.

Embodiment 5

An example of an information recording medium including five or more layers is described as Embodiment 5 of the present invention. Except for the farthest information layer from the laser beam incident side, information layers with a high transmittance are disposed. The farther from the laser beam incident side the information layer is, the higher reflectance is necessary. Therefore, an optical design where an information layer has a more increased transmittance, as the information layer is closer to the laser beam incident side is preferable. In an information layer that requires a high transmittance, a transparent layer (or an interlayer), a dielectric layer b, a dielectric layer a, a recording layer are disposed from the laser beam incident side in this order. Referring to the refractive index of the transparent layer or the interlayer as n, the refractive index of the dielectric layer b as $n_b$, and the refractive index of the dielectric layer a as $n_a$, a design satisfying $n_b < n < n_a$ allows a high transmittance and a high reflectance ratio to go together, so that good recording/reproducing signals can be obtained from each information layer.

When recording/reproduction is performed in the information recording medium of this embodiment with an optical system having a numerical aperture (NA)>1, the information recording medium is capable of recording/reproducing information with about 450 GB or more capacity with respect to the five or more information layers by combination of, for example, the SIL 50 with an effective NA=1.62 and the laser beam 10 with a wavelength of 405 nm. A terabyte-order capacity may be feasible by further enhancing the NA.

Even in this embodiment, the information layer of the present invention is to be included as at least one of the information layers. Accordingly, an information layer with another structure may be included therein, and the other information layer may be a read-only information layer or a write-once information layer. For example, a read-only information layer can achieve the highest transmittance, which may be disposed at a point close to the laser beam incident side.

The production thereof is performed by stacking information layers and interlayers on a substrate and forming a transparent layer thereon, in the same manner as in the above-mentioned other Embodiments.

Embodiment 6

Figure 6:
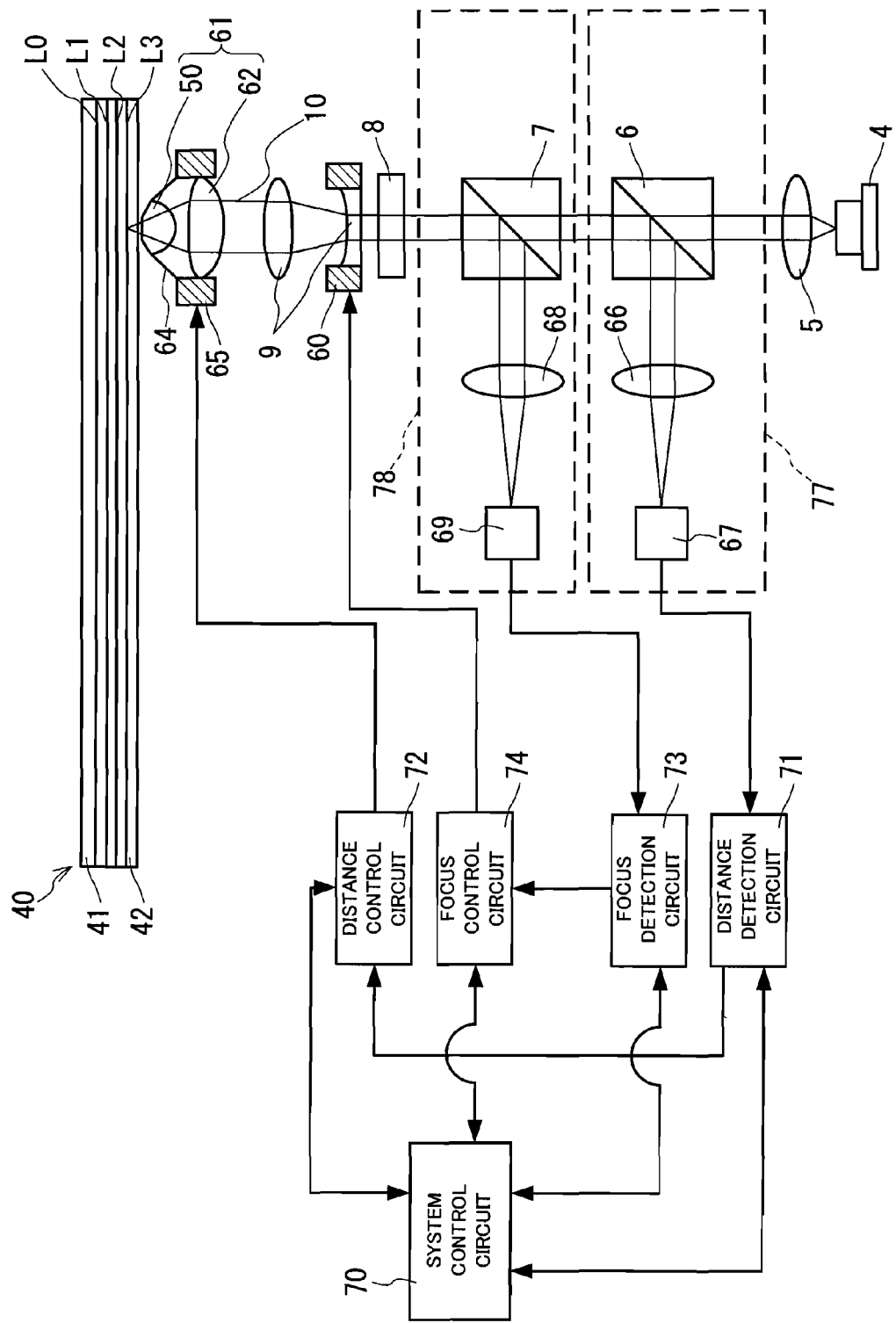
FIG. 6 is a schematic diagram indicating a configuration example of a recording/reproducing apparatus to be used for recording/reproducing information with respect to the information recording medium of the present invention.

The configuration of an optical information recording/reproducing apparatus in this embodiment is described using FIG. 6. First, descriptions will be given for an outgoing optical system present in an optical path extending from a laser to an information recording medium and the structure of an information recording medium.

In FIG. 6, 40 denotes an information recording medium for recording/reproducing data. The information recording medium 40 includes a substrate 41 serving as a support body, a plurality of information layers (four layers in this embodiment) L0 to L3 where information is actually recorded, and a transparent layer 42 protecting the information layers. 4 denotes a laser serving as an optical source for recording and/or reproduction, and 5 denotes a collimator lens that converts the emitted laser beam 10 into a parallel beam.

In FIG. 6, although both of 6 and 7 denote a beam splitter for separating a reflection from the information recording medium, 6 is a type in which the reflection property is independent from the polarization direction (that is, an non-polarized beam splitter), and 7 is a type in which the reflection property is dependent on the polarization direction (that is, a polarized beam splitter). The non-polarized beam splitter 6 functions to separate a return beam from a region where near-field light is generated, and the polarized beam splitter 7 functions to separate the reflection from the information layers (that is, far-field light). 8 denotes a quarter wavelength plate for converting linearly polarized light into circularly polarized light so that the polarized beam splitter 7 can separate the reflection of far-field light.

In FIG. 6, 9 denotes a beam expander for enlarging the beam radius of a laser beam. An actuator 60 is attached to at least one of two lenses constituting the beam expander 9, and the distance between the two lens can be adjusted. This allows the focal point of the laser beam 10 to be adjusted inside the information recording medium 40. It should be noted that the focal point adjusting means is not limited to the beam expander 9, and a lens or an optical element for adjusting the focal point may be provided in an optical path independently from the beam expander 9.

In FIG. 6, 61 denotes an optical beam focusing means for generating near-field light, which includes two lenses of a collective lens 62 and the SIL 50. A lens in a hemisphere shape with its flat side being cut into a tapered shape may be used for the SIL 50, for example. The flat side is directed opposite to the surface of the information recording medium 40. The collective lens 62 and the SIL 50 are integrally fixed by a lens holder 64, to which an actuator 65 is attached. By driving the actuator 65, the distance between the surface of the information recording medium 40 and the SIL 50, and the inclination of the optical beam focusing means 61 including the SIL 50 can by adjusted.

A return optical system extending from the information recording medium 40 to a detector is described hereinafter.

A detection system for a return beam includes a first detection system 77 and a second detection system 78. The configuration of the first detection system 77 is as follows.

The return beam reflected by the non-polarized beam splitter 6 is collected by a first detection lens 66 and enters a first detector 67. The first detector 67 includes two separate detectors. The amount of the optical beam incident on the first detector 67 corresponds to the amount of the return beam from a region where near-field light is generated. This amount of light varies depending on the distance between the SIL 50 and the surface of the information recording medium 40. In the case where the SIL 50 and the surface of the information recording medium 40 are completely in contact, the transmittance, to the surface of the information recording medium, of the outgoing beam that has entered the SIL 50 is maximum, so that the amount of the return beam is minimum. On the other hand, in the case where the SIL 50 and the surface of the information recording medium 40 are sufficiently distant, near-field light is not generated, and thus the light in the zone of the light that has entered the SIL 50 is reflected completely, so that the amount of the return beam is maximum. In the middle case between the above-mentioned two cases, the amount of the return beam varies approximately in proportion to the distance between the SIL 50 and the information recording medium 40. Accordingly, in the state where near-field light is generated by the SIL 50, it is possible to detect the distance between the SIL 50 and the surface of the information recording medium 40 by detecting the total amount of optical beam incident to the first detector 67.

The configuration of the second detection system 78 is as follows.

The return beam reflected by the polarized beam splitter 7 is collected by the second detection lens 68 and enters second detector 69. The amount of the optical beam incident to the second detector 69 corresponds to the amount of the light reflected from the information layer of the information recording medium 40. In the state where near-field light is generated, the laser beam 10 is transmitted between the SIL 50 and the information recording medium, and thus reflection can be obtained from the information layers.

The second detection lens 68 is intended not only to focus optical beam for the second detector 69 but also to detect a focus state. For example, the second detection lens 68 may be embodied by a combination lens for detecting the focus state by astigmatism. The second detector 69 functions to detect a focus state and a tracking state. Therefore, the second detector 69 preferably is embodied by plurally dividing a light receiving element.

Hereinafter, an electrical system and a control system are described.

A system control circuit 70 is a circuit for controlling the entire focus system in this embodiment. A distance detection circuit 71 is a circuit for outputting the total amount of light received by the first detector 67 as electrical signals (voltage values).

A distance control circuit 72 is a circuit for passing a drive current to the actuator 65 in order to adjust the position of the collective device 61 in the light axis direction. This circuit changes the drive current for the actuator 65 so that the electrical signals from the distance detection circuit 71 are constant and the circuit also servo-controls the distance between the SIL 50 and the surface of the information recording medium 40 to be constant.

A focus detection circuit 73 is a circuit for detecting a focus state based on the light received by the second detector 69. In view of the ease of focus control, the electrical signals output from the circuit preferably are generated as focus error signals (that is, S-shaped curve signals) as follows. That is, assuming that the state of focusing on a desired information layer is zero, if a close side seen from the incident side is focused, a positive voltage is generated, and if a far side seen from the incident side is focused, a negative voltage is generated. In this regard, the relationship between the focal point and the voltage polarity may be reversed from the above.

A focus control circuit 74 changes the drive current for the actuator 60 so that the electrical signals (voltage values) from the focus detection circuit 73 are zero or constant, and servo-controls the focal point of the laser beam 10 in the light axis direction of the laser beam 10 so as to be maintained at a point on the desired information layer.

It should be noted that FIG. 6 indicates only a configuration necessary for describing this embodiment and example, and therefore does not indicates circuits such as a tilt detection circuit, a tracking servo control circuit, a reproduction signal processing circuit, and a waveform generation circuit for a recording pulse. In an actual recording/reproducing apparatus, these circuits are added, as needed.

EXAMPLES

Hereafter, the present invention is described in detail by way of examples.

Example 1

In Example 1, information recording media each including one information layer were produced as samples for reference. This information layer had the same film structure as in the information layer 110 of the information recording medium 100 indicated in FIG. 1 except that the dielectric layer 118 was not provided. That is, they were samples each having a structure in which a dielectric layer a and a dielectric layer b satisfying a relationship of $n_b < n < n_a$ was not provided on the optical beam incident side with respect to the recording layer 115. It should be noted that the sample thus produced herein is described while incorporating FIG. 1 for convenience of description.

Optical calculations for the reflectance Rc (%) and the reflectance ratio Rc/Ra of each sample were performed by varying the refractive index n of the transparent layer 102, the refractive index and the thickness of the dielectric layer 117, and the thickness of the interface layer 114. As examples, calculations were performed for a structure in which 80 nm of the reflective layer 112 (0.2-i2), the interface layer 114 (2.0-i0.0), 11 nm of the recording layer 115 (crystalline phase: 1.9-i3.5, amorphous phase: 3.2-i2.2), and 5 nm of the interface layer 116 (2.3-i0.1), the dielectric layer 117 (2.2-i0.0), the transparent layer 102 were disposed on the substrate 101 (1.6-i0.0) in this order. Note that the parentheses for each layer indicates its optical constant n-ik. In the following examples, the optical constant will be indicated in the same manner. In this structure, assuming that the interface layer 114 combined the function of the dielectric layer 113, the dielectric layer 113 was not provided. Further, a dielectric layer on the laser beam 10 incident side with respect to the recording layer 115 is only the dielectric layer 117.

The thickness of each of the dielectric layer 117 and the interface layer 114 was varied with respect to three kinds of the transparent layers 102, respectively, having a refractive index n of 1.5, 1.8, and 2.1. The thickness of the dielectric layer 117 was calculated from $2\lambda/(64n_2)$ to $32\lambda/(64n_2)$ with respect to two kinds of refractive indexes $n_2$ of 2.2 and 2.5. The thickness of the interface layer 114 was calculated from $2\lambda/(64n_5)$ to $32\lambda/(64n_5)$ with respect to a refractive index $n_5$ of 2.0. In both cases, the calculations were performed for every $2\lambda/64$, and $\lambda$ was 405 (nm). Table 1-1 to Table 1-3 indicate the calculation results.

TABLE 1-1

| Refractive index n of transparent layer 102 | Thickness of dielectric layer 117 *λ/(64n₂)(nm) | Thickness of interface layer 114 *λ/(64n₅)(nm) n₅ = 2.0 | | | | | | | | | | Thickness of dielectric layer 117 *λ/(64n₂)(nm) | Thickness of interface layer 114 *λ/(64n₅)(nm) n₅ = 2.0 | | | | | | | | | |
|---|---|---|---|---|---|---|---|---|---|---|---|---|---|---|---|---|---|---|---|---|---|---|
| | n₂ = 2.2 | 2 | 4 | 6 | 8 | 10 | 12 | 14 | ... | 28 | 30 | 32 | n₂ = 2.5 | 2 | 4 | 6 | 8 | 10 | 12 | 14 | ... | 28 | 30 | 32 |
| 1.5 | 32 | S2 | S1 | | | | | | | | | | 32 | S2 | S1 | | | | | | | | | S3 |
| | 30 | S3 | S2 | | | | | | | | | | 30 | S3 | S2 | | | | | | | | | |
| | 28 | S3 | S2 | S1 | | | | | | | | | 28 | S3 | S3 | S2 | | | | | | | | |
| | 26 | S3 | S3 | S2 | | | | | | | | | 26 | | S3 | S3 | S2 | | | | | | | |
| | 24 | S3 | S3 | S2 | S1 | | | | | | | | 24 | | S3 | S3 | S2 | S1 | | | | | | |
| | 22 | S3 | S3 | S2 | S1 | A | | | | | | | 22 | | S3 | S3 | S2 | S1 | A | | | | | |
| | 20 | S3 | S3 | S2 | S1 | A | | | | | | | 20 | | S3 | S3 | S2 | S1 | A | | | | | |

TABLE 1-1-continued

| Refractive index n of transparent layer 102 | Thickness of dielectric layer 117 *λ/ (64n$_2$)(nm) n$_2$ = 2.2 | Thickness of interface layer 114 *λ/ (64n$_5$)(nm) n$_5$ = 2.0 | | | | | | | | | | Thickness of dielectric layer 117 *λ/ (64n$_2$)(nm) n$_2$ = 2.5 | Thickness of interface layer 114 *λ/ (64n$_5$)(nm) n$_5$ = 2.0 | | | | | | | | | |
|---|---|---|---|---|---|---|---|---|---|---|---|---|---|---|---|---|---|---|---|---|---|---|
| | | 2 | 4 | 6 | 8 | 10 | 12 | 14 | ... | 28 | 30 | 32 | | 2 | 4 | 6 | 8 | 10 | 12 | 14 | ... | 28 | 30 | 32 |
| | 18 | S3 | S2 | S1 | A | A | B | | | | | | 18 | S3 | S2 | S2 | S1 | A | B | | | | | |
| | 16 | S2 | S1 | A | A | B | | | | | | | 16 | S2 | S2 | S1 | A | B | | | | | | |
| | 14 | S1 | A | A | B | | | | | | | S2 | 14 | | S1 | A | | | | | | | | |
| | 12 | A | B | B | | | | | | | S2 | S1 | 12 | | | | | | | | | | S1 | A |
| | 10 | B | B | | | | | | | | S1 | A | 10 | | | | | | | | | | S1 | A |
| | 8 | B | | | | | | | | B2 | S1 | A | 8 | B | | | | | | | | S2 | A | B |
| | 6 | B | | | | | | | | | S2 | A | 6 | B | | | | | | | | S2 | S1 | B |
| | 4 | A | | | | | | | | | S3 | S1 | 4 | B | | | | | | | | | S2 | S1 |
| | 2 | S1 | A | | | | | | | | S3 | S2 | 2 | S1 | A | | | | | | | | S3 | S2 |

B: Rc < 15,
A: 15 ≤ Rc < 20,
S1: 20 ≤ Rc < 25,
S2: 25 ≤ Rc < 30, and
S3: 30 ≤ Rc

TABLE 1-2

| Refractive index n of transparent layer 102 | Thickness of dielectric layer 117 *λ/ (64n$_2$)(nm) n$_2$ = 2.2 | Thickness of interface layer 114 *λ/(64n$_5$)(nm) n$_5$ = 2.0 | | | | | | | | | | Thickness of dielectric layer 117 *λ/ (64n$_2$)(nm) n$_2$ = 2.5 | Thickness of interface layer 114 *λ/(64n$_5$)(nm) n$_5$ = 2.0 | | | | | | | | | |
|---|---|---|---|---|---|---|---|---|---|---|---|---|---|---|---|---|---|---|---|---|---|---|
| | | 2 | 4 | 6 | 8 | 10 | 12 | 14 | ... | 28 | 30 | 32 | | 2 | 4 | 6 | 8 | 10 | 12 | 14 | ... | 28 | 30 | 32 |
| 1.8 | 32 | S1 | A | B | | | | | | | | S2 | 32 | S1 | A | B | | | | | | | | S2 |
| | 30 | S2 | S1 | A | | | | | | | | S3 | 30 | S2 | S1 | A | | | | | | | | S3 |
| | 28 | S2 | S1 | A | | | | | | | | S3 | 28 | S3 | S2 | S1 | A | | | | | | | |
| | 26 | S2 | S1 | A | A | | | | | | | S3 | 26 | S3 | S2 | S1 | A | | | | | | | |
| | 24 | S2 | S1 | S1 | A | | | | | | | S3 | 24 | S3 | S2 | S1 | S1 | A | | | | | | |
| | 22 | S2 | S1 | S1 | A | B | | | | | | S3 | 22 | S3 | S2 | S1 | S1 | A | | | | | | |
| | 20 | S2 | S1 | A | A | B | | | | | | S3 | 20 | S3 | S2 | S1 | A | A | B | | | | | |
| | 18 | S2 | S1 | A | B | B | | | | | | S2 | 18 | S2 | S2 | S1 | A | B | B | | | | | |
| | 16 | S1 | A | A | B | B | | | | | | S2 | 16 | S2 | S1 | A | A | B | B | | | | | |
| | 14 | S1 | A | B | B | | | | | | | S1 | 14 | S1 | A | A | B | B | | | | | | S2 |
| | 12 | A | B | B | B | | | | | | S2 | S1 | 12 | A | A | B | | | | | | | | S1 |
| | 10 | A | B | B | | | | | | | S2 | S1 | 10 | A | B | B | | | | | | | S1 | A |
| | 8 | A | B | B | | | | | | | S2 | S1 | 8 | B | B | | | | | | | | S1 | A |
| | 6 | A | B | | | | | | | | S2 | S1 | 6 | B | B | | | | | | | | S1 | A |
| | 4 | A | B | | | | | | | | S2 | S1 | 4 | A | B | | | | | | | | S2 | S1 |
| | 2 | S1 | A | | | | | | | | S3 | S2 | 2 | S1 | A | | | | | | | | S3 | S1 |

B: Rc < 15,
A: 15 ≤ Rc < 20,
S1: 20 ≤ Rc < 25,
S2: 25 ≤ Rc < 30, and
S3: 30 ≤ Rc

TABLE 1-3

| Refractive index n of transparent layer 102 | Thickness of dielectric layer 117 *λ/ (64n$_2$)(nm) n$_2$ = 2.2 | Thickness of interface layer 114 *λ/(64n$_5$)(nm) n$_5$ = 2.0 | | | | | | | | | | Thickness of dielectric layer 117 *λ/ (64n$_2$)(nm) n$_2$ = 2.5 | Thickness of interface layer 114 *λ/(64n$_5$)(nm) n$_5$ = 2.0 | | | | | | | | | |
|---|---|---|---|---|---|---|---|---|---|---|---|---|---|---|---|---|---|---|---|---|---|---|
| | | 2 | 4 | 6 | 8 | 10 | 12 | 14 | ... | 28 | 30 | 32 | | 2 | 4 | 6 | 8 | 10 | 12 | 14 | ... | 28 | 30 | 32 |
| 2.1 | 32 | S1 | A | B | | | | | | | | S1 | 32 | S1 | A | B | | | | | | | | S1 |
| | 30 | S1 | A | B | | | | | | | | S1 | 30 | S1 | A | B | B | | | | | | | S2 |
| | 28 | S1 | A | B | B | | | | | | | S2 | 28 | S1 | S1 | A | B | | | | | | | S2 |
| | 26 | S1 | A | B | B | | | | | | | S2 | 26 | S2 | S1 | A | B | | | | | | | S2 |
| | 24 | S1 | A | B | B | | | | | | | S2 | 24 | S2 | S1 | A | B | B | | | | | | S2 |
| | 22 | S1 | A | B | B | | | | | | | S2 | 22 | S2 | S1 | A | B | B | | | | | | S2 |
| | 20 | S1 | A | B | B | | | | | | | S2 | 20 | S2 | S1 | A | B | B | | | | | | S2 |
| | 18 | S1 | A | B | B | | | | | | | S1 | 18 | S1 | A | A | B | B | | | | | | S1 |
| | 16 | S1 | A | B | B | | | | | | | S1 | 16 | S1 | A | B | B | | | | | | | S1 |
| | 14 | S1 | A | B | B | | | | | | | S1 | 14 | S1 | A | B | B | | | | | | | S1 |
| | 12 | A | A | B | B | | | | | | S2 | S1 | 12 | A | A | B | B | | | | | | | S1 |
| | 10 | A | A | B | B | | | | | | S2 | S1 | 10 | A | B | B | B | | | | | | S2 | S1 |

TABLE 1-3-continued

| Refractive index n of transparent layer 102 | Thickness of dielectric layer 117 *λ/(64n₂)(nm) $n_2 = 2.2$ | Thickness of interface layer 114 *λ/(64n₅)(nm) $n_5 = 2.0$ | | | | | | | | | | Thickness of dielectric layer 117 *λ/(64n₂)(nm) $n_2 = 2.5$ | Thickness of interface layer 114 *λ/(64n₅)(nm) $n_5 = 2.0$ | | | | | | | | | |
|---|---|---|---|---|---|---|---|---|---|---|---|---|---|---|---|---|---|---|---|---|---|---|
| | | 2 | 4 | 6 | 8 | 10 | 12 | 14 | ... | 28 | 30 | 32 | | 2 | 4 | 6 | 8 | 10 | 12 | 14 | ... | 28 | 30 | 32 |
| | 8 | A | A | B | | | | | | | S2 | S1 | 8 | A | B | B | | | | | | | S2 | S1 |
| | 6 | A | A | B | | | | | | | S2 | S1 | 6 | A | B | B | | | | | | | S2 | S1 |
| | 4 | S1 | A | B | | | | | | | S2 | S1 | 4 | A | B | B | | | | | | | S2 | S1 |
| | 2 | S1 | A | B | | | | | | | S3 | S1 | 2 | A | A | B | | | | | | | S2 | S1 |

B: Rc < 15,
A: 15 ≦ Rc < 20,
S1: 20 ≦ Rc < 25,
S2: 25 ≦ Rc < 30, and
S3: 30 ≦ Rc Table 1-1 indicates the calculation results in the case of the refractive index n of the transparent layer 102 of 1.5, Table 1-2 indicates the calculation results in the case of the refractive index n of the transparent layer 102 of 1.8, and Table 1-3 indicates the calculation results in the case of the refractive index n of the transparent layer 102 of 2.1. B, A, S1, S2, and S3 in the tables are described as follows. B indicates a result satisfying 4≦Rc/Ra but Rc<15, A indicates a result satisfying 4≦Rc/Ra and 15≦Rc<20, S1 indicates a result satisfying 4≦Rc/Ra and 20≦Rc<25, S2 indicates a result satisfying 4≦Rc/Ra and 25≦Rc<30, and S3 indicates a result satisfying 4≦Rc/Ra and 30≦Rc. In this example, although it is preferable to satisfy 15≦Rc, practical use is possible upon satisfying 4≦Rc/Ra. A higher Rc improves the signal quality, and thus the practical use is possible even in the film thickness range of the result B. The film thickness range of the result A is preferable, and the film thickness ranges of the results S1, S2 and S3 are more preferable for the practical use. Blanks in the tables indicate the result of Rc/Ra<4. Further, the thickness of the interface layer 114 from 16λ/(64n₅) to 26λ/(64n₅) resulted in Rc/Ra<4, and thus there is no indication for it.

It was understood from Table 1-1 to Table 1-3 that the greater the difference between the refractive index n of the transparent layer 102 and the refractive index n₂ of the dielectric layer 117 was, Rc was increased more easily and the preferable thickness range of the interface layer 114 was more increased. Further, there was found the preferable thickness of the dielectric layer 117 and the interface layer 114 in the case of varying the refractive index of the transparent layer 102 in the information recording medium 100 in which recording/reproduction was performed using an optical system with NA>1.

According to the results indicated in Table 1-1, when the refractive index n of the transparent layer 102 was 1.5, the difference from the refractive index n₂ of the dielectric layer 117 was increased, and thus the film thickness range indicating good optical properties was increased. In contrast, when the refractive index n of the transparent layer 102 was 1.8 or 2.1, the difference from the refractive index n₂ of the dielectric layer 117 was not increased, and thus the film thickness range indicating good optical properties is decreased, resulting in a difficulty in the optical design. In the case of the information recording medium of the present invention that can achieve a high recording density by means of an optical system having NA>1 using an SIL, as aforementioned, the refractive index n of the transparent layer 102 is desirably greater than the refractive index n₅ of the SIL, and therefore the refractive index n of the transparent layer 102 is 1.75 or more. According to the results indicated in Table 1-1 to Table 1-3, when the refractive index n of the transparent layer is 1.75 or more, the film thickness range that can be selected is decreased, and thus it seems that a design for obtaining a good optical property becomes difficult.

It should be noted that although the dielectric layer 113 was not provided in the sample of the present example by assuming that the interface layer 114 combines the function of the dielectric layer 113, even if the calculations were performed by, for example, assuming that the dielectric layer 113 was provided together with the interface layer 114 of 5 nm, and varying the thickness of the dielectric layer 113, the calculation results have the same tendency.

Example 2

In Example 2, optical calculations for a sample having a refractive index n of the transparent layer 102 of 2.4 were performed in the same manner as in Example 1, with the same structure as in each sample of Example 1. The sample of Example 2 was different from that of Example 1 in that the calculations were performed also for the structure in which the dielectric layer 118 (1.6-i0.0) was further provided on the laser beam 10 incident side of the dielectric layer 117. Table 2-1 and Table 2-2 indicate the calculation results.

TABLE 2-1

| Refractive index n of transparent layer 102 | Dielectric layer 118 | Thickness of dielectric layer 117 *λ/(64n₂)(nm) $n_2 = 2.2$ | Thickness of interface layer 114 *λ/(64n₅)(nm) $n_5 = 2.0$ | | | | | | | | Thickness of dielectric layer 117 *λ/(64n₂)(nm) $n_2 = 2.5$ | Thickness of interface layer 114 *λ/(64n₅)(nm) $n_5 = 2.0$ | | | | | | | |
|---|---|---|---|---|---|---|---|---|---|---|---|---|---|---|---|---|---|---|---|
| | | | 2 | 4 | 6 | 8 | 10 | 12 | ... | 30 | 32 | | 2 | 4 | 6 | 8 | 10 | 12 | ... | 30 | 32 |
| 2.4 | Without | 32 | A | A | B | B | | | | | S1 | 32 | A | A | B | B | | | | | S1 |
| | | 30 | A | A | B | B | | | | | S1 | 30 | A | A | B | B | | | | | S1 |
| | | 28 | A | A | B | B | | | | S2 | S1 | 28 | A | A | B | B | | | | | S1 |

TABLE 2-1-continued

| Refractive index n of transparent layer 102 | Dielectric layer 118 | Thickness of dielectric layer 117 *λ/(64n$_2$)(nm) n$_2$ = 2.2 | Thickness of interface layer 114 *λ/(64n$_5$)(nm) n$_5$ = 2.0 | | | | | | | | Thickness of dielectric layer 117 *λ/(64n$_2$)(nm) n$_2$ = 2.5 | Thickness of interface layer 114 *λ/(64n$_5$)(nm) n$_5$ = 2.0 | | | | | | | |
|---|---|---|---|---|---|---|---|---|---|---|---|---|---|---|---|---|---|---|---|
| | | | 2 | 4 | 6 | 8 | 10 | 12 | ... | 30 | 32 | | 2 | 4 | 6 | 8 | 10 | 12 | ... | 30 | 32 |
| | | 26 | A | B | B | B | | | | S1 | S1 | 26 | S1 | A | B | B | | | | | S1 |
| | | 24 | A | B | B | | | | | S1 | S1 | 24 | S1 | A | B | B | | | | | S1 |
| | | 22 | A | B | B | | | | | S2 | S1 | 22 | S1 | A | B | B | | | | | S1 |
| | | 20 | A | B | B | | | | | S2 | S1 | 20 | S1 | A | B | B | | | | | S1 |
| | | 18 | A | B | B | | | | | S2 | S1 | 18 | A | A | B | B | | | | | S1 |
| | | 16 | A | B | B | | | | | | S1 | 16 | A | A | B | B | | | | | S1 |
| | | 14 | A | A | B | | | | | | S1 | 14 | A | A | B | B | | | | | S1 |
| | | 12 | S1 | A | B | B | | | | | S1 | 12 | A | A | B | B | | | | | S1 |
| | | 10 | S1 | A | B | B | | | | | S1 | 10 | A | B | B | B | | | | | S1 |
| | | 8 | S1 | A | B | B | | | | | S1 | 8 | A | B | B | B | | | | | S1 |
| | | 6 | S1 | A | B | B | | | | | S1 | 6 | A | B | B | B | | | | | S1 |
| | | 4 | S1 | A | B | B | | | | | S1 | 4 | A | A | B | B | | | | | S1 |
| | | 2 | S1 | A | B | B | | | | | S1 | 2 | A | A | B | B | | | | | S1 |

B: Rc < 15,
A: 15 ≦ Rc < 20,
S1: 20 ≦ Rc < 25,
S2: 25 ≦ Rc < 30, and
S3: 30 ≦ Rc

TABLE 2-2

| Refractive index n of transparent layer 102 | Dielectric layer 118 | Thickness of dielectric layer 117 *λ/(64n$_2$)(nm) n$_2$ = 2.2 | Thickness of interface layer 114 *λ/(64n$_5$)(nm) n$_5$ = 2.0 | | | | | | | | Thickness of dielectric layer 117 *λ/(64n$_2$)(nm) n$_2$ = 2.5 | Thickness of interface layer 114 *λ/(64n$_5$)(nm) n$_5$ = 2.0 | | | | | | | |
|---|---|---|---|---|---|---|---|---|---|---|---|---|---|---|---|---|---|---|---|
| | | | 2 | 4 | 6 | 8 | 10 | 12 | ... | 30 | 32 | | 2 | 4 | 6 | 8 | 10 | 12 | ... | 30 | 32 |
| 2.4 | With Refractive index: 1.6 Film thickness: 16 nm | 32 | S2 | S1 | A | B | | | | | | 32 | S2 | S1 | A | B | | | | | |
| | | 30 | S2 | S1 | A | A | | | | | | 30 | S2 | S1 | S1 | A | | | | | |
| | | 28 | S2 | S1 | A | B | B | | | | | 28 | S2 | S1 | S1 | A | B | | | | |
| | | 26 | S1 | S1 | A | B | B | | | | | 26 | S2 | S1 | S1 | A | B | B | | | |
| | | 24 | S1 | A | A | B | B | | | | S1 | 24 | S2 | S1 | A | A | B | B | | | |
| | | 22 | A | A | B | B | B | | | | S1 | 22 | S1 | S1 | A | B | B | B | | | |
| | | 20 | A | B | B | B | | | | S1 | A | 20 | S1 | A | B | B | B | | | | |
| | | 18 | B | B | B | | | | | A | A | 18 | A | B | B | B | | | | | A |
| | | 16 | B | B | | | | | | A | B | 16 | B | B | B | | | | | A | A |
| | | 14 | B | B | | | | | | A | B | 14 | B | B | | | | | | A | B |
| | | 12 | B | B | | | | | | S1 | A | 12 | B | B | | | | | | A | B |
| | | 10 | A | B | | | | | | S1 | A | 10 | B | B | | | | | | S1 | A |
| | | 8 | A | B | | | | | | S1 | | 8 | B | B | | | | | | S1 | A |
| | | 6 | S1 | A | | | | | | S2 | | 6 | A | B | | | | | | S2 | S1 |
| | | 4 | S1 | A | A | | | | | S2 | | 4 | S1 | A | B | | | | | | S2 |
| | | 2 | S2 | S1 | A | | | | | S2 | | 2 | S1 | S1 | A | | | | | | S2 |

B: Rc < 15,
A: 15 ≦ Rc < 20,
S1: 20 ≦ Rc < 25,
S2: 25 ≦ Rc < 30, and
S3: 30 ≦ Rc Table 2-1 indicates results for a comparative example of the present invention produced as a sample without the dielectric layer 118. Similarly to Example 1, the thickness of the dielectric layer 117 was calculated from $2\lambda/(64n_2)$ to $32\lambda/(64n_2)$ with respect to two kinds of refractive indexes $n_2$ of 2.2 and 2.5. The thickness of the interface layer 114 was calculated from $2\lambda/(64n_5)$ to $32\lambda/(64n_5)$ with respect to a refractive index $n_5$ of 2.0. Table 2-2 indicates results for an example of the present invention produced as a sample provided with the dielectric layer 118 having a thickness of 16 nm. In the same manner as in Example 1, the thickness of the dielectric layer 117 was calculated from $2\lambda/(64n_2)$ to $32\lambda/(64n_2)$ with respect to two kinds of refractive indexes $n_2$ of 2.2 and 2.5, and the thickness of the interface layer 114 was calculated from $2\lambda/(64n_5)$ to $32\lambda/(64n_5)$ with respect to a refractive index $n_5$ of 2.0. In the tables, B, A, S1, S2, S3 and blanks are defined in the same manner as in Example 1.

As can be seen from Table 2-1, whether the relationship between the refractive index n of the transparent layer 102 and the refractive index $n_2$ of the dielectric layer 117 was n>$n_2$ or n<$n_2$, as long as the thickness of the interface layer 114 was $12\lambda/(64n_5)$ or less, Rc was at most S1. This result confirmed that when the transparent layer 102 had a high refractive index n, the difference from the refractive index $n_2$ of the dielectric layer 117 cannot be increased, and therefore the preferable thickness range of each of the dielectric layer 117 and the interface layer 114 was decreased. On the other hand, as can be seen from results of Table 2-2 in which 16 nm of the dielectric layer 118 was provided, the reflectance Rc was increased up to S2, and the thickness range of the interface layer 114 was increased. Among these structures, the thickness range of the interface layer 114 further was increased by, when the refractive index $n_2$ of the dielectric layer 117 was 2.5, employing a structure that satisfied a relationship of (the refractive index of the dielectric layer 118)<(the refractive index of the transparent layer 102)<(the refractive index of the dielectric layer 117), that is, $n_b<n<n_a$. In this way, with respect to the transparent layer 102 having a high refractive index n, two dielectric layers {the dielectric layer 117 (dielectric layer a) and the dielectric layer 118 (dielectric layer b)} each having a different refractive index are provided on the laser beam 10 incident side, and further their refractive indexes satisfy a relationship of $n_b<n<n_a$, thereby allowing the reflectance to be increased.

Example 3

In Example 3, samples were produced for studying how the compatibility of Rc, Rc/Ra, and (Tc+Ta)/2 of the second information layer 220 changes in the case of changing the high/low relationships of the refractive index n of the transparent layer 202 (the refractive index of the interlayer 203 also is the same as the refractive index n), the refractive index $n_a$ of the dielectric layer 227, and the refractive index $n_b$ of the dielectric layer 228 in the structure of the second information layer 220 of the information recording medium 200 in FIG. 2. The optical calculations were performed for each sample. As examples, calculations were performed for a structure in which 19 nm of the dielectric layer 221 (2.7-i0.0), 10 nm of the reflective layer 222 (0.1-i2), 10 nm of the interface layer 224 (2.3-i0.1), 6.5 nm of the recording layer 225 (crystalline phase: 1.9-i3.5, amorphous phase: 3.2-i2.2), 5 nm of the interface layer 226 (2.3-i0.1), 40 nm of the dielectric layer 227 (refractive index $n_a$), 0 or 10 nm of the dielectric layer 228 (refractive index $n_b$), and the transparent layer 202 (1.8-i0.0) were arranged on the interlayer 203 (1.8-i0.0) in this order. In this structure, assuming that the interface layer 224 combined the function of the dielectric layer 223, the dielectric layer 223 was not provided. Table 3 indicates the calculation results.

In order to determine the preferable high/low relationships of the refractive index n, the refractive index $n_a$, and the refractive index $n_b$, temporary values for Rc, Rc/Ra, and (Tc+Ta)/2 to be satisfied will be described. For the second information layer 220 with a high transmittance and a good recording/reproducing performance, it is at least necessary to satisfy $4 \leq Rc/Ra$ and $45 \leq (Tc+Ta)/2$.

A structure 1 and a structure 2 are not provided with the dielectric layer 228. Structures from a structure 3 to a structure 10 are provided with the dielectric layer 228. A "good" in the status column indicates a practically available structure for the second information layer 220 and a "no-good" in the status column indicates a structure with no practical availability. In all the structures 1 to 10, when $n_a$ was n or less, Rc and Ra both increased and Rc/Ra decreased as well as (Tc+Ta)/2 decreased. Thus, there was no expectation for practical availability. Rc/Ra fell below 4 in most structures. What was common in all the structures that had been determined to be "good" was that $n_a$ was highest. When this relationship is maintained, Rc and Ra both decrease, and the transmittance is improved as much.

It was understood from the results of this example that a practical availability can be expected with the relationship of the refractive indexes in the structure 1, which was $n<n_a$, in the structure 4, which was $n<n_b<n_a$, and in the structure 7, which was $n_b<n<n_a$. In the following examples 4 and 5, optical calculations were performed in detail with respect to the thickness of the dielectric layer and the interface layer, and the most preferable structure was studied. It should be noted that the lower limit of Rc/Ra required in this example is 4 with one significant digit, as mentioned above. Accordingly, the value of Rc/Ra 3.9 in the structure 4 satisfies $4 \leq Rc/Ra$.

Example 4

In Example 4, optical calculations were performed in detail with respect to the structure 1 of Example 3 for reference. The structure 1 is a structure in which 19 nm of the dielectric layer 221 (2.7-i0.0), 10 nm of the reflective layer 222 (0.1-i2), the interface layer 224 (2.3-i0.1), 6.5 nm of the recording layer 225 (crystalline phase: 1.9-i3.5, amorphous phase: 3.2-i2.2), 5 nm of the interface layer 226 (2.3-i0.1), the dielectric layer 227 (2.2-i0.0), and the transparent layer 202 (refractive index n) were arranged on the interlayer 203 (refractive index n) in this order. The values of Rc, Rc/Ra, and (Tc+Ta)/2 were calculated herein with respect to samples in which the thickness of the interface layer 224 was varied from $2\lambda/(64n_6)$ to $32\lambda/(64n_6)$, and the thickness of the dielectric layer 227 was varied from $2\lambda/(64n_a)$ to $32\lambda/(64n_a)$. It should be noted that $n_s$ indicates the refractive index of the interface layer 224, and $n_a$ indicates the refractive index of the dielectric layer 227.

TABLE 3

| Structure No. | Relationship of n, $n_a$, and $n_b$ | Refractive index n of transparent layer 202 and interlayer 203 | Dielectric layer 228 | | Dielectric layer 227 | | Rc (%) | Rc/Ra | (Tc + Ta)/2 (%) | Status |
|---|---|---|---|---|---|---|---|---|---|---|
| | | | Refractive index $n_b$ | Film thickness (nm) | Refractive index $n_a$ | Film thickness (nm) | | | | |
| 1 | $n < n_a$ | 1.8 | Without | 0 | 2.2 | 40 | 8.9 | 4.8 | 50.3 | good |
| 2 | $n_a < n$ | | | | 1.6 | 55 | 19.2 | 1.5 | 43.2 | no-good |
| 3 | $n < n_a < n_b$ | | 2.2 | 8.6 | 2.0 | 44 | 13.4 | 2.5 | 47.4 | no-good |
| 4 | $n < n_b < n_a$ | | 2.0 | 9.5 | 2.2 | 40 | 10.3 | 3.9 | 49.4 | good |
| 5 | $n_a < n < n_b$ | | 2.2 | 8.6 | 1.6 | 55 | 21.4 | 1.5 | 41.8 | no-good |
| 6 | $n_a < n_b < n$ | | 1.7 | 11 | 1.6 | 55 | 18.5 | 1.5 | 43.3 | no-good |
| 7 | $n_b < n < n_a$ | | 1.6 | 12 | 2.2 | 40 | 7.2 | 6.5 | 50.9 | good |
| 8 | $n_b < n_a < n$ | | 1.6 | | 1.7 | 52 | 14.7 | 1.6 | 45.6 | no-good |
| 9 | $n_b < n = n_a$ | | 1.6 | | 1.8 | 49 | 12.4 | 1.9 | 47.2 | no-good |
| 10 | $n = n_a < n_b$ | | 2.0 | 9.5 | | | 15.2 | 1.9 | 45.8 | no-good |

Assuming that the transparent layer 202 and the interlayer 203 had an equivalent refractive index n, and calculations were performed with respect to the cases of n=1.5 and 1.8. Table 4-1 indicates the calculation results when n=1.5, and Table 4-2 indicates the calculation results when n=1.8.

film thickness range of the result B. The film thickness range of the result A satisfying $5 \leq Rc \leq 10$ is preferable, and the film thickness ranges of the results S and SS with a higher transmittance are more preferable for the practical use. Blanks in the tables indicate the result of Rc/Ra<4 or (Tc+Ta)/2<45.

TABLE 4-1

| Refractive index n of transparent layer 202 | | Thickness of dielectric layer 227 *λ/(64n$_a$)(nm) | Thickness of interface layer 224 *λ/(64n$_6$)(nm) $n_6 = 2.3$ | | | | | | |
|---|---|---|---|---|---|---|---|---|---|
| and interlayer 203 | Dielectric layer 228 | $n_a = 2.2$ | 2 | 4 | 6 | 8 | 10 | 12 | 14 |
| 1.5 | Without | 32 | | | | | | | |
| | | 30 | | | | | | | |
| | | 28 | | | | | | | |
| | | 26 | | | | | | | |
| | | 24 | | | | | | | |
| | | 22 | | | | | | | |
| | | 20 | | | | | | | |
| | | 18 | | | | | | | |
| | | 16 | | | | | | | |
| | | 14 | SS | SS | SS | S | A | A | A |
| | | 12 | B | B | B | B | B | B | B |
| | | 10 | | | B | B | | | |
| | | 8 | | | | | | | |
| | | 6 | | | | | | | |
| | | 4 | | | | | | | |
| | | 2 | | | | | | | |

B: $2 \leq Rc < 5$
A: $45 \leq (Tc + Ta)/2 < 48$, $5 \leq Rc \leq 10$, $4 \leq Rc/Ra$
S: $48 \leq (Tc + Ta)/2 < 50$, $5 \leq Rc \leq 10$, $4 \leq Rc/Ra$
SS: $50 \leq (Tc + Ta)/2$, $5 \leq Rc \leq 10$, $4 \leq Rc/Ra$

TABLE 4-2

| Refractive index n of transparent layer 202 | | Thickness of dielectric layer 227 *λ/(64n$_a$)(nm) | Thickness of interface layer 224 *λ/(64n$_6$)(nm) $n_6 = 2.3$ | | | | | | |
|---|---|---|---|---|---|---|---|---|---|
| and interlayer 203 | Dielectric layer 228 | $n_a = 2.2$ | 2 | 4 | 6 | 8 | 10 | 12 | 14 |
| 1.8 | Without | 32 | | | | | | | |
| | | 30 | | | | | | | |
| | | 28 | | | | | | | |
| | | 26 | | | | | | | |
| | | 24 | | | | | | | |
| | | 22 | | | | | | | |
| | | 20 | | | | | | | |
| | | 18 | | | | A | | | |
| | | 16 | | | S | A | A | | |
| | | 14 | | | SS | A | A | | |
| | | 12 | | SS | SS | S | A | B | |
| | | 10 | | | SS | S | B | | |
| | | 8 | | | | | | | |
| | | 6 | | | | | | | |
| | | 4 | | | | | | | |
| | | 2 | | | | | | | |

B: $2 \leq Rc < 5$
A: $45 \leq (Tc + Ta)/2 < 48$, $5 \leq Rc \leq 10$, $4 \leq Rc/Ra$
S: $48 \leq (Tc + Ta)/2 < 50$, $5 \leq Rc \leq 10$, $4 \leq Rc/Ra$
SS: $50 \leq (Tc + Ta)/2$, $5 \leq Rc \leq 10$, $4 \leq Rc/Ra$ B, A, S, and SS in the tables are described as follows. B indicates a result satisfying $2 \leq Rc < 5$, A indicates a result satisfying $45 \leq (Tc+Ta)/2 < 48$, $5 \leq Rc \leq 10$ and $4 \leq Rc/Ra$, S indicates a result satisfying $48 \leq (Tc+Ta)/2 < 50$, $5 \leq Rc \leq 10$ and $4 \leq Rc/Ra$, and SS indicates a result satisfying $50 \leq (Tc+Ta)/2$, $5 \leq Rc \leq 10$ and $4 \leq Rc/Ra$. All structures are practically available. The higher the reflectance ratio Rc/Ra is, the more the signal amplitude is improved, and the higher the average transmittance (Tc+Ta)/2 is, the more amount of light is transmitted to the first information layer 210. Further, although a high Rc can improve the signal quality, in order to allow a transmittance of about 50%, the reflectance Rc preferably satisfies $5 \leq Rc \leq 10$. The practical use is possible even in the film thickness range of the result B. Further, the thickness of the interface layer 114 from $16\lambda/(64n_5)$ to $32\lambda/(64n_5)$ resulted in Rc/Ra<4 or (Tc+Ta)/2<45, and thus there is no indication for it.

As can be seen from Table 4-1, when the refractive index n of the transparent layer 202 and the interlayer 203 is 1.5, in the case without the dielectric layer 228, the thickness of the dielectric layer 227 is preferably more than $12\lambda/(64n_a)$ but less than $16\lambda/(64n_a)$, that is, in the range of more than 34 nm but less than 45 nm. The thickness of the interface layer 224 is preferably less than $16\lambda/(64n_6)$, more preferably less than $10\lambda/(64n_6)$, further preferably less than $8\lambda/(64n_6)$, that is, less than 22 nm.

As can be seen from Table 4-2, when the refractive index of the transparent layer 202 and the interlayer 203 is 1.8, in the case without the dielectric layer 228, the thickness of the dielectric layer 227 is preferably more than $8\lambda/(64n_a)$ but less than $20\lambda/(64n_a)$, more preferably more than $8\lambda/(64n_a)$ but less than $18\lambda/(64n_a)$, further preferably more than $8\lambda/(64n_a)$ but less than $16\lambda/(64n_a)$, that is, more than 23 nm but less than 45 nm. The thickness of the interface layer 224 is preferably less than $10\lambda/(64n_6)$, more preferably less than $8\lambda/(64n_6)$, further preferably less than $6\lambda/(64n_6)$, that is, less than 17 nm.

Example 5

In Example 5, optical calculations were performed in detail with respect to the structure 4 and the structure 7 in Example 3. In each of the two structures, 19 nm of the dielectric layer 221 (2.7-i0.0), 10 nm of the reflective layer 222 (0.1-i2), the interface layer 224 (2.3-i0.1), 6.5 nm of the recording layer 225 (crystalline phase: 1.9-i3.5, amorphous phase: 3.2-i2.2), 5 nm of the interface layer 226 (2.3-i0.1), $14\lambda/(64n_a)$ of the dielectric layer 227 (refractive index $n_a$), $3\lambda/(64n_a)$ of the dielectric layer 228 (refractive index $n_b$), and the transparent layer 202 (1.8-i0.0) were arranged on the interlayer 203 (1.8-i0.0) in this order. The structure 4 satisfies $n<n_b<n_a$, and the structure 7 satisfies $n_b<n<n_a$. Table 5-1 indicates the calculation results for the structure 4, and Table 5-2 indicates the calculation results for the structure 7.

TABLE 5-1

| | | | Thickness of interface layer 224 *$\lambda/(64n_6)$(nm) $n_6 = 2.3$ | | | | |
|---|---|---|---|---|---|---|---|
| Refractive index n of transparent layer 202 and interlayer 203 | Dielectric layer 228 | Thickness of dielectric layer 228 *$\lambda/(64n_b)$(nm) $n_b = 2.0$ | 2 | 4 | 6 | 8 | 10 |
| 1.8 | With | 32 | | S | A | A | |
| | | 30 | SS | S | A | A | |
| | | 28 | | S | A | A | |
| | | 26 | | S | A | A | |
| | | 24 | | S | A | A | |
| | | 22 | | | A | A | |
| | | 20 | | | | | |
| | | 18 | | | | | |
| | | 16 | | | | | |
| | | 14 | | | | | |
| | | 12 | | | | | |
| | | 10 | | | | | |
| | | 8 | | | A | | |
| | | 6 | | | A | | |
| | | 4 | | | A | A | |
| | | 2 | | S | A | A | A |

B: $2 \leq Rc < 5$
A: $45 \leq (Tc + Ta)/2 < 48$, $5 \leq Rc \leq 10$, $4 \leq Rc/Ra$
S: $48 \leq (Tc + Ta)/2 < 50$, $5 \leq Rc \leq 10$, $4 \leq Rc/Ra$
SS: $50 \leq (Tc + Ta)/2$, $5 \leq Rc \leq 10$, $4 \leq Rc/Ra$

TABLE 5-2

| | | | Thickness of interface layer 224 *$\lambda/(64n_6)$(nm) $n_6 = 2.3$ | | | | | | | | | |
|---|---|---|---|---|---|---|---|---|---|---|---|---|
| Refractive index n of transparent layer 202 and interlayer 203 | Dielectric layer 228 | Thickness of dielectric layer 228 *$\lambda/(64n_b)$(nm) $n_b = 1.6$ | 2 | 4 | 6 | 8 | 10 | ... | 20 | 22 | 24 | 26 |
| 1.8 | With | 32 | | S | A | | | | | | | |
| | | 30 | | S | A | | | | | | | |
| | | 28 | | A | A | | | | | | | |
| | | 26 | | A | A | | | | | | | |
| | | 24 | | A | A | | | | | | | |
| | | 22 | | S | A | | | | | | | |
| | | 20 | | S | A | | | | B | B | | |
| | | 18 | SS | S | A | | | | B | B | B | A |
| | | 16 | SS | S | A | A | | | B | B | B | B |
| | | 14 | SS | S | A | A | | | | | B | B |
| | | 12 | SS | SS | S | A | B | | | | | |
| | | 10 | SS | SS | S | B | B | | | | | |
| | | 8 | SS | SS | S | B | B | | | | | |
| | | 6 | SS | SS | S | B | B | | | | | |
| | | 4 | SS | SS | S | A | B | | | | | |
| | | 2 | SS | SS | S | A | B | | | | | |

B: $2 \leq Rc < 5$
A: $45 \leq (Tc + Ta)/2 < 48$, $5 \leq Rc \leq 10$, $4 \leq Rc/Ra$
S: $48 \leq (Tc + Ta)/2 < 50$, $5 \leq Rc \leq 10$, $4 \leq Rc/Ra$
SS: $50 \leq (Tc + Ta)/2$, $5 \leq Rc \leq 10$, $4 \leq Rc/Ra$ In the tables, B, A, S, and SS are defined in the same manner as in Example 4. As can be seen from Table 5-1, SS evaluation of 50≦(Tc+Ta)/2 was given for the combination of the dielectric layer 228 having a thickness of more than $28\lambda/(64n_b)$ but less than $32\lambda/(64n_b)$, that is, more than 88 nm but less than 101 nm, and the interface layer 224 having a thickness of less than $4\lambda/(64n_6)$, that is, less than 11 nm in the structure 4 that satisfied $n<n_b<n_a$.

On the other hand, as can be seen from Table 5-2, SS evaluation of 50≦(Tc+Ta)/2 is given for (1) the combination of the dielectric layer 228 having a thickness of less than $20\lambda/(64n_b)$, that is, less than 79 nm, and the interface layer 224 having a thickness of less than $4\lambda/(64n_6)$, that is, less than 11 nm, and (2) the combination of the dielectric layer 228 having a thickness of less than $14\lambda/(64n_b)$, that is, less than 55 nm, and the interface layer 224 having a thickness of less than $6\lambda/(64n_6)$, that is, less than 24 nm in the structure 7 that satisfied $n_b<n<n_a$, which includes the structure of the present invention. It is clear that the film thickness range evaluated as SS evaluation of 50≦(Tc+Ta)/2 is more increased in the results (Table 5-2) for the structure 7 with the structure of the present invention than in the results (Table 5-1) for the structure 4.

Comparing the results for the present example in Table 5-1 and Table 5-2 and the results for Example 4 in Table 4-2, it is understood that, when the same n=1.8, the structure 7 satisfying $n_b<n<n_a$ makes it easy to allow a high transmittance, a high reflectance ratio and 5≦Rc<10 to go together. Accordingly, when the transparent layer 202, the dielectric layer 228, and the dielectric layer 227 are disposed in this order, referring to the refractive indexes thereof as n, $n_b$, $n_a$ respectively, the relationship satisfying $n_b<n<n_a$ is most preferable. It should be noted that, although practical use is possible, it is more difficult to obtain a good optical property in the relationship of $n<n_b<n_a$, as is the case of the structure 4, or the relationship of $n<n_a$ with the transparent layer 202 and the dielectric layer 227 being disposed in this order, as is the case of the structure 1, than in the case of the structure 7.

Example 6

In Example 6, optical calculations were performed in detail with respect to the structure 7 of Example 3 when the refractive index n of the transparent layer 202 and the interlayer 203 is 2.1 and 2.4. The structure 7 satisfies $n_b<n<n_a$.

(1) When n=2.1

19 nm of the dielectric layer 221 (2.7-i0.0), 9 nm of the reflective layer 222 (0.1-i2), the interface layer 224 (2.3-i0.0), 6 nm of the recording layer 225 (crystalline phase: 1.9-i3.5, amorphous phase: 3.2-i2.2), 5 nm of the interface layer 226 (2.3-i0.1), the dielectric layer 227 (refractive index $n_a$: 2.2-i0.0), the dielectric layer 228 (refractive index $n_b$: 1.6-i0.0), and the transparent layer 202 (2.1-i0.0) were disposed on the interlayer 203 (2.1-i0.0) in this order. Table 6-1 indicates the results when n=2.1. As a sample of a comparative example of the present invention, a structure without the dielectric layer 228 also was produced. In this case, calculations were performed assuming that the dielectric layer 227 and the interface layer 224 were variable. In the structure provided with the dielectric layer 228 produced as a sample satisfying the structure of the present invention, calculations were performed assuming that the dielectric layer 227 was 49 nm, and the dielectric layer 228 and the interface layer 224 were variable. That was, $n_a$=2.2, and $n_b$=1.6.

(2) When n=2.4

19 nm of the dielectric layer 221 (2.7-i0.0), 10 nm of the reflective layer 222 (0.1-i2), the interface layer 224 (2.3-i0.0), 5.5 nm of the recording layer 225 (crystalline phase: 1.9-i3.5, amorphous phase: 3.2-i2.2), 5 nm of the interface layer 226 (2.3-i0.1), the dielectric layer 227 (refractive index $n_a$: 2.5-i0.0), the dielectric layer 228 (refractive index $n_b$: 1.6-i0.0), and the transparent layer 202 (2.4-i0.0) were arranged on the interlayer 203 (2.4-i0.0) in this order. Table 6-2 indicates the results when n=2.4. As a sample of a comparative example of the present invention, a structure without the dielectric layer 228 also was produced. In this case, calculations were performed assuming that the dielectric layer 227 and the interface layer 224 were variable. In the structure provided with the dielectric layer 228 produced as a sample satisfying the structure of the present invention, calculations were performed assuming that the dielectric layer 227 was 41 nm, and the dielectric layer 228 and the interface layer 224 were variable. That was, $n_a$=2.5, and $n_b$=1.6.

TABLE 6-1

| Refractive index n of transparent layer 202 and interlayer 203 | Dielectric layer 228 | Thickness of interface layer 224 $*\lambda/(64n_6)$(nm) $n_6 = 2.3$ | | | | |
|---|---|---|---|---|---|---|
| | | 2 | 4 | 6 | 8 | 10 |
| | Thickness of dielectric layer 227 $*\lambda/(64n_a)$(nm) $n_a = 2.2$ | | | | | |
| 2.1 | Without | | | | | |
| | 32 | | | | | |
| | 30 | | | | | |
| | 28 | | | | | |
| | 26 | | | | | |
| | 24 | | | | | |
| | 22 | | | | S | S |
| | 20 | | | | S | S |
| | 18 | | | | S | S |
| | 16 | | | S | S | |
| | 14 | | | S | S | |
| | 12 | | | S | S | |
| | 10 | | | S | S | |
| | 8 | | | S | S | |
| | 6 | | | | S | |
| | 4 | | | | | |
| | 2 | | | | | |

TABLE 6-1-continued

| Refractive index n of transparent layer 202 and interlayer 203 | Dielectric layer 228 | Thickness of interface layer 224 *$\lambda/(64n_6)$(nm) $n_6 = 2.3$ | | | | |
|---|---|---|---|---|---|---|
| | | 2 | 4 | 6 | 8 | 10 |
| | Thickness of dielectric layer 228 *$\lambda/(64n_a)$(nm) $n_b = 1.6$ | | | | | |
| 2.1 | With | 32 | | | | |
| | | 30 | | | | |
| | | 28 | | | | |
| | | 26 | | | | |
| | | 24 | | | | |
| | | 22 | | | | |
| | | 20 | | | | |
| | | 18 | | | | |
| | | 16 | | | | |
| | | 14 | | | | |
| | | 12 | | | | |
| | | 10 | | | | |
| | | 8 | SS | SS | SS | S |
| | | 6 | SS | SS | SS | |
| | | 4 | SS | SS | SS | |
| | | 2 | SS | SS | SS | |

S: $48 \leq (Tc + Ta)/2 < 50, 5 \leq Rc \leq 10, 4 \leq Rc/Ra$
SS: $50 \leq (Tc + Ta)/2, 5 \leq Rc \leq 10, 4 \leq Rc/Ra$

TABLE 6-2

| Refractive index n of transparent layer 202 and interlayer 203 | Dielectric layer 228 | Thickness of interface layer 224 *$\lambda/(64n_6)$(nm) $n_6 = 2.3$ | | | | |
|---|---|---|---|---|---|---|
| | | 2 | 4 | 6 | 8 | 10 |
| | Thickness of dielectric layer 227 *$\lambda/(64n_a)$(nm) $n_a = 2.5$ | | | | | |
| 2.4 | Without | 16 | | | | |
| | | 14 | | | | |
| | | 12 | | | | |
| | | 10 | | S | | |
| | | 8 | | S | | |
| | | 6 | | S | | |
| | | 4 | | | | |
| | | 2 | | | | |
| | Thickness of dielectric layer 228 *$\lambda/(64n_b)$(nm) $n_b = 1.6$ | | | | | |
| 2.4 | With | 16 | | | | |
| | | 14 | | | | |
| | | 12 | | | | |
| | | 10 | | | | |
| | | 8 | | | | |
| | | 6 | | | | |
| | | 4 | SS | SS | | |
| | | 2 | SS | SS | | |

S: $48 \leq (Tc9 + Ta)/2 < 50, 5 \leq Rc \leq 10, 4 \leq Rc/Ra$
SS: $50 \leq (Tc + Ta)/2, 5 \leq Rc \leq 10, 4 \leq Rc/Ra$ In the tables, S, and SS are defined in the same manner as in Example 4.

As can be seen from Table 6-1, in the structure without the dielectric layer 228, S evaluation was given for the interface layer 224 having a thickness in the range of more than $2\lambda/(64n_6)$ but less than $10\lambda/(64n_6)$. However, no SS evaluation was given and there was no thickness range that can ensure a low Ra and a transmittance of 50% or more. On the other hand, in the structure provided with the dielectric layer 228, SS evaluation was given for the interface layer 224 having a thickness of less than $8\lambda/(64n_6)$. When the thickness thereof was $2\lambda/(64n_6)$, the average transmittance was about 54%. The transmittance is approximately maximum when the interface layer 224 is $2\lambda/(64n_6)$, and therefore a high (Tc+Ta)/2 and a high Rc/Ra are compatible if Ra is minimum with the condition. Accordingly, a structure provided with the dielectric layer 228, that is, the structure of the present invention in which two or more dielectric layers are provided on the optical beam incident side with respect to the recording layer 225 can be regarded as an excellent structure because Rc/Ra can be increased more when the interface layer 224 is $2\lambda/(64n_6)$.

When n=2.1, the effective NA of the SIL is expected to be 1.89. This calculation result indicates a possibility of recording information of about 123 GB per information layer, by optimizing the film structure with respect to a transparent layer and an interlayer with n=2.1.

As can be seen from Table 6-2, in the structure without the dielectric layer 228, S evaluation was given for the interface layer 224 having a thickness in the range of more than $2\lambda/(64n_6)$ but less than $6\lambda/(64n_6)$. However, no SS evaluation was given and there was no thickness range that can ensure a low Ra and a transmittance of 50% or more. On the other hand, in the structure provided with the dielectric layer 228, SS evaluation was given for the interface layer 224 having a thickness in the range of $4\lambda/(64n_6)$ or less. When the thickness thereof was $2\lambda/(64n_6)$, the average transmittance was about 53%. Also when n=2.4, a structure provided with the dielectric layer 228, that is, a structure in which two or more dielectric layers are provided on the optical beam incident side with respect to the recording layer 225 can be regarded as an excellent structure because Rc/Ra can be more increased when the interface layer 224 is $2\lambda/(64n_6)$.

When n=2.4, the effective NA of the SIL is expected to be 2.16. This calculation result indicates a possibility of recording information of about 161 GB per information layer, by optimizing the film structure with respect to a transparent layer and an interlayer with n=2.4.

In the above examples from 1 to 6, optical calculations were performed assuming that the film thickness was fixed, except for the dielectric layer and the interface layer that were variable. However, even if the calculations were performed by varying the film thickness, the calculation results have the same tendency. Further, the calculation results have the same tendency even in the case of varying the refractive index of the dielectric layer and the interface layer that were variable. That is, a structure that includes a transparent layer (interlayer), a dielectric layer b, a dielectric layer a, and a recording layer disposed from the laser beam 10 incident side in this order, and that satisfies, referring to the refractive index of the transparent layer or the interlayer as n, the refractive index of the dielectric layer b as $n_b$ and the refractive index of the dielectric layer a as $n_a$, $n_b < n < n_a$ makes it easier to increase the reflectance ratio. In the case of the first information layer 210 farther from the laser beam 10 incident side, a high reflectance and a high reflectance ratio easily go together, and in the case of the second information layer 220 closer to the laser beam 10 incident side, a high transmittance and a high reflectance ratio easily go together.

Particularly, in the second information layer 220, an increase in the refractive index n of the transparent layer (interlayer) makes it difficult to ensure the transmittance, and therefore a film structure with a high transmittance and a high reflectance ratio with respect to the increased refractive index n can lead to an information recording medium with an increased capacity.

Example 7

In Example 7, as a sample of a comparative example, information recording media each with the film structure of the information recording medium 100 indicated in FIG. 1B but without the dielectric layer 118 was produced, and a recording/reproducing experiment using the SIL was conducted. It should be noted that the sample thus produced herein is described with reference to FIG. 1B for convenience of description. The refractive index n of the transparent layer 102 was 1.5. The recording capacity was equivalent to 63 GB, and fell short of 90 GB equivalent. The film structure of the information recording medium 100 was determined based on the calculation results of Example 1 in Table 1-1.

Hereinafter, the present example is described in detail. First, the production method of the information recording medium 100 is described. The material and the thickness of each layer are described. As the substrate 101, a polycarbonate substrate (with a diameter of 120 mm and a thickness of 1.1 mm) with guide grooves (with a depth of 20 nm and a groove-groove distance of 201 nm) formed thereon was prepared and set in a sputtering apparatus. 80 nm of Ag—Pd—Cu alloy serving as the reflective layer 112, 23 nm of $(ZrO_2)_{30}(SiO_2)_{30}(In_2O_3)_{40}$ (mol %) serving as the interface layer 114, 11 nm of $Ge_{45}Sb_4Te_{51}$ (atom %) serving as the recording layer 115, 5 nm of $(ZrO_2)_{25}(SiO_2)_{25}(Cr_2O_3)_{50}$ (mol %) serving as the interface layer 116, and 60 nm of $(ZnS)_{50}(SiO_2)_{20}$ (mol %) serving as the dielectric layer 117 were stacked in this order on the surface of the substrate 101 formed with the guide grooves. Thus, the information layer 110 of this sample was formed. It should be noted that the dielectric layer 113 was not provided in the information layer 110 of this sample.

This information recording medium 100 is designed so that the recording layer 115 has a reflectance Rc (%) of 25% in a crystalline phase, and the recording layer 115 has a reflectance Ra (%) of 2.0% in an amorphous phase. The thickness of the interface layer 114 was $7\lambda/(64n_5)$, which was 23 nm, and the thickness of the dielectric layer 117 was $21\lambda/(64n_2)$, which was 60 nm.

The sputtering conditions for each layer are described. All the sputtering targets have a round shape, and were 100 mm in diameter and 6 mm in thickness. The reflective layer 112 was formed by sputtering an Ag—Pd—Cu alloy target in an Ar gas atmosphere at a pressure of 0.4 Pa using a direct current power source with an output of 200 W. The interface layer 114 was formed by sputtering a $(ZrO_2)_{30}(SiO_2)_{30}(In_2O_3)_{40}$ target in a mixed gas atmosphere of Ar gas and $O_2$ gas in a volume ratio of 99:1 at a pressure of 0.13 Pa using a high frequency power source with an output of 200 W. The recording layer 115 was formed by sputtering a Ge—Sb—Te target in a mixed gas atmosphere of Ar gas and $N_2$ gas in a volume ratio of 97:3 at a pressure of 0.13 Pa using a direct current power source with an output of 100 W and thereby forming $Ge_{45}Sb_4Te_{51}$. The interface layer 116 was formed by sputtering a $(ZrO_2)_{25}$ $(SiO_2)_{25}$ $(Cr_2O_3)_{50}$ target in an Ar gas atmosphere at a pressure of 0.13 Pa using a high frequency power source with an output of 200 W. The dielectric layer 117 was formed by sputtering a $(ZnS)_{80}(SiO_2)_{20}$ target in a mixed gas atmosphere of Ar gas and $O_2$ gas in a volume ratio of 97:3 at a pressure of 0.13 Pa using a high frequency power source with an output of 400 W.

The substrate 101 formed thereon with the reflective layer 112, the interface layer 114, the recording layer 115, the interface layer 116, and the dielectric layer 117 in this order as described above was taken out of the sputtering apparatus. Thereafter, an initialization step was performed. In the initialization step, the recording layer 115 of the information recording medium 100 was crystallized across about the entire surface in a circular region with a radius of 22 to 60 mm using a semiconductor laser with a wavelength of 810 nm. With that, the initialization step was completed. After the completion of the initialization step, an ultraviolet curable acrylic resin with n=1.5 was applied onto the surface the dielectric layer 117 by spin coating to have a thickness of 3 μm, which then was irradiated with ultraviolet light so that the resin was cured. Thus, the transparent layer 102 was formed.

After the completion of the step of forming the transparent layer, the production of the information recording medium 100 was completed. The sample of the information recording medium thus produced as a comparative example was used as an information recording medium 100-1. The measurement value of Rc of the information recording medium 100-1 was 25.2%, and measurement value of Ra thereof was 1.9%. Thus, Rc/Ra=13 was obtained.

Next, a method for evaluating the recording/reproduction with respect to the information recording medium 100-1 is described. For evaluating the recording/reproduction, an optical information recording/reproducing apparatus indicated in FIG. 6 was used. As the illustrated information recording medium 40, the information recording medium 100-1 was prepared. A laser 4 had an oscillation wavelength of 405 nm. A lens in a hemisphere shape with its flat side being cut into a tapered shape was used for the SIL 50. The SIL 50 had an equivalent numerical aperture NA of 1.84. When the refractive index of the transparent layer 102 was 1.5, the effective NA was 1.35.

For the actuator 65, the beam expander 9, the focus detection circuit 73, the focus control circuit 74 and the system control circuit 70, those in the information recording medium evaluation machine using far-field light (that is, without using near-field light) were diverted for use. The distance detection circuit 71 and the distance control circuit 72 were produced based on the method described in the above embodiments.

It should be noted that, although not shown in the drawings, a tilt detection circuit, an optical system and a circuit for controlling a tracking servo system, an optical system and a circuit for reproducing information, and a circuit for generating waveform of the recording pulse also were used in this example. For these also, those in the information recording medium evaluation machine using far-field light were diverted for use.

Using an apparatus with the above described structure, an experiment in which recording/reproduction was performed by focusing laser beam on the recording layer 115 of the information recording medium 100-1 was conducted. The irradiation was performed with the laser beam 10 set to a reproduction power Pr of 0.25 mW in the state where the rotation of the information recording medium was stopped. The distance control circuit 72 operated a gap servo system so that the distance between the SIL 50 and the surface of the information recording medium 100-1 was 25 nm. The position of the beam expander 9 was controlled so that the laser beam 10 is focused around the recording layer 115.

The information recording medium 100-1 was rotated by driving a spindle motor (not shown in figures) so that the information recording medium 100-1 has a linear velocity of 3.1 m/s. Thereafter, the tracking servo system was put into operation and then left in a still state. A channel clock period Tw was set to 15 ns, and 8 Tw period recording pulses were generated so that recording marks and spaces can be formed alternately. Assuming that the recording laser power Pw was 6 mW and the erase power Pe was 2.5 mW, the emission waveform of the laser beam was modulated based on the recording pulse, so that 8 Tw period recording marks and spaces were formed in one round recording track. After the recording, the power setting of the laser was returned to the reproduction power and the recorded information in the track was reproduced. The position of the beam expander 9 was slightly adjusted so that the amplitude of the reproduction signals of the 8 Tw period should be maximum.

After the completion of the adjustment, random signals ranging from 2 T (0.094 μm) to 8 T repeatedly were recorded 10 times with Pw=6 mW and Pe=2.5 mW, for which the limit equalized (LEQ) jitter was measured with Pr=0.25 mW. As a result, 8.1% was obtained. Table 8 indicates the results together with the results of Example 9.

In this way, an optical system having NA>1 was used and 63 GB-equivalent information was recorded on the information recording medium 100-1 including a $Ge_{45}Sb_4Te_{51}$ recording layer and an interface layer containing $ZrO_2$. As a result, although good recording/reproducing properties were obtained, recording of over 90 GB-equivalent information was impossible. This is conceivably because the refractive index n of the transparent layer 102 was 1.5 and lower than the refractive index $n_s$ of the SIL in this example, so that the effective NA of the SIL was small, resulting in an insufficient recording density.

Example 8

In Example 8, as a sample of a comparative example, information recording media each with the same film structure as in the information recording medium 200 indicated in FIG. 2B but including the transparent layer 202 and the interlayer 203 with a refractive index n of 1.5 were produced, and a recording/reproducing experiment using the SIL was conducted. The recording capacity of the two information layers was equivalent to 126 GB. The film structure of the first information layer 210 was the same as that of the sample of the information layer 110 produced as a comparative example in Example 7, and the film structure of the second information layer 220 was determined based on the calculation results of Example 4 in Table 4-1.

Hereafter, the present example is described specifically. First, the production method of the information recording medium 200 is described. The first information layer 210 was formed on the substrate 201 by sputtering. Detailed descriptions for the material and the thickness of each layer, and sputtering conditions are the same as in the sample of the information layer 110 produced in Example 7 and thus omitted.

The substrate 201 on which the first information layer 210 was formed was taken out of the sputtering apparatus. Then, the recording layer 215 was initialized in the same manner as in Example 7.

After the initialization, the interlayer 203 formed with guide grooves was formed on the surface of the dielectric layer 217 to have a thickness of 3 μm. The procedure is described. First, an ultraviolet curable acrylic resin was applied onto the surface of the dielectric layer 217 by spin coating. Next, a surface of a polycarbonate substrate formed with projections and depressions (with a depth of 20 nm and a groove-groove distance of 201 nm) that were complementary to the projections and depressions of the guide grooves to be formed on the interlayer 203 was held in close contact with the ultraviolet curable resin. Maintaining this state, the resin was irradiated with an ultraviolet light so as to be cured. Thereafter, the polycarbonate substrate with projections and depressions was separated. Thereby, the surface of the interlayer 203 was formed with guide grooves in the same shape as those on the substrate 201.

Next, the substrate 201 formed with the layers up to the interlayer 203 was set in the sputtering apparatus again. 19 nm of $TiO_2$ serving as the dielectric layer 221, 10 nm of Ag—Pd—Cu alloy serving as the reflective layer 222, 10 nm of $(ZrO_2)_{25}(SiO_2)_{25}(Cr_2O_3)_{50}$ (mol %) serving as the interface layer 224, 6.5 nm of $Ge_{45}Sb_4Te_{51}$ (atom %) serving as the recording layer 225, 5 nm of $(ZrO_2)_{25}(SiO_2)_{25}(Cr_2O_3)_{50}$ (mol %) serving as the interface layer 226, and 40 nm of $(ZnS)_{80}(SiO_2)_{20}$ (mol %) serving as the dielectric layer 227 were stacked in this order on the surface of the interlayer 203 formed with the guide grooves. Thus, the second information layer 220 was formed. It should be noted that the dielectric layer 223 was not provided in the sample of the information recording medium thus produced as a comparative example.

Descriptions are given for the sputtering conditions of each layer in the second information layer 220. The dielectric layer 221 was formed by sputtering a $TiO_2$ target in a mixed gas atmosphere of Ar gas and $O_2$ gas in a volume ratio of 97:3 at a pressure of 0.13 Pa using a high frequency power source with an output of 400 W. The reflective layer 222 was formed by sputtering an Ag—Pd—Cu alloy target in an Ar gas atmosphere at a pressure of 0.4 Pa using a direct current power source with an output of 100 W. The interface layer 224 was formed by sputtering a $(ZrO_2)_{25}(SiO_2)_{25}(Cr_2O_3)_{50}$ target in an Ar gas atmosphere at a pressure of 0.13 Pa using a high frequency power source with an output of 200 W. The recording layer 225 was formed by sputtering a Ge—Sb—Te target in an Ar gas atmosphere at a pressure of 0.13 Pa using a direct current power source with an output of 50 W, thereby forming $Ge_{45}Sb_4Te_{51}$. The interface layer 226 was formed under the same conditions as the interface layer 224. The dielectric layer 227 was formed by sputtering a $(ZnS)_{80}(SiO_2)_{20}$ target in a mixed gas atmosphere of Ar gas and $O_2$ gas in a volume ratio of 97:3 at a pressure of 0.13 Pa using a high frequency power source with an output of 400 W.

The substrate 201 formed with the layers up to the second information layer 220 was taken out of the sputtering apparatus. Then, the recording layer 225 was initialized in the same manner as in Example 7.

After the completion of the initialization, an ultraviolet curable acrylic resin with n=1.5 was applied onto the surface the dielectric layer 227 by spin coating to have a thickness of 3 μm, which then was irradiated with ultraviolet light so that the resin was cured. Thus, the transparent layer 202 was formed. After the completion of the step of forming the transparent layer, the production of the information recording medium 200 was completed. The sample of the information recording medium thus produced as a comparative example was used as an information recording medium 200-1.

The information recording medium 200-1 was designed so as to have an effective Rc of 6% and an effective Ra of 1%, in which Rc (%) of the first information layer 210 was 25%, Ra (%) thereof was 2%, Rc (%) of the second information layer 220 was 6%, Ra (%) thereof was 1%, and (Tc+Ta)/2(%) thereof was 50%. The thickness of the interface layer 214 was $7λ/(64n_5)$, which was 23 nm, and the thickness of the dielectric layer 217 was $21λ/(64n_2)$, which was 60 nm, in the same manner as in Example 7. Further, the thickness of the interface layer 224 was $4λ/(64n_6)$, which was 11 nm, and the thickness of the dielectric layer 227 was $14λ/(64n_a)$, which was 40 nm.

The first information layer 210 was measured to have an effective Rc (%) of 6.2% and an effective Ra (%) of 0.6%, and the second information layer 220 was measured to have an effective Rc (%) of 6.0% and an effective Ra (%) of 0.9%. Further, the second information layer 220 was measured to have an optical transmittance Tc of 51.5% and Ta of 53.0%. The transmittance was measured using a measurement medium formed with the second information layer 220 and the transparent layer 202 on the substrate 201, half surface of which was initialized and measured by using a spectrophotometer.

Next, a method for evaluating the recording/reproduction in the information recording medium 200-1 is described. The descriptions overlapping with those in Example 7 are omitted. For evaluating the recording/reproduction in the information recording medium 200-1, an optical information recording/reproducing apparatus indicated in FIG. 6 was used. As the illustrated information recording medium 40, the information recording medium 200-1 was prepared. After adjusting the first information layer 210 and the second information layer 220 each in the same manner as in Example 7, an experiment in which recording/reproduction was performed by focusing laser beam on each recording layer was conducted.

First, random signals ranging from 2 T (0.094 μm) to 8 T repeatedly were recorded on the first information layer 210 10 times with Pw=12 mW and Pe=5 mW, for which the limit equalized (LEQ) jitter was measured with Pr=0.5 mW. As a result, 8.2% was obtained.

Next, random signals ranging from 2 T (0.094 μm) to 8 T repeatedly were recorded on the second information layer 220 10 times with Pw=12 mW and Pe=5 mW, for which the limit equalized (LEQ) jitter was measured with Pr=0.5 mW. As a result, 9.8% was obtained. Table 7 indicates the results.

TABLE 7

| Example No. | Medium No. | Information layer No. | Refractive index of transparent layer | Thickness of dielectric layer 217 (nm) (*$λ/64n_2$) | Thickness of interface layer 214 (nm) (*$λ/64n_5$) | Effective Rc (%) | Effective Ra (%) | Rc/Ra | LEQ jitter (%) |
|---|---|---|---|---|---|---|---|---|---|
| 8 | 200-1 | 210 | 1.5 | 21 | 7 | 6.2 | 0.6 | 10.3 | 8.2 |

| Example No. | Medium No. | Information layer No. | Refractive index of transparent layer | Thickness of dielectric layer 227 (nm) (*$λ/64n_a$) | Thickness of interface layer 224 (nm) (*$λ/64n_6$) | Effective Rc (%) | Effective Ra (%) | Rc/Ra | Tc (%) | Ta (%) | LEQ jitter (%) |
|---|---|---|---|---|---|---|---|---|---|---|---|
| 8 | 200-1 | 220 | 1.5 | 14 | 4 | 6.0 | 0.9 | 6.7 | 51.5 | 53.0 | 9.8 |

In this way, an optical system having NA>1 was used and 63 GB-equivalent information per information layer was recorded on the information recording medium 200-1 including a $Ge_{45}Sb_4Te_{51}$ recording layer and an interface layer containing $ZrO_2$. As a result, although good recording/reproducing properties were obtained, recording of over 90 GB-equivalent information per information layer was impossible. This is conceivably because the refractive index n of the transparent layer 102 was 1.5 in the information recording medium 200-1 and lower than the refractive index $n_s$ of the SIL, so that the effective NA of the SIL was small, resulting in an insufficient recording density.

Example 9

In Example 9, as a sample of a comparative example, an information recording medium 100-2 with the film structure of the information recording medium 100 indicated in FIG.

1B but without the dielectric layer 118 was produced, and a recording/reproducing experiment using the SIL was conducted. It should be noted that the information recording medium 100-2 is described with reference to FIG. 1B for convenience of description. The transparent layer 102 used herein had a refractive index of 1.8, and the recording capacity was equivalent to 90 GB. The film structure of the information recording medium 100 was determined based on the calculation results of Example 1 in Table 1-2.

Hereafter, the present example is described specifically. The same descriptions as those in Example 7 are omitted. In the information recording medium 100-2, the guide grooves of the substrate 101, the thickness of the interface layer 114 and the material of the transparent layer 102 are different from those in the information recording medium 100-1 of Example 7. As the substrate 101, a polycarbonate substrate formed with guide grooves having a groove-groove distance of 168 nm was used. The thickness of the interface layer 114 was $3\lambda/(64n_5)$, which was 10 nm, so that Rc (%) was 25(%) and Ra (%) was 2.0(%). For the material of the transparent layer 102, an acrylic resin to which $TiO_2$ fine particles were mixed was used in order to increase the refractive index. Other conditions are the same as in Example 7. Rc of the information recording medium 100-2 was measured to be 25.4%, Ra thereof was measured to be 2.6%. Rc/Ra=10 was obtained.

A method for evaluating the recording/reproduction in the information recording medium 100-2 is described. When the refractive index of the transparent layer 102 was 1.8, the effective NA of the SIL 50 was 1.62. The information recording medium 100-2 had a linear velocity of 2.6 m/s. In the same manner as in Example 7, random signals ranging from 2 T (0.078 μm) to 8 T repeatedly were recorded 10 times with Pw=6 mW and Pe=2.5 mW, for which the limit equalized (LEQ) jitter was measured with Pr=0.25 mW. As a result, 8.3% was obtained. Table 8 indicates the results.

sample of the present invention without the dielectric layer 228 as a comparative example, in which the recording layer 225 was formed by $Ge_{45}Sb_4Te_{51}$. The information recording media 200-3 to 6 each were the sample of the examples of the present invention, in which $MgSiO_3$ was provided as the dielectric layer 228, and the recording layer 225 was formed respectively by $Ge_{45}Sb_4Te_{51}$, $Ge_{47.5}Bi_2Te_{50.5}$, $Ge_{30}Sb_{70}$, and $Sb_{74}Te_{20}Ge_6$. The recording layer 215 was $Ge_{45}Sb_4Te_{51}$ in all the cases.

Hereafter, the present example is described specifically. The same descriptions as those in Example 9 are omitted. The production method of the information recording media 200-2 to 6 is described. The first information layer 210 was formed on the substrate 201 by sputtering. Detailed descriptions for the guide grooves on the substrate, the material, thickness and sputtering conditions of each layer are the same as in the information layer 100-2 of Example 9 and thus omitted. In the same manner as in Example 8, after the initialization, the interlayer 203 formed with guide grooves was formed on the surface of the dielectric layer 217 to have a thickness of 3 μm. The difference from Example 8 was that an acrylic resin material to which $TiO_2$ fine particles were mixed was used as an ultraviolet curable resin and the guide grooves formed on the interlayer 203 had a groove-groove distance of 168 nm.

Next, the substrate 201 formed with the layers up to the interlayer 203 was set in the sputtering apparatus again. 19 nm of $TiO_2$ serving as the dielectric layer 221, 10 nm of Ag—Pd—Cu alloy serving as the reflective layer 222, 11 nm of $(ZrO_2)_{25}(SiO_2)_{25}(Cr_2O_3)_{50}$ (mol %) serving as the interface layer 224, 6.5 nm of the recording layer 225, 5 nm of $(ZrO_2)_{25}(SiO_2)_{25}(Cr_2O_3)_{50}$ (mol %) serving as the interface layer 226, and $(ZnS)_{80}(SiO_2)_{20}$ serving as the dielectric layer 227 were stacked in this order on the surface of the interlayer 203 formed with the guide grooves. Thus, the second information layer 220 was formed. For each of the same materials as in the second information layer 220 in Example 8, the same

TABLE 8

| Example No. | Medium No. | Information layer No. | Refractive index of transparent layer | Thickness of dielectric layer 117 (nm) (*λ/64n₂) | Thickness of interface layer 114 (nm) (*λ/64n₅) | Rc (%) | Ra (%) | Rc/Ra | LEQ jitter (%) |
|---|---|---|---|---|---|---|---|---|---|
| 7 | 100-1 | 110 | 1.5 | 21 | 7 | 25.2 | 1.9 | 13.3 | 8.1 |
| 9 | 100-2 | 110 | 1.8 | 21 | 3 | 25.4 | 2.6 | 9.8 | 8.3 |

In this way, an optical system having NA>1 was used and 90 GB-equivalent information was recorded on the information recording medium 100-2 including a $Ge_{45}Sb_4Te_{51}$ recording layer and an interface layer containing $ZrO_2$. As a result, good recording/reproducing properties were obtained.

Example 10

In Example 10, the information recording medium 200 indicated in FIG. 2B was produced, and a recording/reproducing experiment using the SIL was conducted. In the same manner as in Example 9, a dielectric material with a refractive index of 1.8 was used for the transparent layer 202 and the interlayer 203. The total recording capacity of the two information layers was equivalent to 180 GB. The film structure of the first information layer 210 was determined based on the calculation results of Example 1 in Table 1-2, and the film structure of the second information layer 220 was determined based on the calculation results of Example 4 in Table 4-2 and Example 5 in Table 5-2.

Here, information recording media 200-2 to 6 were produced. The information recording medium 200-2 was the sputtering conditions were employed. It should be noted that the information recording media 200-2 to 6 in this example were not provided with the dielectric layer 223.

The conditions for each information recording medium are described. Each medium was designed so as to have an effective Rc of 6% or more and an effective Rc/effective Ra of 4 or more, in which Rc (%) of the second information layer 220 was 6% or more and (Tc+Ta)/2(%) of the second information layer 220 was 50% or more. In the information recording medium 200-2, the interface layer 224 was $4\lambda/(64n_6)$, which was 11 nm, and the dielectric layer 227 was $12\lambda/(64n_a)$, which was 34 nm. $Ge_{45}Sb_4Te_{51}$ was used for the recording layer 225.

In the information recording media 200-3 to 6, the interface layer 224 was $4\lambda/(64n_6)$, which was 11 nm, the dielectric layer 227 was 40 nm, and the dielectric layer 228 was $12\lambda/(64n_b)$, which was 47 nm, according to Table 5-2. $MgSiO_3$ was used for the dielectric layer 228. For the formation, an $MgSiO_3$ target was sputtered in an Ar gas atmosphere at a pressure of 0.13 Pa using a high frequency power source with an output of 200 W.

$Ge_{45}Sb_4Te_{51}$ was used for the recording layer 225 of the information recording medium 200-3. $Ge_{47.5}Bi_2Te_{50.5}$ was used for the recording layer 225 of the information recording medium 200-4. For the formation, a Ge—Bi—Te target was sputtered in an Ar gas atmosphere at a pressure of 0.13 Pa using a direct current power source with an output of 50 W. $Ge_{30}Sb_{70}$ was used for the recording layer 225 of the information recording medium 200-5. For the formation, a Ge—Sb target was sputtered in an Ar gas atmosphere at a pressure of 0.13 Pa using a direct current power source with an output of 50 W. $Sb_{74}Te_{20}Ge_6$ was used for the recording layer 225 of the information recording medium 200-6. For the formation, an Sb—Te—Ge target was sputtered in an Ar gas atmosphere at a pressure of 0.13 Pa using a direct current power source with an output of 50 W.

The substrate 201 formed with the layers up to the second information layer 220 was taken out of the sputtering apparatus. Then, the recording layer 225 was initialized in the same manner as in Example 7.

After the initialization, an ultraviolet curable acrylic resin with n=1.8, which is the same one used for the interlayer 203 of the present example, was applied onto the surface of the dielectric layer 227 or the surface the dielectric layer 228 by spin coating to have a thickness of 3 μm, which then was irradiated with ultraviolet light so that the resin was cured. Thus, the transparent layer 202 was formed.

After the completion of the step of forming the transparent layer, the production of the information recording medium 200 was completed. The information recording medium produced in this example was used as the information recording media 200-2 to 6.

The effective Rc and the effective Ra of the information recording media 200-2 to 6 were measured. Next, the information recording media 200-2 to 6 were prepared. After adjusting the first information layer 210 and the second information layer 220 each in the same manner as in Example 7, an experiment in which recording/reproduction was performed by focusing laser beam on each recording layer was conducted. The SIL 50 had an effective NA of 1.62. The information recording media 200-2 to 6 had a linear velocity of 2.6 m/s.

First, random signals ranging from 2 T (0.078 μm) to 8 T repeatedly were recorded on the first information layer 210 10 times with Pw=12 mW and Pe=5 mW, for which the limit equalized (LEQ) jitter was measured with Pr=0.5 mW. Next, random signals ranging from 2 T (0.078 μm) to 8 T repeatedly were recorded on the second information layer 220 10 times with Pw=12 mW and Pe=5 mW, for which the limit equalized (LEQ) jitter was measured with Pr=0.5 mW. Table 9 indicates the results.

Focusing on Rc/Ra of the medium numbers 200-2 to 6, 200-2 without the dielectric layer 228 had the lowest Rc/Ra, which was 6.5. Although Rc/Ra of at least 4 was ensured and thus practical use is possible, Rc/Ra can be increased by providing the dielectric layer 228 under an equivalent condition of transmittance. Thus a better signal quality can be obtained. Particularly, when the refractive index of the transparent layer and the interlayer is 1.8 or more, the dielectric layer 228 preferably is provided. Further, any of materials for the recording layers in 200-3 to 6 had a good signal quality.

In this way, an optical system having NA>1 was used and 90 GB-equivalent information per information layer was recorded on the information recording media 200-3 to 6 including $Ge_{45}Sb_4Te_{51}$, $Ge_{47.5}Bi_2Te_{50.5}$, $Ge_{30}Sb_{70}$, $Sb_{74}Te_{20}Ge_6$ recording layers and an interface layer containing $ZrO_2$. As a result, good recording/reproducing properties were obtained.

Example 11

In Example 11, information recording media 200-11 to 20 were produced with the same structure as the medium number 200-3 in Example 10 except for the material and the thickness of the dielectric layer 228. A recording/reproducing experiment using the SIL was conducted for the second information layer 220 of each of these information recording media 200-11 to 20 in the same manner as in Example 1. The refractive index of the transparent layer 202 and the interlayer 203 was 1.8, and the capacity was equivalent to 90 GB per information layer.

The sputtering conditions for each material are as follows. It should be noted that the material for the dielectric layer 228 in each of the information recording media 200-11 to 20 is as indicated in Table 10.

For the formation of $Al_2O_3$, an $Al_2O_3$ target was sputtered in an Ar gas atmosphere at a pressure of 0.13 Pa using a high frequency power source with an output of 200 W.

For the formation of BN, a BN target was sputtered in an Ar gas atmosphere at a pressure of 0.13 Pa using a high frequency power source with an output of 200 W.

For the formation of $CeF_3$, a $CeF_3$ target was sputtered in an Ar gas atmosphere at a pressure of 0.13 Pa using a high frequency power source with an output of 200 W.

For the formation of $LaF_3$, an $LaF_3$ target was sputtered in an Ar gas atmosphere at a pressure of 0.13 Pa using a high frequency power source with an output of 200 W.

For the formation of $MgF_2$, an $MgF_2$ target was sputtered in an Ar gas atmosphere at a pressure of 0.13 Pa using a high frequency power source with an output of 200 W.

TABLE 9

| Example No. | Medium No. | Information layer No. | Refractive index of transparent layer | Dielectric layer 218 | Thickness of dielectric layer 217 (nm) (*λ/64n₂) | Thickness of interface layer 214 (nm) (*λ/64n₅) | Material of recording layer 215 | Effective Rc (%) | Effective Ra (%) | Rc/Ra | LEQ jitter (%) |
|---|---|---|---|---|---|---|---|---|---|---|---|
| 10 | 200-2 ... 6 | 210 | 1.8 | Without | 21 | 3 | $Ge_{45}Sb_4Te_{51}$ | 6.3 | 0.7 | 9.0 | 8.2 |

| Example No. | Medium No. | Information layer No. | Refractive index of transparent layer | Thickness of dielectric layer 228 (nm) (*λ/64n_b) | Thickness of dielectric layer 227 (nm) (*λ/64n_a) | Thickness of interface layer 224 (nm) (*λ/64n₆) | Material of recording layer 225 | Effective Rc (%) | Effective Ra (%) | Rc/Ra | Tc (%) | Ta (%) | LEQ jitter (%) |
|---|---|---|---|---|---|---|---|---|---|---|---|---|---|
| 10 | 200-2 | 220 | 1.8 | Without | 12 | 4 | $Ge_{45}Sb_4Te_{51}$ | 7.1 | 1.1 | 6.5 | 49.6 | 51.6 | 10.6 |
|  | 200-3 | 220 |  | 12 | 14 |  | $Ge_{45}Sb_4Te_{51}$ | 6.1 | 0.6 | 10.2 | 49.5 | 51.2 | 9.8 |
|  | 200-4 | 220 |  |  |  |  | $Ge_{47.5}Bi_2Te_{50.5}$ | 6.2 | 0.5 | 12.4 | 49.5 | 51.3 | 9.7 |
|  | 200-5 | 220 |  |  |  |  | $Ge_{30}Sb_{70}$ | 6.0 | 0.7 | 8.6 | 52.7 | 48.2 | 10.0 |
|  | 200-6 | 220 |  |  |  |  | $Sb_{74}Te_{20}Ge_6$ | 6.3 | 0.7 | 9.0 | 52.5 | 48.2 | 10.1 |

For the formation of MgO, an MgO target was sputtered in an Ar gas atmosphere at a pressure of 0.13 Pa using a high frequency power source with an output of 200 W.

For the formation of $Si_3N_4$, an $Si_3N_4$ target was sputtered in a mixed gas atmosphere of Ar gas and $N_2$ gas in a volume ratio of 90:10 at a pressure of 1.33 Pa using a high frequency power source with an output of 200 W.

For the formation of $SiO_2$, an $SiO_2$ target was sputtered in an Ar gas atmosphere at a pressure of 0.13 Pa using a high frequency power source with an output of 200 W.

For the formation of $YF_3$, an $YF_3$ target was sputtered in an Ar gas atmosphere at a pressure of 0.13 Pa using a high frequency power source with an output of 100 W.

For the formation of $Al_6Si_2O_{13}$, an $Al_6Si_2O_{13}$ target was sputtered in an Ar gas atmosphere at a pressure of 0.13 Pa using a high frequency power source with an output of 200 W.

Table 10 indicates the results. The refractive index of each material of the dielectric layer 228 is a refractive index of the thin film that has been calculated experimentally.

TABLE 10

| Example No. | Medium No. | Material of dielectric layer 228 | Refractive index of dielectric layer 228 | Thickness of dielectric layer 228 (nm) (*λ/64$n_b$) | Effective Rc (%) | Effective Ra (%) | Rc/Ra | Tc (%) | Ta (%) | LEQ jitter (%) |
|---|---|---|---|---|---|---|---|---|---|---|
| 2 | 200-3 | $MgSiO_3$ | 1.55 | 12 | 6.1 | 0.6 | 10.2 | 49.5 | 51.2 | 9.8 |
|   | 200-11 | $Al_2O_3$ | 1.65 | 10 | 6.3 | 0.6 | 10.5 | 49.5 | 51.3 | 9.6 |
|   | 200-12 | BN | 1.56 | 4 | 6.2 | 0.6 | 10.3 | 49.8 | 51.5 | 9.7 |
|   | 200-13 | $CeF_3$ | 1.67 | 8 | 6.5 | 0.7 | 9.3 | 49.4 | 51.3 | 10.0 |
|   | 200-14 | $LaF_3$ | 1.69 | 8 | 6.8 | 0.8 | 8.5 | 49.2 | 51.2 | 10.2 |
|   | 200-15 | $MgF_2$ | 1.58 | 4 | 6.4 | 0.7 | 9.1 | 49.6 | 51.5 | 10.0 |
|   | 200-16 | MgO | 1.69 | 8 | 6.8 | 0.8 | 8.5 | 49.2 | 51.2 | 10.2 |
|   | 200-17 | $Si_3N_4$ | 1.64 | 10 | 6.1 | 0.5 | 12.2 | 49.6 | 51.3 | 9.5 |
|   | 200-18 | $SiO_2$ | 1.48 | 2 | 6.9 | 0.9 | 7.7 | 49.4 | 51.5 | 10.4 |
|   | 200-19 | $YF_3$ | 1.60 | 12 | 6.1 | 0.6 | 10.2 | 49.5 | 51.2 | 9.8 |
|   | 200-20 | $Al_6Si_2O_{13}$ | 1.61 | 12 | 6.2 | 0.6 | 10.3 | 49.5 | 51.2 | 9.5 |

In any of the second information layer 220 of medium numbers 200-11 to 20, an effective Rc of 6% or more, (Tc+Ta)/2(%) of 50% or more, and Rc/Ra of 7 or more were ensured. As the dielectric layer 228, a material containing at least one selected from $Al_2O_3$, BN, $CeF_3$, $LaF_3$, $MgF_2$, MgO, $MgSiO_3$, $Si_3N_4$, $SiO_2$, $YF_3$, $ZrSiO_4$ and $Al_6Si_2O_{13}$ is used preferably. $ZrSiO_4$ has a high refractive index of 1.78 and therefore is used preferably in the case where the refractive index of the transparent layer and the interlayer is 2.1 or 2.4.

As has been described above with reference to various examples concerning the information recording medium of the present invention, the combination of the recording layer and the interface layer of the present invention can be used for any information recording media in which recording is performed by means of an optical system having NA>1. According to the information recording medium of the present invention including the recording layer and the interface layer, even under the conditions for recording information with a high capacity of 90 GB or more per information layer, which has not been feasible so far, it is possible to obtain an information recording medium that can achieve good recording/reproducing properties.

Industrial Applicability

The information recording medium of the present invention is useful as a high capacity optical information recording medium having an excellent recording layer, interface layer, and dielectric layer for next generation rewritable information recording media or next generation rewritable multilayer information recording media in which recording, erasing or rewriting is performed by means of an optical system having NA>1 using, for example, an SIL.

The invention claimed is:

1. An information recording medium comprising:
   an information layer including a recording layer capable of changing a phase containing at least one selected from germanium-tellurium (Ge—Te), antimony-tellurium (Sb—Te) and germanium-antimony (Ge—Sb), and two or more dielectric layers disposed on an optical beam incident side with respect to the recording layer; and
   a transparent layer being disposed adjacent to the information layer on the optical beam incident side with respect to the information layer, being made of a transparent material with respect to the optical beam, and having a refractive index n of 1.75 or more, wherein
   the dielectric layers include a dielectric layer b disposed adjacent to the transparent layer and a dielectric layer a disposed adjacent to the dielectric layer b, the refractive index n of the transparent layer, a refractive index $n_b$ of the dielectric layer b and a refractive index $n_a$ of the dielectric layer a satisfy a relationship of $n_b <n <n_a$,
   the transparent layer contains an acrylic resin, and
   the information recording medium is capable of recording or reproducing information via an optical system having a numerical aperture (NA) >1 by irradiation with an optical beam.

2. The information recording medium according to claim 1, wherein
   the information layer further includes an interface layer in contact with at least one surface of the recording layer, and
   the interface layer contains oxygen (O) and at least one element selected from zirconium (Zr) and hafnium (Hf).

3. The information recording medium according to claim 2, wherein
   the interface layer further contains at least one element selected from indium (In), gallium (Ga), chromium (Cr) and silicon (Si).

4. The information recording medium according to claim 1, wherein
   the refractive index n of the transparent layer is 1.8 or more.

5. The information recording medium according to claim 1, wherein
   the dielectric layer b contains at least one selected from materials expressed as aluminum oxide ($Al_2O_3$), boron nitride (BN), cerium fluoride ($CeF_3$), lanthanum fluoride ($LaF_3$), magnesium fluoride ($MgF_2$), magnesium oxide (MgO), magnesium silicate ($MgSiO_3$), silicon nitride ($Si_3N_4$), silicon dioxide ($SiO_2$), yttrium fluoride ($YF_3$), zirconium silicate ($ZrSiO_4$), aluminum silicon oxide ($Al_6Si_2O_{13}$) and aluminum silicate ($Al_4SiO_8$).

6. The information recording medium according to claim 1, wherein the dielectric layer a contains at least one selected from materials expressed as aluminum nitride (AlN), bismuth oxide ($Bi_2O_3$), cerium oxide ($CeO_2$), dysprosium oxide ($Dy_3O_3$), gallium oxide ($Ga_2O_3$), hafnium oxide ($HfO_2$), indium oxide ($In_2O_3$), niobium oxide ($Nb_2O_5$,) antimony oxide ($Sb_2O_3$), silicon nitride ($Si_3N_4$), tin dioxide ($SnO_2$), tantalum oxide ($Ta_2O_5$), tellurium dioxide ($TeO_2$), titanium oxide ($TiO_2$), tungsten oxide ($WO_3$), yttrium oxide ($Y_2O_3$), zinc oxide (ZnO), zinc sulfide-silicon dioxide ($ZnS$—$SiO_2$), zirconium oxide ($ZrO_2$), aluminum titanium oxide ($Al_2TiO_5$), zinc sulfide (ZnS) and chromium oxide ($Cr_2O_3$).

7. The information recording medium according to claim 1, wherein the information layer further includes a reflective layer, and the recording layer and the reflective layer are disposed in this order from the optical beam incident side.

8. The information recording medium according to claim 7, wherein the reflective layer contains silver (Ag).

9. The information recording medium according to claim 1, wherein the recording layer contains germanium-antimony-tellurium (Ge—Sb—Te).

10. The information recording medium according to claim 9, wherein the recording layer contains germanium (Ge) at 40 atom % or more.

11. The information recording medium according to claim 1, wherein the optical system includes a solid immersion lens (SIL) or a solid immersion mirror (SIM).

12. A method for recording or reproducing information with respect to the information recording medium according to claim 1 comprising the step of:

recording information on the recording layer or reproducing information from the recording layer by irradiating the recording layer included in the information recording medium with optical beam by means of an optical system having a numerical aperture (NA)>1.

13. An information recording medium comprising:

N (where N is an integer of 2 or more) information layers;

at least one of the N information layers including a recording layer capable of changing a phase containing at least one selected from Ge—Te, Sb—Te and Ge—Sb, and two or more dielectric layers disposed on an optical beam incident side with respect to the recording layer; and a transparent layer being disposed adjacent to the information layer on the optical beam incident side with respect to the information layer, being made of a transparent material with respect to the optical beam, and having a refractive index n of 1.75 or more, wherein the dielectric layers include a dielectric layer b disposed adjacent to the transparent layer and a dielectric layer a disposed adjacent to the dielectric layer b, the refractive index n of the transparent layer, a refractive index $n_b$ of the dielectric layer b and a refractive index $n_a$ of the dielectric layer a satisfy a relationship of $n_b<n<n_a$, the transparent layer contains an acrylic resin, and the information recording medium is capable of recording or reproducing information via an optical system having a numerical aperture (NA)>1 by irradiation with an optical beam.

* * * * *